United States Patent
Wheatley et al.

(10) Patent No.: US 11,016,229 B2
(45) Date of Patent: May 25, 2021

(54) OPTICAL FILTER

(71) Applicant: 3M INNOVATIVE PROPERTIES COMPANY, St. Paul, MN (US)

(72) Inventors: John A. Wheatley, Stillwater, MN (US); Gilles J. Benoit, Minneapolis, MN (US); Todd A. Ballen, St. Paul, MN (US); Kenneth L. Smith, White Bear Lake, MN (US); Guanglei Du, Painted Post, NY (US); Edward J. Kivel, Stillwater, MN (US); Rolf W. Biernath, Wyoming, MN (US); Jordan D. Whitney, Oakdale, MN (US); Daniel J. Schmidt, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 304 days.

(21) Appl. No.: 16/095,406

(22) PCT Filed: May 30, 2017

(86) PCT No.: PCT/US2017/034941
§ 371 (c)(1),
(2) Date: Oct. 22, 2018

(87) PCT Pub. No.: WO2017/213911
PCT Pub. Date: Dec. 14, 2017

(65) Prior Publication Data
US 2019/0137669 A1     May 9, 2019

Related U.S. Application Data

(60) Provisional application No. 62/347,776, filed on Jun. 9, 2016.

(51) Int. Cl.
*G02B 5/20*     (2006.01)
*G02B 27/28*     (2006.01)
(Continued)

(52) U.S. Cl.
CPC ............... *G02B 5/208* (2013.01); *G02B 5/26* (2013.01); *G02B 5/3025* (2013.01); *G02B 27/281* (2013.01)

(58) Field of Classification Search
CPC ........ G02B 5/208; G02B 5/26; G02B 5/3025; G02B 5/20; G02B 5/30;
(Continued)

(56) References Cited

U.S. PATENT DOCUMENTS 2,440,133 A    4/1948   Young
2,493,192 A    1/1950   Grey
(Continued)

FOREIGN PATENT DOCUMENTS

EP          1437615     7/2004
JP          2014-219551   11/2014
(Continued)

OTHER PUBLICATIONS

Laan, "Detection range enhancement using circularly polarized light in scattering environments for infrared wavelengths", Applied Optics, Mar. 2015, vol. 54, No. 9, pp. 2266-2274.
(Continued)

*Primary Examiner* — Derek S. Chapel
*Assistant Examiner* — Adam W Booher
(74) *Attorney, Agent, or Firm* — Clifton F. Richardson

(57) ABSTRACT

An optical filter including a polarizer and a visible light blocking filter is described. The polarizer is configured to transmit at least 60 percent of light in a first infrared wavelength range that is incident on the polarizer at normal incidence in a first polarization state, to transmit less than 30
(Continued)

percent of light in a second infrared wavelength that is incident on the polarizer at normal incidence in a second polarization state orthogonal to the first polarization state, and to transmit less than 30 percent of light in a third infrared wavelength range that is incident on the polarizer with a 50 degree angle of incidence in the second polarization state. The visible light blocking filter configured to transmit at least 60 percent of light in the first infrared wavelength range at normal incidence in the first polarization state.

20 Claims, 42 Drawing Sheets

(51) Int. Cl.
    *G02B 5/26*     (2006.01)
    *G02B 5/30*     (2006.01)

(58) Field of Classification Search
    CPC ...... G02B 5/3033–3058; G02B 27/281; G02B 27/28; G02B 27/288; G08K 1/16; G08K 1/167; G08K 1/168; G06K 9/00791; G06K 9/00798
    USPC ..... 250/338.1, 339.01, 339.05, 341.3, 341.8; 356/364, 366–368; 359/359, 352
    See application file for complete search history.

(56) References Cited

U.S. PATENT DOCUMENTS

| | | | |
|---|---|---|---|
| 3,042,827 A | 7/1962 | Lopez | |
| 3,709,580 A | 1/1973 | Fugitt | |
| 5,703,718 A | 12/1997 | Ohtomo | |
| 5,765,116 A | 6/1998 | Wilson-Jones | |
| 5,882,774 A | 3/1999 | Jonza | |
| 5,962,114 A | 10/1999 | Jonza | |
| 5,965,247 A | 10/1999 | Jonza | |
| 6,049,419 A | 4/2000 | Wheatley | |
| 6,243,015 B1 | 6/2001 | Yeo | |
| 6,451,414 B1 | 9/2002 | Wheatley | |
| 6,452,148 B1 | 9/2002 | Bendicks | |
| 6,465,787 B1 | 10/2002 | Coulter | |
| 6,693,524 B1 | 2/2004 | Payne | |
| 6,727,807 B2 | 4/2004 | Trajkovic | |
| 6,916,440 B2 | 7/2005 | Jackson | |
| 6,936,209 B2 | 8/2005 | Jackson | |
| 6,939,499 B2 | 9/2005 | Merrill | |
| 6,949,212 B2 | 9/2005 | Merrill | |
| 7,064,897 B2 | 6/2006 | Hebrink | |
| 7,075,056 B2 | 7/2006 | Harada | |
| 7,289,019 B1 | 10/2007 | Kertes | |
| 7,375,888 B2 | 5/2008 | Moia | |
| 7,443,585 B2 | 10/2008 | Hara | |
| 7,622,157 B2 | 11/2009 | Falk | |
| 7,834,905 B2 | 11/2010 | Hahn | |
| 7,873,187 B2 | 1/2011 | Schofield | |
| 8,519,837 B2 | 8/2013 | Kirsch | |
| 8,630,037 B1 | 1/2014 | Osterman et al. | |
| 8,636,393 B2 | 1/2014 | Schofield | |
| 9,179,072 B2 | 11/2015 | Stein | |
| 2001/0012153 A1 | 8/2001 | Halter | |
| 2009/0254260 A1 | 10/2009 | Nix | |
| 2011/0254849 A1 | 10/2011 | Gaily | |
| 2013/0170018 A1 | 7/2013 | Domash | |
| 2014/0313572 A1 | 10/2014 | Kivel | |
| 2014/0327837 A1 | 11/2014 | Osterman | |
| 2015/0248014 A1 | 9/2015 | Powell | |
| 2015/0285956 A1 | 10/2015 | Schmidt | |
| 2016/0109628 A1 | 4/2016 | Weber et al. | |
| 2016/0109630 A1 | 4/2016 | Ichihashi | |
| 2016/0111005 A1 | 4/2016 | Lee | |
| 2016/0114720 A1 | 4/2016 | Schlaug | |
| 2016/0154156 A1* | 6/2016 | Ichihashi | ............. G01J 1/0429 356/364 |

FOREIGN PATENT DOCUMENTS

| | | | |
|---|---|---|---|
| JP | 2014-219552 | 11/2014 | |
| KR | 101029441 B1 * | 4/2011 | ............. G02B 5/305 |
| WO | WO 2015-150295 | 10/2015 | |

OTHER PUBLICATIONS

Timm, "Non-Invasive Optical Real-time Measurement of Total Hemoglobin Content", Sep. 5-8, 2010, ScienceDirect, pp. 488-491.
Yeh, "Optics of anisotropic layered media: a new 4x4 matrix algebra", Surface Science, 1980, vol. 96, pp. 41-53.
International Search report for PCT International Application No. PCT/US2017/034941 dated Jul. 28, 2017, 4 pages.

* cited by examiner

OPTICAL FILTER

BACKGROUND

Optical filters can be utilized to selectively transmit light of different wavelengths or different polarizations. Optical filters are useful in a variety of optical systems such as detector systems.

SUMMARY

In some aspects of the present description, an optical filter including a polarizer and a visible light blocking filter is provided. The polarizer is configured to transmit at least 60 percent of light in a first infrared wavelength range that is incident on the polarizer at normal incidence in a first polarization state. The polarizer is further configured to transmit less than 30 percent of light in a second infrared wavelength that is incident on the polarizer at normal incidence in a second polarization state orthogonal to the first polarization state, and to transmit less than 30 percent of light in a third infrared wavelength range that is incident on the polarizer with a 50 degree angle of incidence in the second polarization state. The visible light blocking filter is configured to transmit less than 30 percent of unpolarized light in a first visible wavelength range that is incident on the visible light blocking filter at normal incidence. The visible light blocking filter is disposed such that light transmitted through the polarizer is incident on the visible light blocking filter. The visible light blocking filter is configured to transmit at least 60 percent of light in the first infrared wavelength range that is incident on the visible light blocking filter at normal incidence in the first polarization state. A wavelength range from 700 nm to 2500 nm comprises each of the first, second and third infrared wavelength ranges, and the first visible wavelength range includes at least 80 percent of a wavelength range from 400 nm to 700 nm.

In some aspects of the present description, an optical filter including a polarizer is provided. The polarizer includes a plurality of alternating polymeric layers and is configured to transmit at least 60 percent of light in a first infrared wavelength range that is incident on the polarizer at normal incidence in a first circular polarization state. The polarizer is further configured to transmit less than 30 percent of light in a second infrared wavelength that is incident on the polarizer at normal incidence in a second circular polarization state orthogonal to the first polarization state, and to transmit less than 30 percent of light in a third infrared wavelength range that is incident on the polarizer with a 50 degree angle of incidence in the second circular polarization state. A wavelength range from 700 nm to 2500 nm comprises each of the first and second infrared wavelength ranges.

In some aspects of the present description, optical devices and optical systems including the optical filter are provided.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Figure 1A:
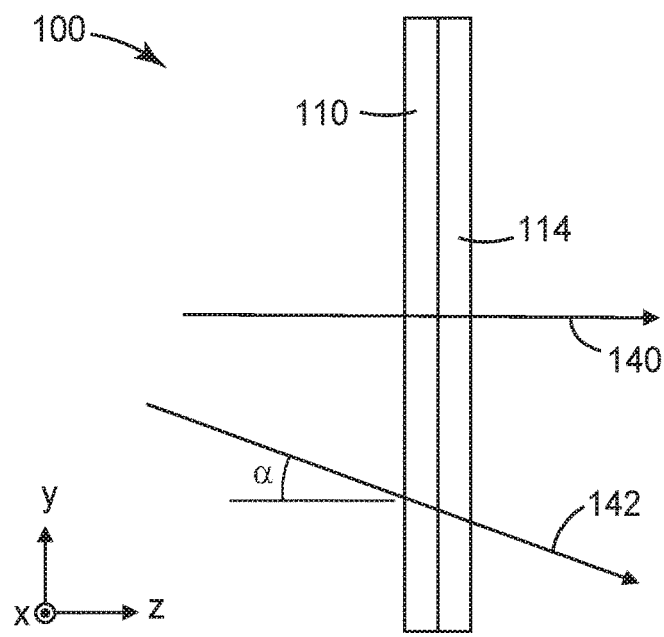
FIGS. 1A and 1B are cross-sectional views of optical filters.

FIG. 1A is a schematic cross-sectional view of optical filter 100 including a visible light blocker 110 and a polarizer 114. The visible light blocking filter 110 is disposed such that light 140 or 142, which is transmitted through the polarizer is incident on the visible light blocking filter 110. Light 140 is incident on the visible light blocking filter 110 and the polarizer 114 at normal incidence, while light 142 is incident on the visible light blocking filter 110 and the polarizer 114 at an angle of incidence of a (angle between light ray and normal vector to the polarizer). The light 140 may be transmitted first through the visible light blocking filter 110 and then through the polarizer 114 as illustrated, or alternatively the light 140 may be transmitted first through the polarizer 114 and then through the visible light blocking filter 110. In either case, the light 140, which passes through the polarizer 114, is incident on the visible light blocker 110 on one side or the other. The visible light blocker 110 and the polarizer 114 may be immediately adjacent to each other, may be attached together with an optically clear adhesive, or may be disposed adjacent each other and separated by an air gap, for example. Light 140 is incident on the visible light blocking filter 110 at normal incidence. Polarizer 114 may be any suitable type of polarizer. For example, polarizer 114 may include one or more of a multilayer optical film, a cholesteric polarizer, a wire-grid polarizer, a silver nanoparticle polarizer (nanoparticle polarizers, are described, for example, in U.S. Pat. No. 7,622,157 (Hirai et al.) which is hereby incorporated by reference herein to the extent that it does not contradict the present description), or one or more layers containing one or more polarizing dyes or pigments.

Figure 1B:
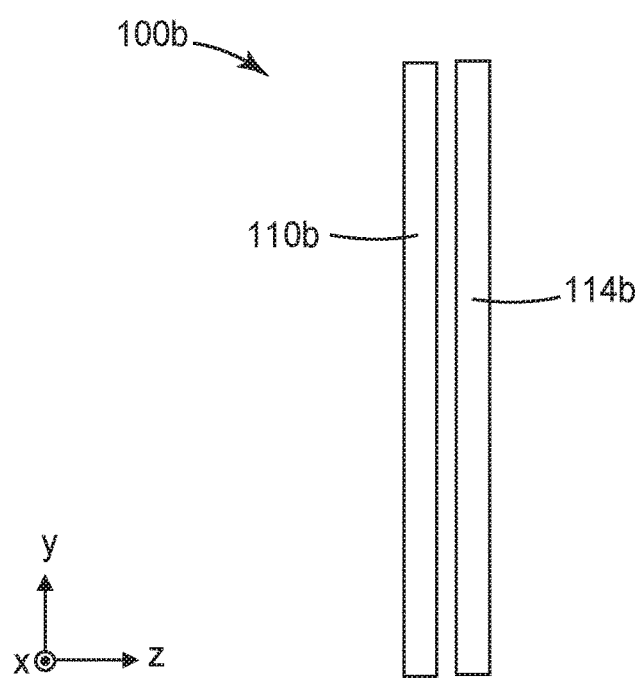

FIG. 1B is a schematic cross-sectional view of optical filter 100b including a visible light blocker 110b and a polarizer 114b. Optical filter 100b is similar to optical filter 100 except that an air gap separates visible light blocker 110b and polarizer 114b, while visible light blocker 110 and polarizer 114 are immediately adjacent. In general, the visible light blocker and polarizer can be placed in an optical filter in any relationship (e.g., spaced apart) to each other as long as they are in a common optical path. In some embodiments, the visible light blocker and the polarizer are laminated together with an optical adhesive. In some embodiments, the visible light blocker is an optical adhesive with a suitable dye and/or pigment. In some embodiments, the polarizer is a multilayer optical film including one or more skin layers loaded with visible light absorbing dyes and/or pigments and the skin layers comprises the visible light blocking filter.

The visible light blocking filter 110 is configured to transmit less than 30 percent of unpolarized light in a first visible wavelength range that is incident on the visible light blocking filter at normal incidence. As used herein, visible wavelengths refer to wavelengths from 400 nm to 700 nm. The first visible wavelength range blocked by the visible light blocking filter includes at least 80 percent of the wavelength range from 400 nm to 700 nm, and in some cases included the entire wavelength range from 400 nm to 700 nm. The visible light blocking filter may block light by at least partially reflecting the light and/or by at least partially absorbing the light. The visible light blocking filter 110 may include one or more of the following: one or more layers having one or more dyes or pigments, a multilayer optical film, and a metallic coating (e.g., one or both of the major surfaces of visible light blocking filter 110 may include a metallic coating). As used herein, a filter or component may be said to transmit a given fraction or percentage of light at a wavelength and polarization if the given fraction or percentage of the power in the incident light is transmitted through the filter or component. The fraction or percentage of power in an incident light that is transmitted through a filter or component may be referred to as the transmittance. For example, a polarizer that transmits 60 percent of light in a first infrared wavelength range that is incident on the polarizer at normal incidence in a first polarization state has a transmittance of 0.6 or 60 percent for light in the first infrared wavelength range that is incident on the polarizer at normal incidence in the first polarization state.

As used herein, near-infrared light refers to light in the wavelength range from 700 nm to 2500 nm. The polarizer 114 is configured to transmit at least 60 percent of light in a first infrared wavelength range that is incident on the polarizer at normal incidence in a first polarization state, and to transmit less than 30 percent of light in a second infrared wavelength range that is incident on the polarizer at normal incidence in a second polarization state orthogonal to the first polarization state. The polarizer may at least partially absorb and/or at least partially reflect light in the second polarization state. The polarizer is also configured to transmit less than 30 percent of light in a third infrared wavelength range that is incident on the polarizer with a 50 degree angle of incidence in the second polarization state. The first, second and third infrared wavelength ranges are each near-infrared wavelength ranges; that is, each of the first, second and third infrared wavelength ranges are contained in the range from 700 nm to 2500 nm. The first, second and third infrared wavelength ranges may be the same or different and may partially overlap. The visible light blocking filter 110 is configured to transmit at least 60 percent of light in the first infrared wavelength range that is incident on the visible light blocking filter at normal incidence in the first polarization state. In some embodiments, the visible light blocking filter 110 is also configured to transmit at least 60 percent of light in the first infrared wavelength range that is incident on the visible light blocking filter at normal incidence in the second polarization state, or to transmit at least 60 percent of unpolarized light in the first infrared wavelength range that is incident on the visible light blocking filter at normal incidence.

The optical filter 100 may include one or more additional coatings or layers such as hydrophilic, hydrophobic, easy clean, anti-fog, surface protection (abrasion or scratch resistance) and/or self-healing layers or coatings.

Figure 2A:
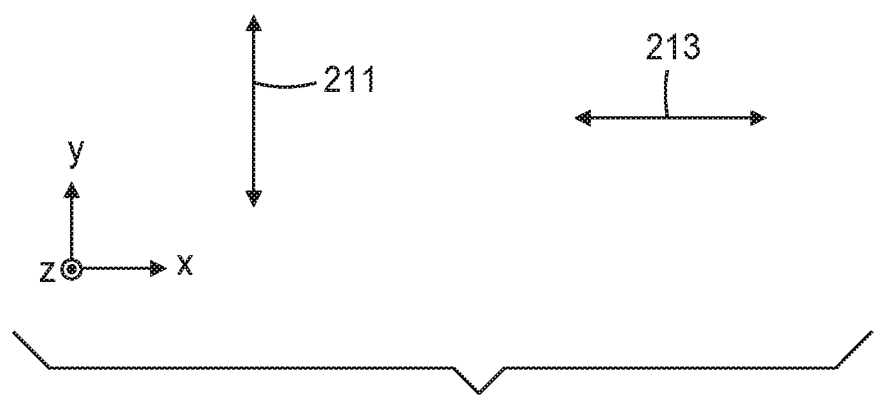
FIGS. 2A-2B are schematic illustrations of orthogonal polarization states.
Figure 2B:
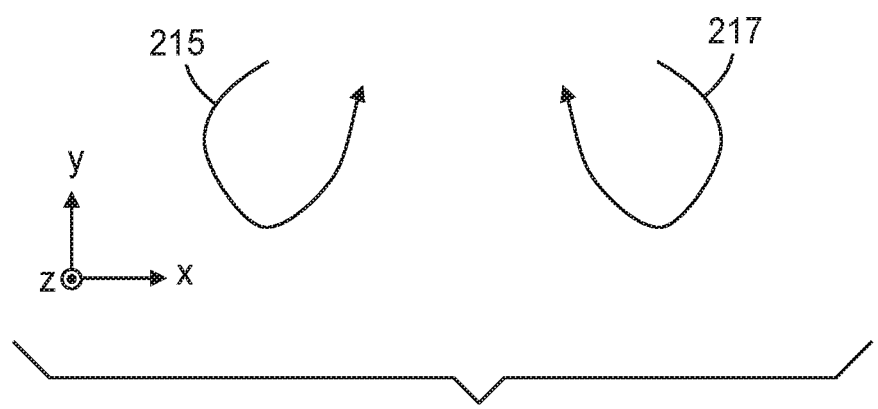

In some embodiments, the first and second polarization states are linear polarization states, and in some embodiments, the first and second polarization states are circular polarization states. FIG. 2A schematically illustrates orthogonal linear first and second polarization states 211 and 213 for light propagating along the z-axis. The electric field is polarized along the y-axis in first polarization state 211, and along the x-axis for second polarization state 213. FIG. 2B schematically illustrates orthogonal circular first and second polarization states 215 and 217 for light propagating along the z-axis. First polarization state 215 is a right-hand polarization state while circular polarization state 217 is a left-hand polarization state.

Figure 3:
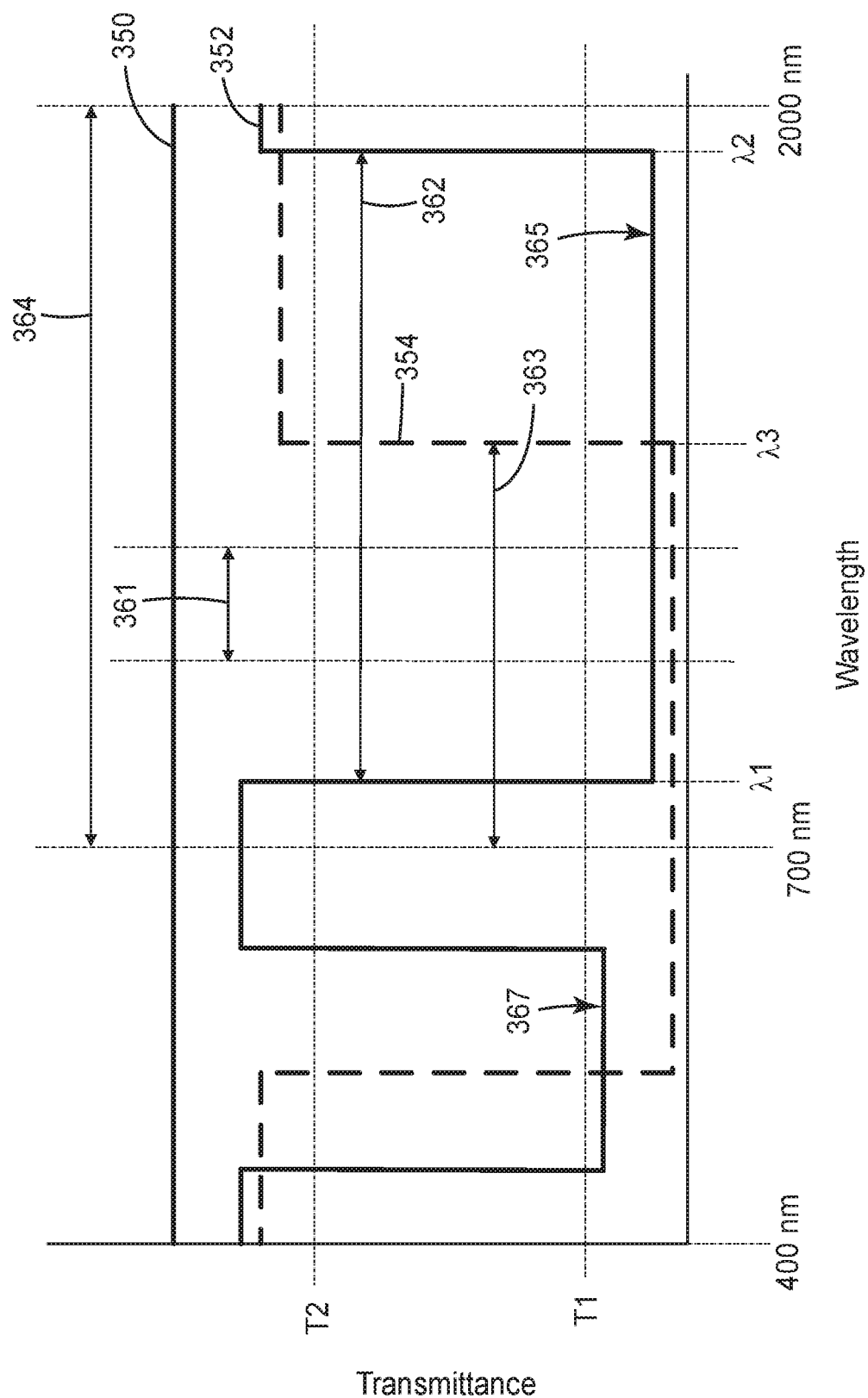
FIG. 3 is a schematic illustration of transmittance through a polarizer as a function of wavelength.

FIG. 3 schematically illustrates a transmission spectrum of a polarizer included in an optical filter of the present description. Curve 350 is the transmission through the polarizer for light having a first polarization state, which may be described as the pass state, at normal incidence. Transmission through the polarizer for off-normal incidence (e.g., 50 degrees angle of incidence) in the pass state may also be given by or approximately given by curve 350. Curve 352 is the transmission through the polarizer for light having a second polarization state, which may be described as the block state, at normal incidence. Curve 354 is the transmission through the polarizer for light incident on the polarizer at a 50 degree angle of incidence in the second polarization state. The first and second polarization states are orthogonal polarization states such as those illustrated in FIGS. 2A and 2B, for example. The curves are shown as having abrupt changes between low and high transmission values for simplicity of illustration. As illustrated in the Examples, the transition between high and low transmission through a polarizer typically occurs more gradually than schematically illustrated in FIG. 3.

Near-infrared wavelength ranges 361, 362, 363 and 364 are shown. Curve 350 illustrates that light incident on the polarizer at normal incidence in the pass state has a transmission greater than T2 throughout the wavelength ranges 361 and 364, and, in the illustrated embodiment, also throughout the visible range. Either of the wavelength ranges 361 and 364 may correspond to the first infrared wavelength range of the polarizer and the transmission T2 may be at least 60 percent, or at least 70 percent, or at least 75 percent, or at least 80 percent, for example. In the illustrated embodiments, the wavelength range 364 is the entire near-infrared wavelength range from 700 nm to 2500 nm. In other embodiments, the transmission is above T2 for only a portion of this range. For example, the transmission for light incident on the polarizer at normal incidence in the pass state may be at least T2 over a wavelength range from 700 nm, or 800 nm, or 850 nm to 1100 nm, or to 1200 nm, or to 1300 nm, or to 1600 nm and may be less than T2 for near-infrared wavelengths outside of these ranges.

The wavelength range 361 may correspond to a wavelength range of interest in a particular application as described further elsewhere herein. In some embodiments, the optical filter is configured to provide a near-infrared passband for light having the first polarization state. This can be accomplished by including a notch filter in the optical filter to limit the near-infrared wavelengths that are allowed to pass through the optical filter to a near infrared notch that, in some embodiments, has a full-width and half-maximum (FWHM) bandwidth of no more than 100 nm or no more than 60 nm, for example. The notch filter may be included in the polarizer, in the visible light blocking filter, or may be a separate component or layer in the optical filter. In some embodiments, the polarizer includes a notch filter and a broad-band polarizer where the broad-band polarizer is configured to transmit at least 60 percent of light in a fourth infrared wavelength range (for example, corresponding to infrared wavelength range 364) that is incident on the broad-band polarizer at normal incidence in the first polarization state. In some embodiments, the notch filter is configured to transmit at least 60 percent, or at least 70 percent, or at least 80 percent, of unpolarized light in the first infrared wavelength range (for example, corresponding to infrared wavelength range 361) that is incident on the notch filter at normal incidence. In some embodiments, the notch filter is configured to transmit at least 60 percent, or at least 70 percent, or at least 80 percent, of light in the first infrared wavelength range (for example, corresponding to infrared wavelength range 361) that is incident on the notch filter at normal incidence in the first polarization state.

Curve 352 gives the transmission through the polarizer for light incident on the polarizer at normal incidence in the block state. This transmission is less than T1 throughout the near-infrared wavelength range 362 from $\lambda 1$ to $\lambda 2$. The near-infrared wavelength range 362 is a second infrared wavelength range of the polarizer. The polarizer has a block band 365 which provides the low transmission in the wavelength range 362. In some embodiments, the block band 365 is first order reflection band comprising the infrared wavelength range 365. In such embodiments, at least one harmonic 367 of the reflection band is at least partially in the visible wavelength range. For example, the wavelength range 362 may extend from 900 nm to 1400 nm, in which case the second harmonic would extend from approximately 450 nm to 700 nm and the third harmonic would extend from 300 nm to about 467 nm. In this case, the second harmonic is entirely within the visible range and a portion of the third harmonic is in the visible range. The at least one harmonic 367 provides blocking in the visible range which aids the visible light blocking filter in blocking visible light. In some embodiments, a dye or pigment is used in the visible light blocking filter to block visible light and, in some cases, less dye or pigment can be used due the visible light blocking provided by the at least one harmonic 367. In some embodiments, T1 is no more than 30 percent, or no more than 25 percent, or no more than 20 percent, or no more than 15 percent, or no more than 10 percent. In some embodiments, one or both of the wavelength ranges 364 and 362 are from 800 nm to 1600 nm. In some embodiments, the first and second infrared wavelength ranges of the polarizer are the same and in some embodiments, the first and second infrared wavelength ranges are different. In some embodiments, the first infrared wavelength range of the polarizer (corresponding to wavelength range 361, for example) has a width of less than 100 nm, or less than 60 nm, and the second infrared wavelength range is from 800 nm to 1300 nm or to 1600 nm.

The labels T1 and T2 will be used to denote lower and upper transmission values for various components (such as the polarizer, the visible light blocker, or the optional notch filter) of the optical filter or of the optical filter itself. In each case, T2 may be at least 50 percent, or at least 60 percent, or at least 70 percent, or at least 75 percent or at least 80 percent; and T1 may be no more than 30 percent, or no more than 25 percent, or no more than 20 percent, or no more than 15 percent, or no more than 10 percent. In some embodiments, in order to achieve a transmission through the optical filter of at least 60 percent for infrared light in the first infrared wavelength range incident on the optical filter at normal incidence in the first polarization state, for example, one or both of the polarizer and the visible light blocking filter has a transmission of higher than 77 percent. For example, if the polarizer has a transmittance of 0.8 (80 percent) and the visible light blocking filter has a transmittance of 0.75 for a light having a particular polarization and wavelength, the optical filter would have a transmittance of 0.6 for the light.

Curve 354 gives the transmission through the polarizer for light incident on the polarizer at an angle of incidence of 50 degrees in the block state. Curve 354 is shifted to the left relative to curve 352. The near infrared wavelength range 363 is a third infrared wavelength range for the polarizer and extends from 700 nm to $\lambda 3$. The third infrared wavelength range may alternatively be considered to be some subset of the wavelength range 363. The transmittance is less than T1 throughout this infrared range. The lower limit of the wavelength range 363 is 700 nm since this is the lower limit of the infrared range. In other embodiments, the left band edge does not drop below 700 nm and the lower limit of the wavelength range 363 is then greater than 700 nm. In some embodiments, the third infrared wavelength range of the polarizer is from 800 nm to at least 1000 nm. In some embodiments, each of the second and third infrared wavelength ranges includes at least a 300 nm range. In some embodiments, each of the second and third infrared wavelength ranges includes at least a range from 800 nm to 1000 nm or to 1100 nm.

Figure 4:
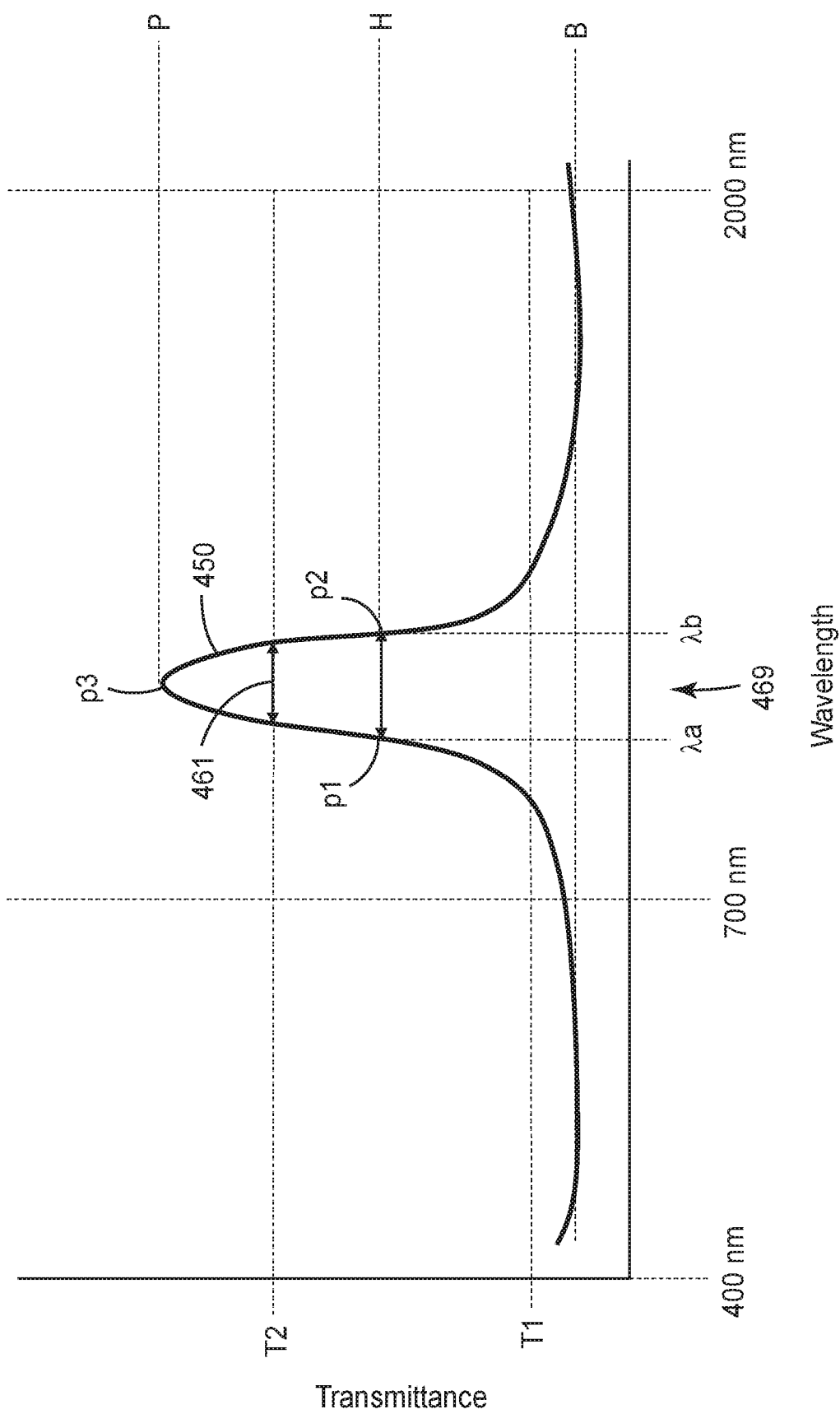
FIG. 4 is a graph of transmittance through an optical filter as a function of wavelength.

FIG. 4 is a graph of the transmission spectrum of an optical filter illustrating the concept of full width half maximum ("FWHM"). The curve 450 may represent the measured transmission of the entire optical filter, or of one or more individual components thereof, for light incident on the optical filter at normal incidence in the pass state. Without loss of generality, for the remainder of the discussion of FIG. 4, it will be assumed for simplicity that the curve 450 represents the transmission of the entire optical filter. The illustrated optical filter selectively transmits light within a narrow passband 469 in the near-infrared portion of the spectrum.

In order to quantify relevant features of the curve 450, a baseline value B of the curve 450, a peak value P of the curve 450, and an intermediate value H of the curve 450, halfway between P and B are identified in FIG. 4. The curve 450 intersects with the value H at the points p1 and p2, whose wavelength values equal the short wavelength band edge $\lambda a$ and the long wavelength band edge $\lambda b$, respectively, of the passband 469. The short and long wavelength band edges can be used to calculate two other parameters of interest: the width (full-width at half-maximum, or "FWHM") of the passband 469, which equals $\lambda b - \lambda a$; and the center wavelength of the passband 469, which equals $(\lambda a + \lambda b)/2$. Note that the center wavelength may be the same as or different from the peak wavelength (point p3) of the passband 469, depending on how symmetrical or asymmetrical the curve 450 is.

In some embodiments, an optical filter of the present description including a polarizer and a visible light blocking filter is configured to provide a near-infrared passband 469 for light having the first polarization state where the near-infrared passband 469 includes the first infrared wavelength range of the polarizer and has a full-width at half-maximum bandwidth ($\lambda b - \lambda a$) of no more than 100 nm, or no more than 60 nm. The optical filter depicted in FIG. 4 has a transmittance of at least T2, which may be any of the values described elsewhere herein, in the near-infrared wavelength range 461.

Figure 5:
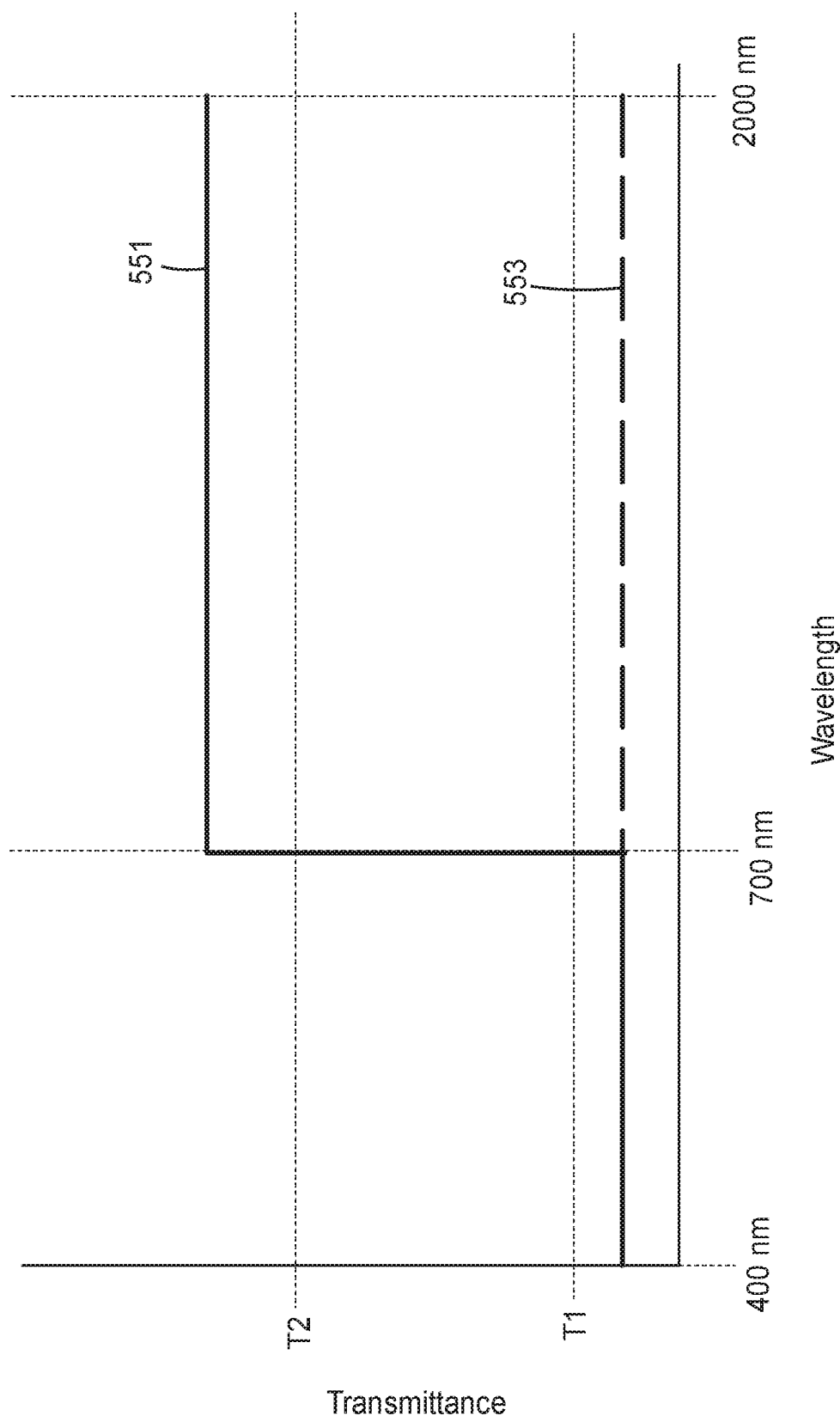
FIGS. 5-6 are schematic illustrations of transmittance through visible light blocking filters as a function of wavelength.

FIG. 5 is a schematic illustration of the transmission of light through a visible light blocking filter of an optical filter of the present description. Curves 551 and 553 show the transmission for light incident on the visible light blocking filter at normal incidence in the first and second polarization states, respectively. Curve 553 shows a transmission of no more than T1 throughout the visible and near-infrared wavelength ranges, while curve 551 shows a transmission of no more than T1 throughout the visible range and a transmission of no less than T2 throughout the near-infrared range. In many typical visible light blocking filters, the curve 551 will have a more gradual transition from blocking to transmission than schematically illustrated in FIG. 5 (see, e.g., the Examples). For at least one of the first and second polarization states the transmission is at least T2 at least for near-infrared wavelengths in the first infrared wavelength ranges (e.g., infrared wavelength ranges 361 or 364). In other embodiments, the visible light blocking filter does not substantially distinguish between the first and second polarization states and the transmission of light of either polarization or of unpolarized light is given by curve 551. The visible light blocking filter of FIG. 5 can be made by using a layer or a coating containing dyes or pigments and/or by using a multilayer optical film having a layer profile selected to reflect visible light but not infrared light. In some embodiments, a multilayer optical film having skin layers is used for the visible light blocking filter and the skin layers contains dyes or pigments.

Figure 6:
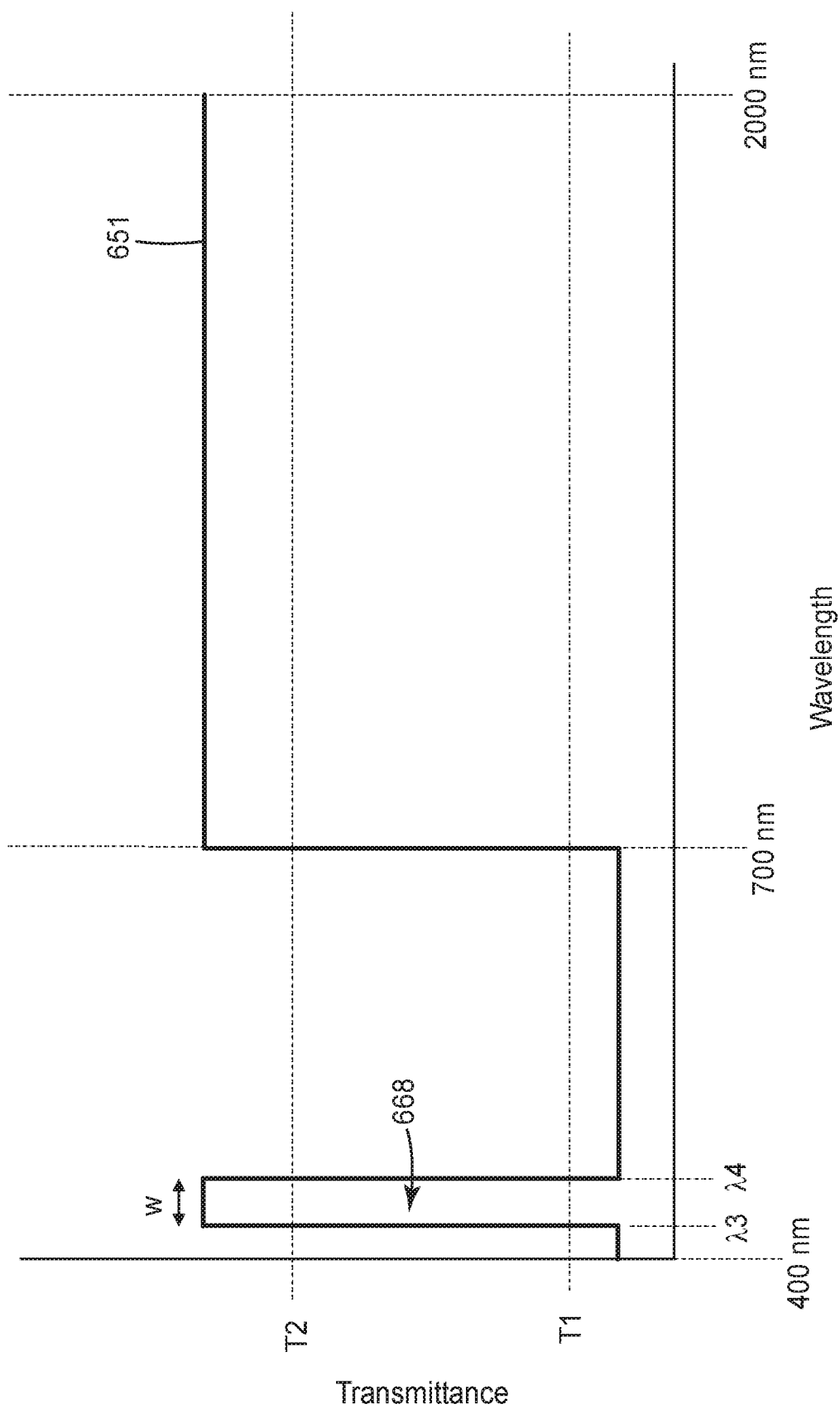

FIG. 6 is a schematic illustration of the transmission of light through a visible light blocking filter of an optical filter of the present description. Curve 651 shows the transmission for unpolarized light incident on the visible light blocking filter at normal incidence. In this case, the visible light blocking filter includes a passband 668 having a width w between $\lambda 3$ and $\lambda 4$. In some embodiments, the visible light blocking filter is configured to transmit less than 30 percent (or less than T1) of unpolarized light in a first visible wavelength range that is incident on the visible light blocking filter at normal incidence, where the first visible wavelength range includes at least 80 percent of the wavelength range from 400 nm to 700 nm. For example, the first visible wavelength range may include 400 nm to 440 nm and 500 nm to 700 nm so that only the range from 440 nm to 500 nm is omitted. In some embodiments, the first visible wavelength range includes all wavelengths between 400 nm and 700 nm except for a band having a width of no more than 60 nm. The visible light blocking filter of FIG. 6 can be made using a multilayer optical film having a layer profile selected to reflect visible light outside of the passband 668 but to not reflect light in the passband 668 and to not reflect near-infrared light.

Figure 7:
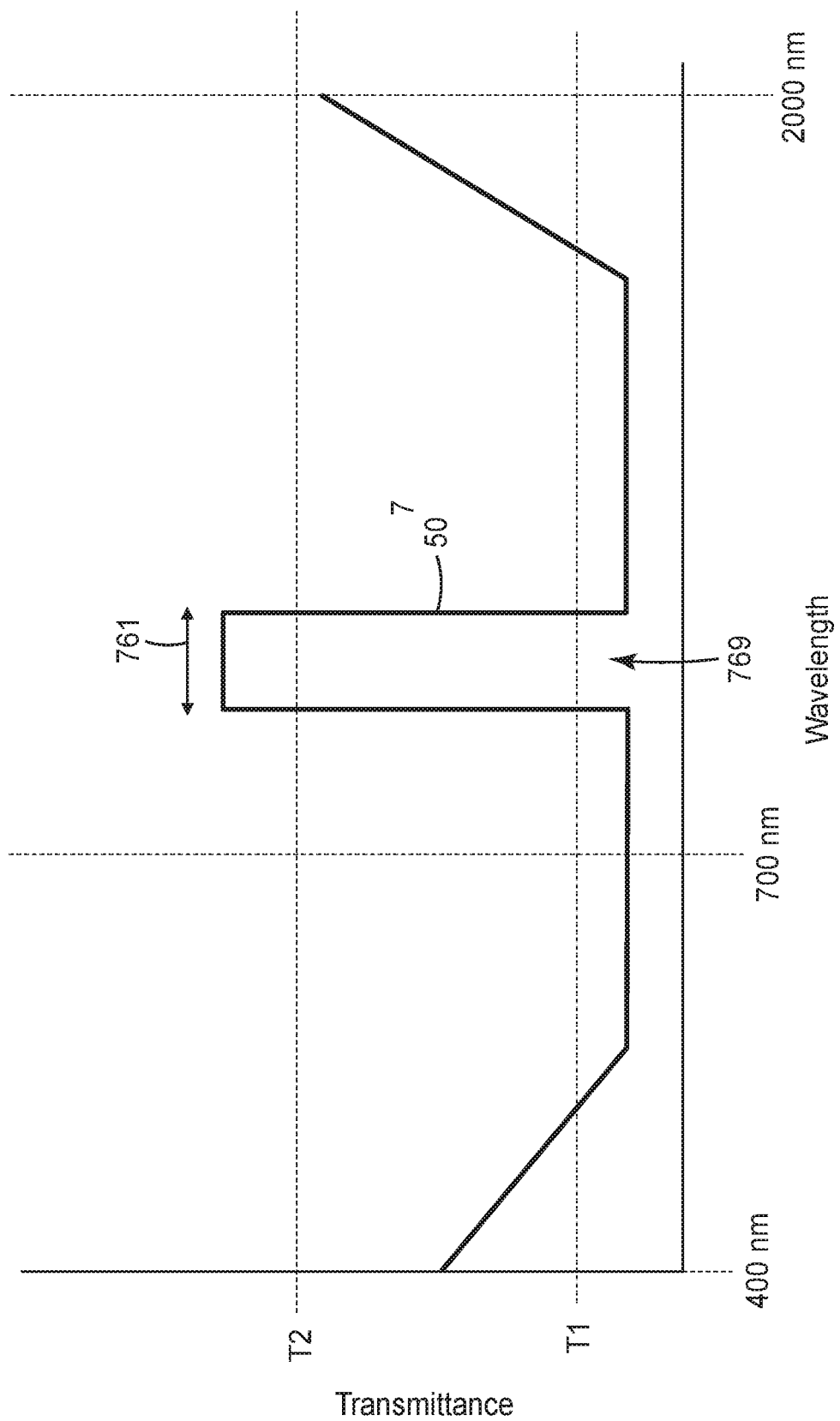
FIG. 7 is a schematic illustration of transmittance through a notch filter.

FIG. 7 is a schematic illustration of transmittance through a notch filter. Curve 750 is the transmittance for unpolarized light that is incident on the notch filter at normal incidence. In some embodiments, the notch filter has passband 769 having a full-width at half-maximum bandwidth 761 of no more than 100 nm, or no more than 60 nm. In some embodiments, the notch filter has a transmittance below T1 for a portion of the near-infrared outside the passband 769. The transmittance may increase to values above T1 (or even above T2) for wavelengths substantially above or below the passband 769 as schematically illustrated in FIG. 7. The notch filter of FIG. 7 can be made using a multilayer optical film having a layer profile selected to reflect visible light outside of the passband 769 but to not reflect light in the passband 769. Alternatively, the notch filter can be a Fabry-Perot filter or a plasmonic filter.

In some embodiments, the notch filter is included in the optical filter as a component distinct from the polarizer and the visible light blocking filter. In some embodiments, the visible light blocking filter includes the notch filter, for example, as a component attached to a filter that is transmissive in the near infrared. In some embodiments, the polarizer includes the notch filter, for example, as a component attached to a broad-band polarizer. In some embodiments, the broad-band polarizer has a transmittance of at least T2 in a fourth infrared wavelength range (e.g. wavelength range 364 depicted in FIG. 3) for light that is incident on the broad-band polarizer at normal incidence in the first polarization state, and a transmittance less than T1 for light in the second infrared wavelength range (e.g., wavelength range 363 depicted in FIG. 3) that is in the second polarization state and that is incident on the broad-band polarizer at normal incidence. The fourth infrared wavelength range includes the first infrared wavelength range (e.g., wavelength range 361 depicted in FIG. 3 or the wavelength range of the passband 769). In some embodiments, a notch polarizer is formed from combining a high pass polarizer and a low pass polarizer.

Figure 8:
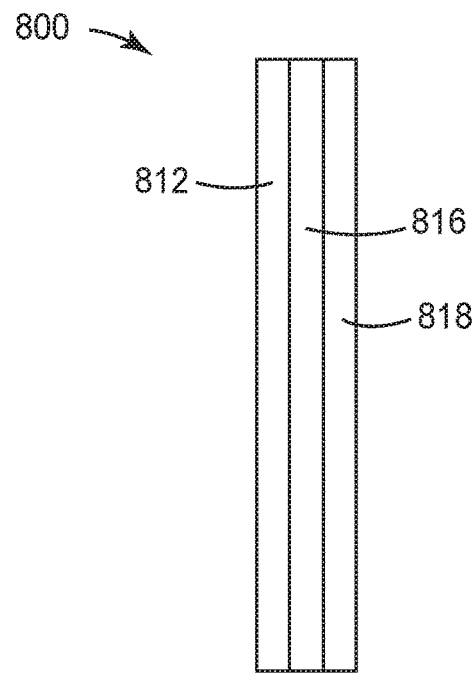
FIG. 8 is a cross-sectional view of an optical filter including include first, second and third layers.

FIG. 8 is a cross-sectional view of optical filter 800 which include first, second and third layers 812, 816 and 818, respectively. In some embodiments, any one of the first, second and third layers 812, 816 and 818 is a visible light blocking filter and any other one of the first, second and third layers 812, 816 and 818 is a polarizer. In some embodiments, the remaining layer is a notch filter, a retarder or a directional control element. The layers can be arranged in any suitable order. For example, in some embodiments first layer 812 is a visible light blocking filter, second layer 815 is a polarizer, and third layer 818 is a retarder or a directional control element. In other embodiments, a fourth layer (not illustrated) is included and one of the four layers is a visible light blocking filter, one layer is a polarizer, one layer is a notch filter, and one layer is a retarder. In still other embodiments, a fifth layer (not illustrated) is included where the fifth layer is a directional control element and the other four layers are as previously described. In some embodiments, the directional control element is refractive (e.g., a lens array) and may be configured to alter a degree of collimation of light (e.g., provides a partial collimation). In some embodiments, the directional control element is a louver film which blocks light at high angle of incidence from being transmitted through the directional control element. In still other embodiments, the directional control element has a curved surface (e.g., a lens with a curved surface) and the visible light blocking filter and the polarizer are disposed on the curved surface. In still other embodiments, the directional control element is a multilayer optical film with a pass band that limits angles of incidence of light that can pass through the directional control element due to the shift of the pass band with incidence angles.

Any of the first, second and third layers 812, 816 and 818 may include a plurality of sub-layers. For example, one or more of the first, second and third layers 812, 816 and 818 may be or may include a multilayer optical film having alternating layers. In some embodiments, the optical filter 800 includes a polarizer, a visible light blocking filter, and one, two or all three of a notch filter, a retarder and a directional control element.

In some embodiments, the optical filter includes a retarder. The retardation of the retarder can be selected to be any suitable value depending on the desired application of the optical filter. In some embodiments, the retarder is a quarter-wave or a half-wave retarder at a wavelength in the first infrared wavelength range. In some embodiments, the retarder is a quarter-wave retarder at a wavelength in the first infrared wavelength range and is a half-wave retarder at a wavelength in the visible wavelength range. For example, a retarder which has a retardance of 250 nm at a wavelength of 1000 nm may have a retardance of approximately 250 nm at a wavelength of 500 nm, though the retardance can shift with wavelength due to the dependence of the refractive indices on wavelength. This has been found to be useful in optical systems where a visible light signal (e.g., transmitted through a passband in the visible light blocking filter) transmitted through an optical filter has a different polarization state than near infrared light when incident on a sensor. In some embodiments, the retarder is a patterned retarder and has a patterned retardation and/or fast axis orientation.

Figure 9:
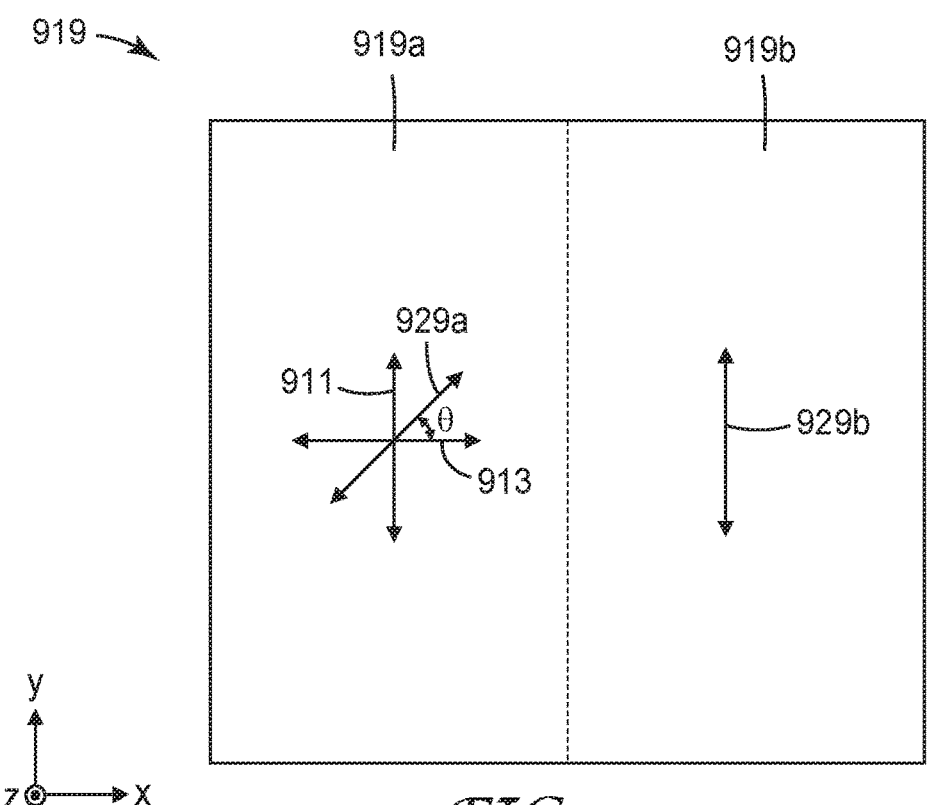
FIG. 9 is a front view of a patterned retarder.

FIG. 9 is a front view of patterned retarder 919 having first and second portions 919a and 919b. The patterned retarder 919 can be used with a polarizer in an optical filter of the present description. In some embodiments, the polarizer has a pass axis 913 and a block axis 911; these axes are illustrated on the patterned retarder 919. The patterned retarder 919 has a first fast axis 929a in the first portion 919a and a second fast axis 929b in the second portion 919b. The first fast axis 929a is at an angle of θ from the pass axis 913. In some embodiments, θ is about 45 degrees (e.g., within 5 degrees of 45 degrees). The second fast axis 929b is perpendicular to the pass axis 913. In other embodiments, the second fast axis 929b is parallel to the pass axis 913. The first portion 919a has a first retardance at a wavelength in the first infrared wavelength range (for example, at the wavelength 0.5(λa+λb) in FIG. 4) and second portion 919b has a second retardance at this same wavelength. In some embodiments, the first and second fast axes 929a and 929b are not parallel. In some embodiments, the first and second retardances are not equal. In some embodiments, the first and second fast axes 929a and 929b are not parallel and the first and second retardances are not equal. As used herein the retardance refers to the in-plane retardance. The in-plane retardance is the refractive index along the slow axis (axis along which the in-plane refractive index is highest) at the wavelength in the first infrared range minus the refractive index along the fast axis (axis along which the in-plane refractive index is lowest) at the wavelength in the first infrared wavelength. In some embodiments, the patterned retarder includes two portions as illustrated in FIG. 9, and in other embodiments, the patterned retarder includes more than two portions.

Patterned retarders can be made using the Light Controlled Molecular Orientation (LCMO) technology of ROLIC Technologies Ltd. (Allschwil, Switzerland), for example. LCMO technology allows molecules to be aligned into photoalignment layers in predefined ways by irradiating the layers with polarized light. Such layers can be patterned by spatially varying the polarization direction used in forming the photoalignment layers. This results in a retarder having a spatially varying fast axis direction. Portions of the photoalignment layer can be omitted or unaligned when it is desired that some portions of a patterned retarder layer to have low or substantially no retardance. A retarder may be said to have substantially no retardance is the retardance does not significantly affect the functioning of an optical device including the retarder. For example, a retarder having a retardance of 0.01 or less may be described as having substantially no retardance. A patterned retarder having portions with substantially no retardance can be combined with an unpatterned retarder to provide a retarder having both a spatially varying retardance and a spatially varying fast axis orientation. Suitable methods for producing patterned retarders are described in U.S. Pat. No. 7,375,888 (Moia) and PCT Pub. No. WO 2015/150295 (Schmitt et al.), for example, both of which are hereby incorporated herein by reference to the extent that they do not contradict the present description.

Figure 10A:
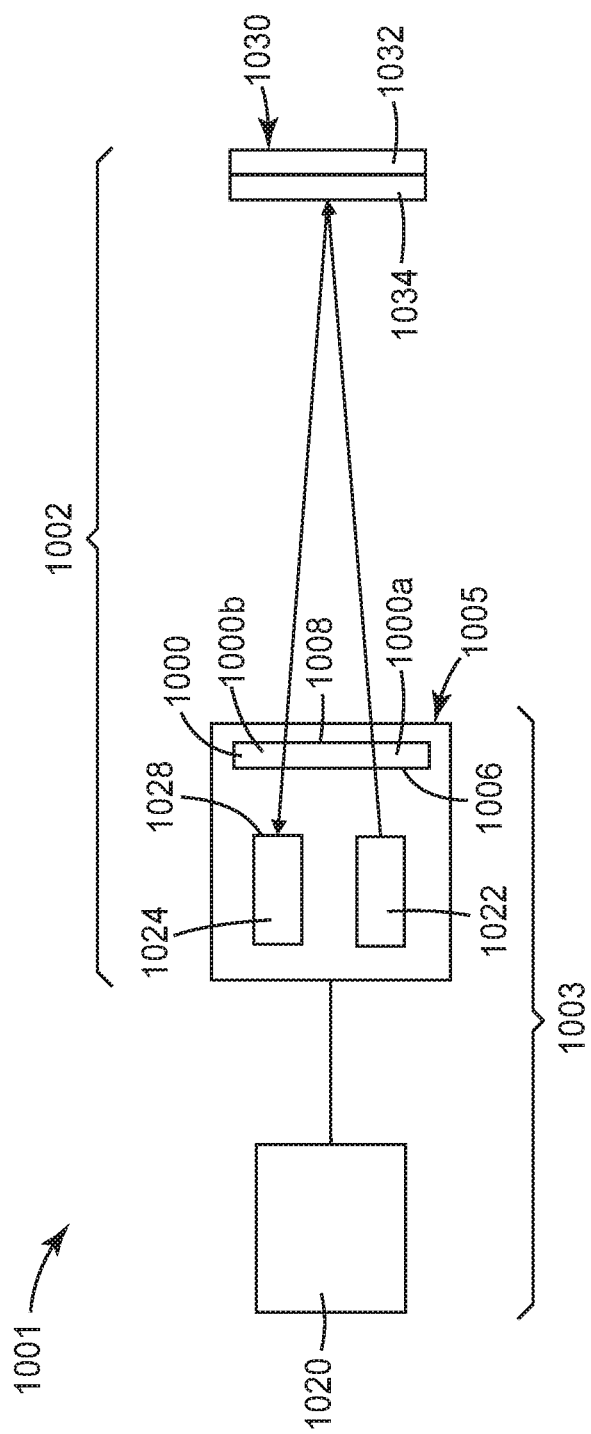
FIG. 10A is a schematic illustration of an optical system.

FIG. 10A is a schematic illustration of optical system 1001 which includes optical device 1005, processor 1020 and near-infrared marker 1030. In some embodiments, marker 1030 is polarization preserving, polarization rotating, depolarizing or phase shifting. Marker 1030 can be any object (e.g., a white tee shirt, reflective tape, markers in a sign, license plates such as retroreflective license plates, etc.) which at least partially reflects near infrared light back to the optical device 1005. In some embodiments, marker 1030 is a retroreflector, which may be a polarization preserving retroreflector, a polarization rotating retroreflector, or a depolarizing retroreflector. In some embodiments, marker 1030 includes a retroreflector 1032 and a layer 1034. In some embodiments, the layer 1034 is a retarder such as a quarter-wave retarder at a wavelength in the first infrared wavelength range. In some embodiments, layer 1034 is an optical filter according to the present description and marker 1030 is a near-infrared marker. Optical device 1005 include optical filter 1000, which may be any of the optical filters of the present description; near-infrared light source 1022 disposed to transmit light through optical filter 1000; and sensor 1024 disposed such that light entering aperture 1028 of the sensor 1024 passes through the optical filter 1000. Optical filter 1000 is in optical communication with each of the near-infrared light source 1022, the marker 1030 and the sensor 1024. The optical device 1005 together with the marker 1030 may be considered to be an optical system 1002, and the optical device 1005 together with the processor 1020 may be considered to be an optical system 1003. Optical filter 1000 has a first side 1006 and an opposing second side 1007. The sensor 1024 is disposed adjacent to and facing the first side 1006 and the near-infrared light source 1022 is disposed adjacent the sensor 1024 and adjacent to and facing the first side 1006. Optical filter 1000 includes first and second portions 1000a and 1000b.

As used herein, polarization preserving and polarization rotating refer to the effect of the marker on linearly polarized light. Polarization preserving means that linearly polarized light at normal incidence is reflected in the same polarization state. Phase shifting means that linearly polarized light at normal incidence is reflected in a polarization state different from that of the incident light. Polarization rotating means that linearly polarized light at normal incidence is reflected in an orthogonal polarization state. Depolarizing means that linearly polarized light at normal incidence is reflected, at least in part, in a mixture of random polarized and unpolarized states. Conventional polarization preserving reflectors will reflect right hand circularly polarized light at normal incidence as left hand circularly polarized light. A retarder can be included in a polarization preserving reflector to make a polarization rotating reflector which rotates linearly polarized light and results in right hand circularly polarized light at normal incidence reflecting as right hand circularly polarized light, for example.

In some embodiments, light emitted from optical device 1005 towards marker 1030 is circularly polarized light. In applications in driver assistance systems, for example, this can be advantageous since marker 1030 (which can be a pedestrian, or clothing worn by a pedestrian, or a retroreflector in a sign or license plate, for example) can be 10 meters or more, for example, from optical device 1005 (which can be in a car) and the near infrared light from optical device would need to propagate through this distance. In some cases, it may be desired for this light to retain its polarization state as it propagates. However, fog and the like (smoke, smog, dust, etc.) is more depolarizing for linear polarized near infrared light than it is for circularly polarized near infrared light. In this case, circular polarized near infrared light is therefore more likely to maintain its polarization state as it propagates from the optical device 1005 to the marker 1030.

Figure 10B:
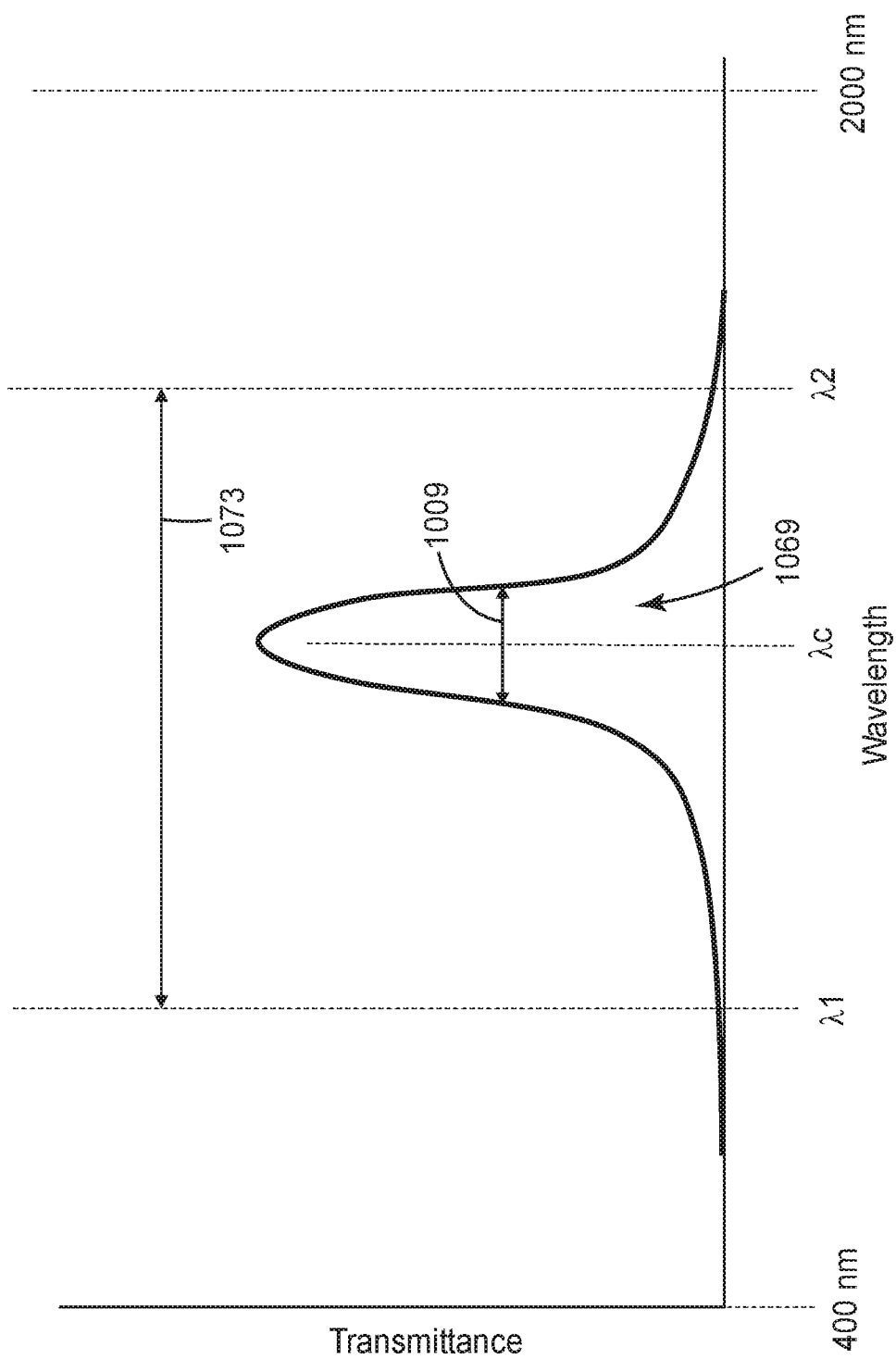
FIG. 10B illustrates a light output spectrum from a near-infrared light source.

As illustrated in FIG. 10B, in some embodiments, the near-infrared light source 1022 is configured to emit light in a band 1069 that has a full-width at half maximum bandwidth 1009 of no more than 60 nm. The sensor 1024 may have a spectral range significantly wider than the bandwidth 1009. For example, the sensor 1024 may have a spectral range 1073 from $\lambda 1$ to $\lambda 2$. In some embodiments, the sensor 1024 has a spectral range 1073 at least from 600 nm to 1000 nm. In some embodiments, the sensor 1024 has a spectral range 1073 from 400 nm to 1200 nm. In some embodiments, the optical filter 1000 is configured to provide a near-infrared passband (e.g. passband 469 depicted in FIG. 4) for light having the first polarization state where the near-infrared passband includes the first infrared wavelength range (e.g., wavelength range 461 depicted in FIG. 4) and has a full-width at half-maximum bandwidth (e.g., $\lambda b - \lambda a$ depicted in FIG. 4) greater than or equal to the full-width at half maximum bandwidth 1009 of the near-infrared light source 1022. In some embodiments, the full-width at half-maximum bandwidth of the near-infrared passband is no more than twice the full-width at half maximum bandwidth 1009 of the near-infrared light source 1022. In some embodiments, the band 1069 is centered at a wavelength $\lambda c$ of about 850 nm, or about 880 nm, or about 940 nm. In some embodiments, the near infrared light source is configured to emit light in a plurality of near infrared wavelength ranges. For example, in two or more bands having a full-width at half maximum bandwidth of no more than 100 nm. In some embodiments, two or more relatively wide bands within the near infrared may be emitted by the near infrared light source with a gap between the two bands. Utilizing a plurality of near infrared bands allows wavelengths where fog and the like has a high depolarizing effect to be avoided while still allowing for a range of wavelengths to be used.

In some embodiments, the optical filter 1000 is configured such that light from the near-infrared light source 1022 which is transmitted through first portion 1000a and exits the optical device 1005 and reflects from fog, for example, back towards optical device 1005 is incident on second portion 1000b in the second polarization state and so is substantially blocked from entering sensor 1024, while light from the near-infrared light source 1022 which exits the optical device 1005 and reflects from the marker back towards optical device 1005 is incident on second portion 1000*b* in the first polarization state and enters sensor 1024. This can be achieved by suitable selection of a retarder included in optical filter 1000 and the layer 1034 included in marker 1030. For example, in some embodiments, first portion 1000*a* transmits near-infrared light having a first linear polarization and second portion 1000*b* transmits light having an orthogonal second linear polarization. This can be achieved by incorporating a patterned retarder in optical filter 1000 as described further elsewhere herein. Light emitted from the device 1005 and reflected from fog, for example, is then incident on the second portion 1000*b* in the second linear polarization state (the block state). In this case, at least some light reflected from a reflecting object that is polarization rotating or depolarizing will enter sensor 1024. Marker 1030 can be made polarization rotating by making layer 1034 a quarter-wave retarder at a wavelength emitted by near-infrared light source 1022. In this case, marker 1030 may be described as a polarization rotating retroreflector. In other embodiments, marker 1030 is a depolarizing retroreflector and in still other embodiments, the layer 1034 is either omitted or is not a retarder and marker 1030 is a polarization preserving retroreflector. In some embodiments, layer 1034 is a retarder included in marker 1030 to compensate for the intrinsic retardation of the retroreflector 1032.

In some embodiments, light is incident on second portion 1000*b* in a second polarization state that is not perfectly linear or circular and some light can enter the sensor. In these cases, this signal can be considered background noise and digitally removed from the signal measured by the sensor in the first polarization (orthogonal) state to improve signal analysis/isolation In some embodiments, the marker 1030 is a depolarizing object that is not necessarily a retroreflector. Clothing such as a tee shirts, or an animal crossing the optical path of light from the near infrared light source are examples of depolarizing objects. In some embodiments, the wavelengths emitted by the near infrared light source are selected such that the marker depolarizes more strongly than fog, smog, dust or the like, so that the depolarized signal detected from the marker is larger than depolarized signals reflected from fog and the like. First portion 1000*a* of optical filter 1000 receives light from the light source 1022 which is transmitted through the first portion 1000*a* to the marker 1030 and is then reflected from marker 1030 back towards device 1005. The light then passes through the second portion 1000*b* of the optical filter 1000 and is transmitted into sensor 1024. In some embodiments, the retarder in the first portion 1000*a* has a first retardance and the retarder in the second portion 1000*b* has a different second retardance. In some embodiments, an absolute value of a difference between the first retardance and the second retardance at a wavelength in the first infrared wavelength range is half of the wavelength. In some embodiments, the retarder in the first portion 1000*a* has a first fast axis and the retarder in the second portion 1000*b* has a second fast axis not parallel to the first fast axis. In some embodiments, the retarder in the first and second portions 1000*a* and 1000*b* have a same retardance, the retarder in the first portion 1000*a* has a first fast axis and the retarder in the second portion 1000*b* has a second fast axis not parallel to the first fast axis. In some embodiments, the retarder in one of the first and second portions 1000*a* and 1000*b* has a fast axis at an angle of about 45 degrees (e.g., within 5 degrees of 45 degrees) from a pass axis of the polarizer and has a half-wave retardance at a wavelength in the first infrared wavelength range, and retarder in the other of the first and second portions either has substantially no retardance at the wavelength in the first infrared wavelength range or has a fast axis substantially parallel (e.g., within 5 degrees of parallel) or substantially perpendicular (e.g., within 5 degrees of perpendicular) to the pass axis.

In some embodiments, the optical filter 1000 does not include a retarder and in some embodiments, the optical filter includes an un-patterned retarder that has a same retardance and a same fast axis in the first and second portions 1000*a* and 1000*b*. In some embodiments, the retarder is disposed adjacent the polarizer opposite the first side 1006 of the optical filter. For example, referring to FIG. 8, in some embodiments first layer 812 is a visible light blocking filter disposed at the first side of the optical filter 800, second layer 816 is a polarizer and third layer 818 is a retarder disposed adjacent the polarizer opposite the first side. In some embodiments, the first and second polarization states of the polarizer are linear polarization states and the retarder is a quarter-wave retarder at a wavelength in the first infrared wavelength range.

Any of optical systems 1001, 1002 or 1003 may be a medical diagnostic system, a garage door opening system, or a driver assistance system. A medical diagnostic system may include optical device 1005, for example, to illuminate an area of a patient's skin with near-infrared light (and optionally light in a visible passband such as passband 668 depicted in FIG. 6) and measure the reflected near infrared light (and optionally reflected visible light in the passband) and use this information in processor 1020 to determine pulse or hemoglobin content, for example. The optical measurement of hemoglobin content is described in "Non-invasive optical real-time measurement of total hemoglobin content", Timm et al., Procedia Engineering 5 (2010) 488-491, for example. A garage door opening system may include optical device 1005 and marker 1030 to detect whether or not someone is in an entry of an open garage door so that the door should not close for safety concerns. A driver assistance system may include optical device 1005 and processor 1020 in a vehicle and marker 1030 may be a pavement marker or a marker in a sign, for example. The use of optical components in driver assistance systems are generally described in U.S. Pat. No. 5,765,116 (Wilson-Jones et al.), U.S. Pat. No. 6,243,015 (Yeo), U.S. Pat. No. 7,873,187 (Schofield et al.), U.S. Pat. No. 6,693,524 (Payne), U.S. Pat. No. 6,727,807 (Trajkovic et al.), U.S. Pat. No. 8,519,837 (Kirsch et al.), U.S. Pat. No. 7,834,905 (Hahn et al.), U.S. Pat. No. 8,636,393 (Schofield), U.S. Pat. No. 9,179,072 (Stein et al.), U.S. Pat. No. 7,289,019 (Kertes), and U.S. Pat. No. 6,452,148 (Bendicks et al.); U.S. Pat. App. Pub. Nos. 2009/0254260 (Nix et al.), 2016/0111005 (Lee), and 2016/0114720 (Schlaug et al.); and EP Pub. No. 1437615 (Bierleutgeb) each of which are incorporated by reference herein to the extent that they do not contradict the present description. The driver assistance system may include one or more of a night vision system, a parking assistance system, a blind spot detection system, an electronic stability control system, a drowsy driver detection system, an adaptive headlight system, a rain detection system, an adaptive cruise control system, a lane departure warning system, a collision avoidance system, and a backup camera system.

Figure 10C:
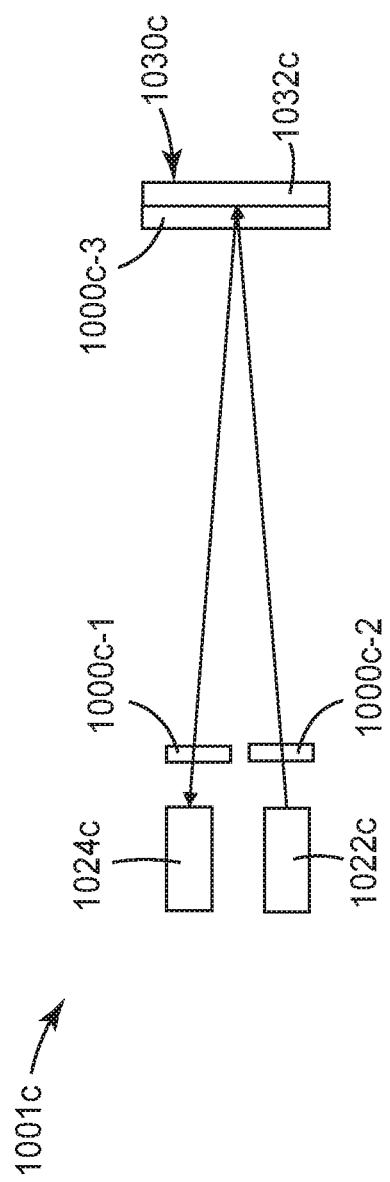
FIG. 10C is a schematic illustration of an optical system.

As illustrated in FIG. 10C, in some embodiments, an optical system 1001*c* includes a near infrared light source 1022*c*, a sensor 1024*c* and a marker 1030*c*, and a light path extending from the near infrared light source 1022*c* to the marker 1030c and then to the sensor 1024c intersects at least one optical filter, or at least two optical filters, according to according to the present description (e.g., any one, two or all three of elements 1000c-1 1000c-2 and 1000c-3 may be an optical filter of the present description). Element 1000c-2 may be included with the near infrared light source 1022c (in a common housing, for example) and may be considered to be a component of near infrared light source 1022c. Similarly, element 1000c-1 may be included with sensor 1024c (in a common housing, for example) and may be considered to be a component of 1024c. In some embodiments, one of elements 1000c-1 1000c-2 and 1000c-3 is an optical filter according to the present description and a different one of one of elements 1000c-1 1000c-2 and 1000c-3 is a second polarizer having a pass state aligned with the pass state or aligned with the block state of the optical filter. The remaining element of 1000c-1 1000c-2 and 1000c-3 may be a third polarizer, may be a retarder, or may be omitted. For example, elements 1000c-1 and 1000c-2 may include crossed polarizers and element 1000c-3 may be a quarter wave retarder at a near infrared wavelength.

In some embodiments, an optical system includes a near infrared light source, a sensor and a marker, where the near infrared light source is adapted to produce unpolarized light and direct the unpolarized light to the marker, one of the sensor and the marker includes an optical filter of the present description, and the other of the sensor and the marker includes a second polarizer. The second polarizer may or may not be a component of a second optical filter according to the present description. In some embodiments, the first polarization state is a linear polarization state having a first pass axis, and the second polarizer has a second pass axis substantially orthogonal to the first pass axis. In some embodiments, the second polarizer is configured to transmit at least 60 percent of light in the first infrared wavelength range that is incident on the second polarizer at normal incidence in the second polarization state and to transmit less than 30 percent of light in the second infrared wavelength that is incident on the second polarizer at normal incidence in the first polarization state. In some embodiments, the first and second polarization states are circular polarization states and in some embodiments, the first and second polarization states are linear polarization states.

In some embodiments, an optical system includes a near infrared light source, a sensor and a marker where one of the near infrared light source and the sensor includes an optical filter of the present descriptions and the other of the near infrared light source and the sensor includes a second polarizer which may or may not be a component of a second optical filter according to the present description. In some embodiments, the first polarization state is a linear polarization state having a first pass axis. In some embodiments, the second polarizer has a second pass axis substantially orthogonal to the first pass axis. In some embodiments, the second polarizer has a second pass axis substantially parallel to the first pass axis. In some embodiments, the second polarizer is configured to transmit at least 60 percent of light in the first infrared wavelength range that is incident on the second polarizer at normal incidence in the second polarization state and to transmit less than 30 percent of light in the second infrared wavelength that is incident on the second polarizer at normal incidence in the first polarization state. In some embodiments, the first and second polarization states are circular polarization states and in some embodiments, the first and second polarization states are linear polarization states.

The marker can be depolarizing (e.g., a tee shirt), polarization preserving, or polarization rotating (e.g., including a quarter-wave retarder a quarter-wave retarder at a wavelength in the first infrared wavelength range). In some embodiments, the marker is a phase shifting marker adapted to receive circularly polarized light and reflect the received light as a linearly polarized light. The marker may include an infrared polarizer (e.g., a polymeric multilayer near infrared reflective polarizer, which may be a linear polarizer of may include a retarder and may be a circular polarizer) and a visible light blocking filter. Such markers can provide unique optical signatures that can be identified by an optical device including the near infrared light source and the sensor.

The following table summarizes various system configurations that have been found to be useful. The entries "Linear" or "Circular" indicate that polarizers are present on the indicated components. The column "Crossed" indicates whether the polarizers have orthogonal pass states (crossed) or have the same pass state (not crossed). The marker may or may not include a polarizer. The marker may be polarization preserving, depolarizing, polarization rotating or phase shifting. Configurations 1 and 2 have been found to be useful in providing unique optical signatures to the sensor. The polarizer included in the marker can be a near infrared reflective polarizer with a visible light blocking filter. Configurations 3 and 7 are useful for detecting a marker through fog where the marker is a tee-shirt or other article of clothing, for example, which is depolarizing. Such configurations can be useful for detecting pedestrians, for example. In some embodiments, a marker can be depolarizing at near-infrared wavelengths and approximately polarization preserving at visible wavelengths. Configurations 4, 6 and 9 can be used to detect a maker that appears dark in a brighter background. (Note that a polarization rotating marker rotates the polarization of linearly polarized light, but can counter the usual reversal of left hand right hand circular polarization states). Configurations 5 and 8 can be used to block noise and detect reflected light whose polarization state has been rotated (either by a polarization rotating maker or by the usual reversal of left hand right hand circular polarization states under reflection). In configuration 10, the marker can provide a phase shift under reflection that is not given by a typical quarter-wave or half-wave retarder. For example, a phase shifting marker can be adapted to reflect received circularly polarized light as linearly polarized light. In some embodiments, a marker is a phase shifting marker which does not include a retarder. For example, a bead coated retroreflector having a metal backing will give a 180 degree phase shift upon reflection. One or both of the polarizers included in the various configurations are optical filters of the present description. Either or both polarizers or a filter included in the marker may be broadband, edge, notch, or comb filters.

| Configuration | Near infrared light source | Sensor | Marker | Crossed (Yes/No) |
| --- | --- | --- | --- | --- |
| 1 | Unpolarized | Linear | Linear | Yes |
| 2 | Unpolarized | Circular | Circular | Yes |
| 3 | Linear | Linear | Depolarizing | Yes |
| 4 | Linear | Linear | Polarization preserving | Yes |
| 5 | Linear | Linear | Polarization rotating | Yes |
| 6 | Linear | Linear | Polarization rotating | No |

| Configuration | Near infrared light source | Sensor | Marker | Crossed (Yes/No) |
| --- | --- | --- | --- | --- |
| 7 | Circular | Circular | Depolarizing | Yes |
| 8 | Circular | Circular | Polarization preserving | Yes |
| 9 | Circular | Circular | Polarization rotating | Yes |
| 10 | Circular | Circular | Phase shifting | Yes |

In some embodiments, markers described as depolarizing, polarization preserving, polarization rotating, or phase shifting, may be depolarizing, polarization preserving, polarization rotating, or phase shifting in some portions of the marker and may have other polarization properties in other portions of the marker.

In some cases, the type of marker may not be known in advance and/or one might wish to identify different types of markers (e.g., pedestrians vs. traffic signs for autonomous vehicles) under different conditions (e.g. fog vs. clear) with a single system. In such cases, more than one sensor and/or more than one near-infrared light source can be utilized. The patterned retarder may include a different portion for each sensor and/or for each light source. For example, a near-infrared light source and a plurality of sensors may be included and a patterned retarder may be included with one portion of the patterned retarder positioned in front of the near-infrared light source and each remaining portion adapted to pass a particular polarization state of reflected light to the associated sensor.

Figure 11:
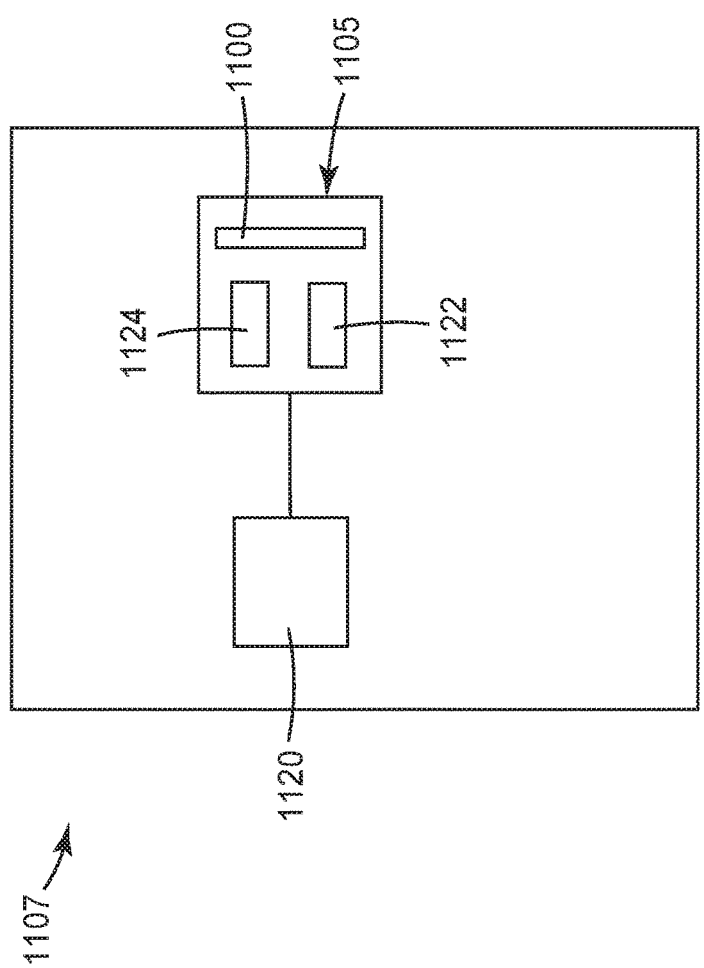
FIG. 11 is a schematic illustration of an optical device or system.

FIG. 11 is a schematic illustration of optical device or system 1107 which includes optical device 1105. Optical device 1105 include optical filter 1100, which may be any of the optical filters of the present description; near-infrared light source 1122; and sensor 1124. Optical device or system 1107 further includes processor 1120. Optical device 1105 may correspond to optical device 1005 described elsewhere herein. Optical device or system 1107 may be a cell phone, a wearable electronic device such as a watch, a medical diagnostic system, a garage door opening system, a driver assistance system, or a component thereof. In some embodiments, optical device or system 1107 is a cell phone or a watch. For example, optical device or system 1107 may be a cell phone or a watch and optical device 1105 may function as a medical diagnostic component configured to determine pulse or hemoglobin content, for example, as described elsewhere herein.

Figure 12:
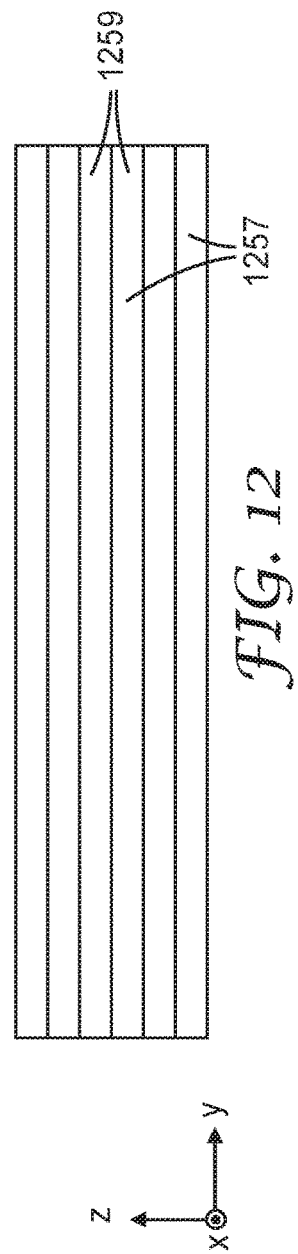
FIG. 12 is a cross-sectional view of a filter including a plurality of alternating first layers and second layers.

FIG. 12 is a cross-sectional view of filter 1213 which includes a plurality of alternating first layers 1257 and second layers 1259. Filter 1213 can be a component of the optical filters of the present description. For example, filter 1213 can be a polarizer, a visible light blocking filter, or notch filter depending on the selection of the first and second layers 1257 and 1259.

In some embodiments, the alternating first and second layers 1257 and 1259 are alternating polymeric layers having different refractive indices. Such polymeric filters (e.g., mirrors or reflective polarizers) are generally described in U.S. Pat. No. 5,882,774 (Jonza et al.); U.S. Pat. No. 5,962,114 (Jonza et al.); U.S. Pat. No. 5,965,247 (Jonza et. al.); U.S. Pat. No. 6,939,499 (Merrill et al.); U.S. Pat. No. 6,916,440 (Jackson et al.); U.S. Pat. No. 6,949,212 (Merrill et al.); and U.S. Pat. No. 6,936,209 (Jackson et al.); for example, each of which is hereby incorporated by reference herein to the extent that it does not contradict the present description. In brief summary, a polymeric multilayer optical film can be made by coextruding a plurality of alternating polymeric layers (e.g., hundreds of layers), uniaxially or substantially uniaxially stretching the extruded film (e.g., in a linear or parabolic tenter) to orient the film in the case of a polarizer or biaxially stretching the film in the case of a mirror.

In some embodiments, the alternating first and second layers 1257 and 1259 are alternating inorganic layers. In this case, the filter 1213 may be referred to as a dielectric mirror. Such dielectric mirrors can be made by depositing alternate low and high index layers of inorganic materials using thin-film deposition techniques known in the art.

In other embodiments, one of the alternating first and second layers 1257 and 1259 are polymeric and the other of the alternating first and second layers 1257 and 1259 are inorganic. For example, an inorganic second layer 1259 can be vapor deposited or sputtered onto a polymeric first layer 1257, then another polymeric first layer 1257 can be coated onto the inorganic second layer 1259. Another inorganic second layer 1259 can then be deposited onto the coated polymeric first layer 1257 and the process repeated until a desired number of layers is formed.

In other embodiments, a filter 1213 having alternating inorganic layers and a different filter 1213 having alternating polymeric layers are placed adjacent each other to form one or more components (e.g., a polarizer, a visible light blocking filter, or notch filter) of the optical filter of the present description. The two filters can be laminated together through an adhesive layer or the inorganic filter can be deposited layer by layer onto the polymeric filter using the methods of U.S. Pat. Pub. No. 2015/0285956 (Schmidt et al.), for example, which is hereby incorporated herein by reference to the extent that it does not contradict the present description.

Whether polymeric or inorganic layers are used, reflection is provided when a pair of adjacent layers (optical repeat unit) has a total optical thickness (physical thickness of a layer times the refractive index of the layer) of half of a wavelength. By adjusting the thickness of the layers through the stack of the layers, a wavelength dependent reflection can be provided. For example, if a notch filter that allows wavelengths in a passband to be transmitted and that reflects wavelengths on either side of the passband is desired, the thickness profile for the notch filter would not include optical repeat units having an optical thickness equal to half a wavelength in the pass band but would include optical repeat units having optical thicknesses equal to half of the wavelengths on either side of the passband. In other words, some of the optical repeat units of a broadband mirror would be omitted to provide the passband.

In some embodiments, alternating first layers 1257 and second layers 1259 are a plurality of alternating polymeric layers and filter 1213 is a linear reflective polarizer. A quarter wave retarder can be used with the linear reflective polarizer to provide a circular mode reflective polarizer. In some embodiments, filter 1213 further includes a retarder having a quarter-wave retardance at a wavelength in the first infrared wavelength range. In some embodiments, an optical filter including a polarizer is provided. The polarizer includes a plurality of alternating polymeric layers and is configured to transmit at least 60 percent of light in a first infrared wavelength range that is incident on the polarizer at normal incidence in a first circular polarization state, and to transmit less than 30 percent of light in a second infrared wavelength that is incident on the polarizer at normal incidence in a second circular polarization state orthogonal to the first polarization state. The polarizer is configured to transmit less than 30 percent of light in a third infrared wavelength range that is incident on the polarizer with a 50 degree angle of incidence in the second circular polarization state. A wavelength range from 700 nm to 2500 nm comprises each of the first and second infrared wavelength ranges. The filter may further include a visible light blocking filter in optical communication with the polarizer, as described elsewhere herein.

EXAMPLES

Component 1

Figure 13:
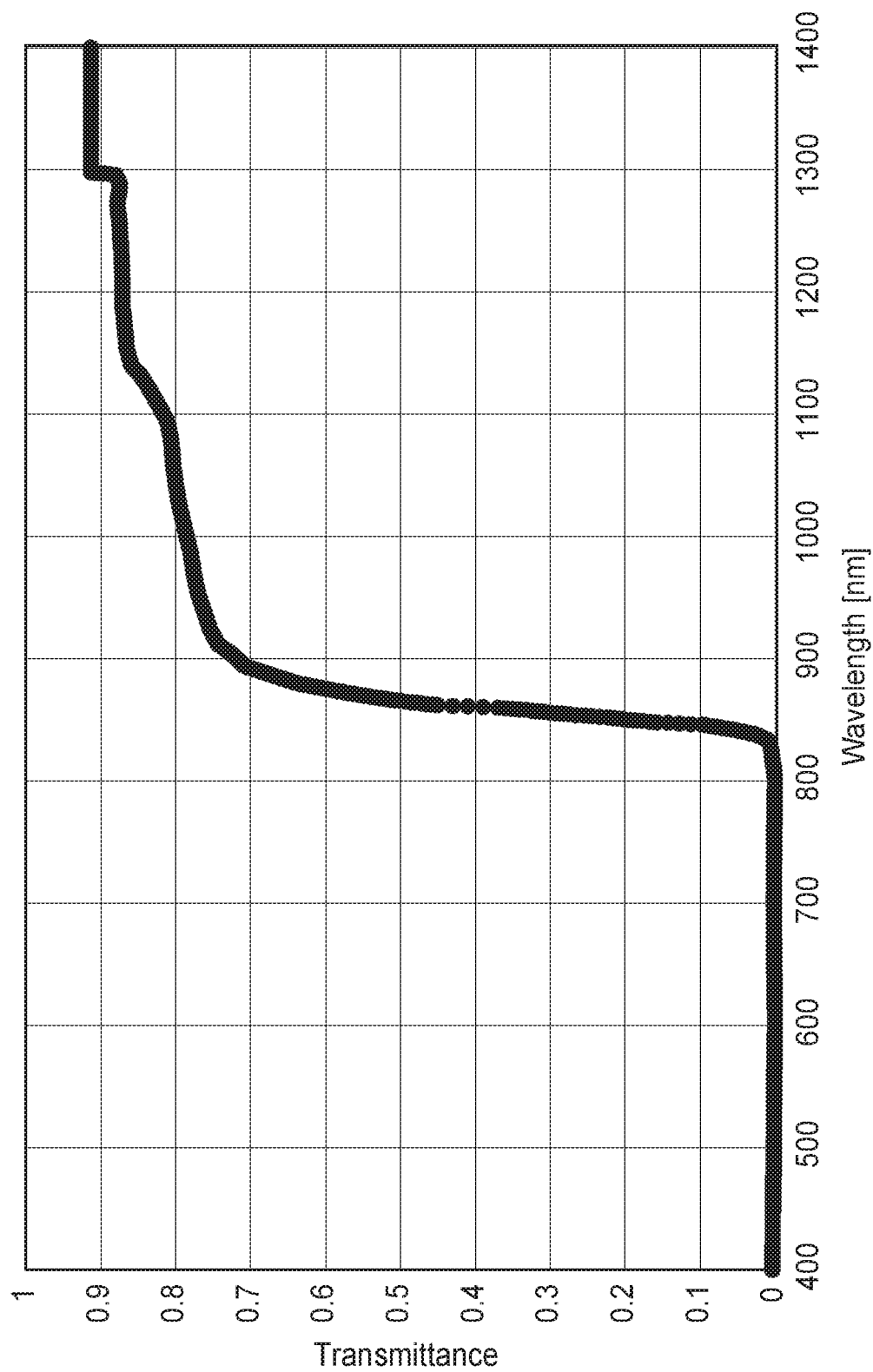
FIG. 13 is a plot of transmittance versus wavelength for unpolarized light at normal incidence on a visible light blocking filter.

A commercially available dye (EPOLIGHT 7527C from Epolin, Newark N.J.) was compounded into a solvent-based screen ink for coating by the dye manufacturer who also measured its transmission. The transmission versus wavelength plot for wavelengths from 400 nm to 1400 nm is shown in FIG. 13.

For all the remaining Components and Examples, each film was modeled as a stack consisting of layers whose thicknesses and refractive indices are known. The refractive index for each film at 633 nm is provided; the dispersion characteristics of each material used are well-known to those skilled in the art. The modeling used the well-known transfer matrix technique for computing transmittance as a function of wavelength. (This is described, for example, in "Optics of anisotropic layered media: a new 4×4 matrix algebra", Pochi Yeh, *Surface Science* 96 (1980) 41-53).

Component 2

Figure 14:
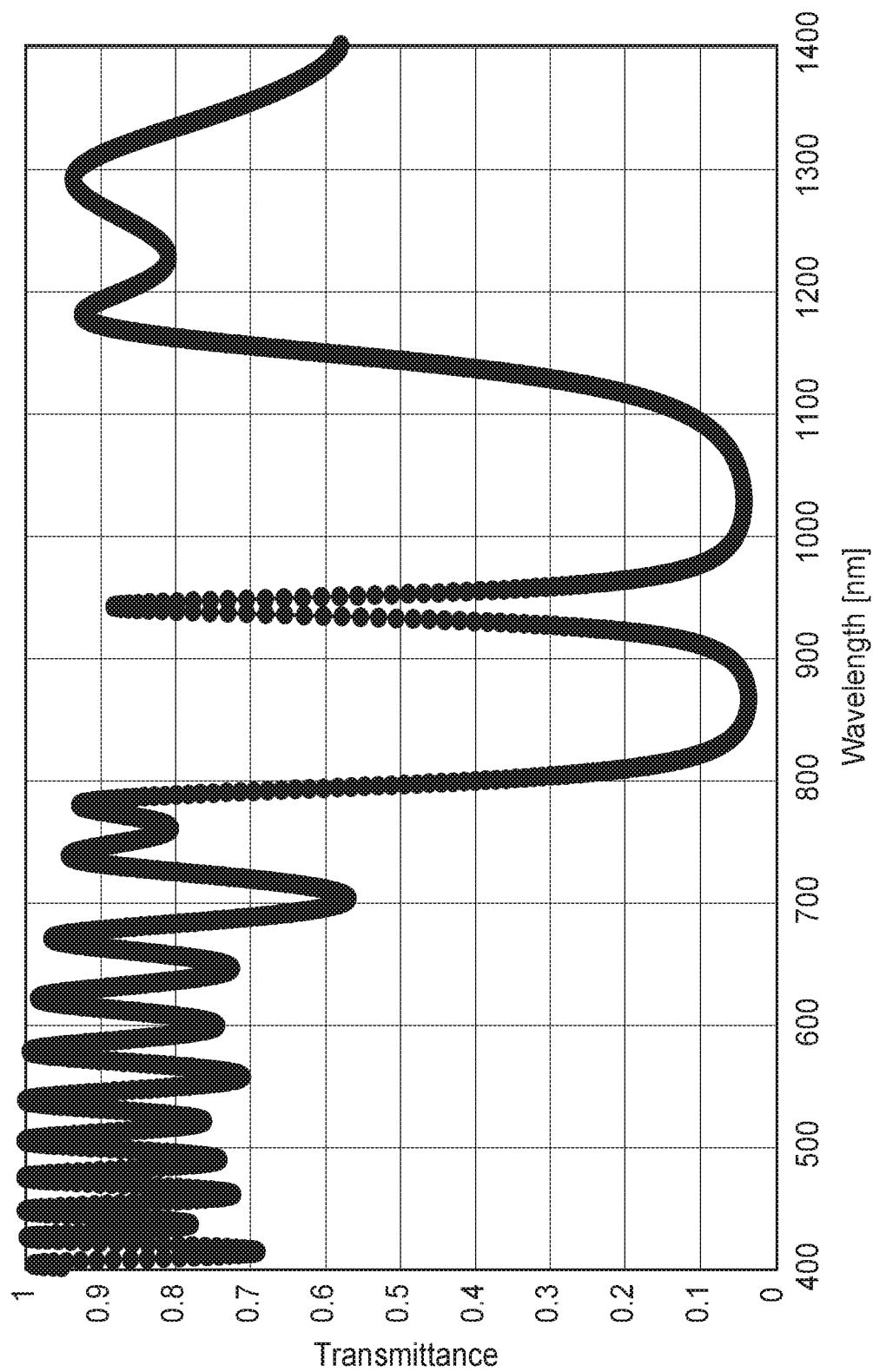
FIGS. 14-15 are plots of transmittance versus wavelength for unpolarized light at normal incidence and a 50 degree angle of incidence, respectively, on a notch filter.
Figure 15:
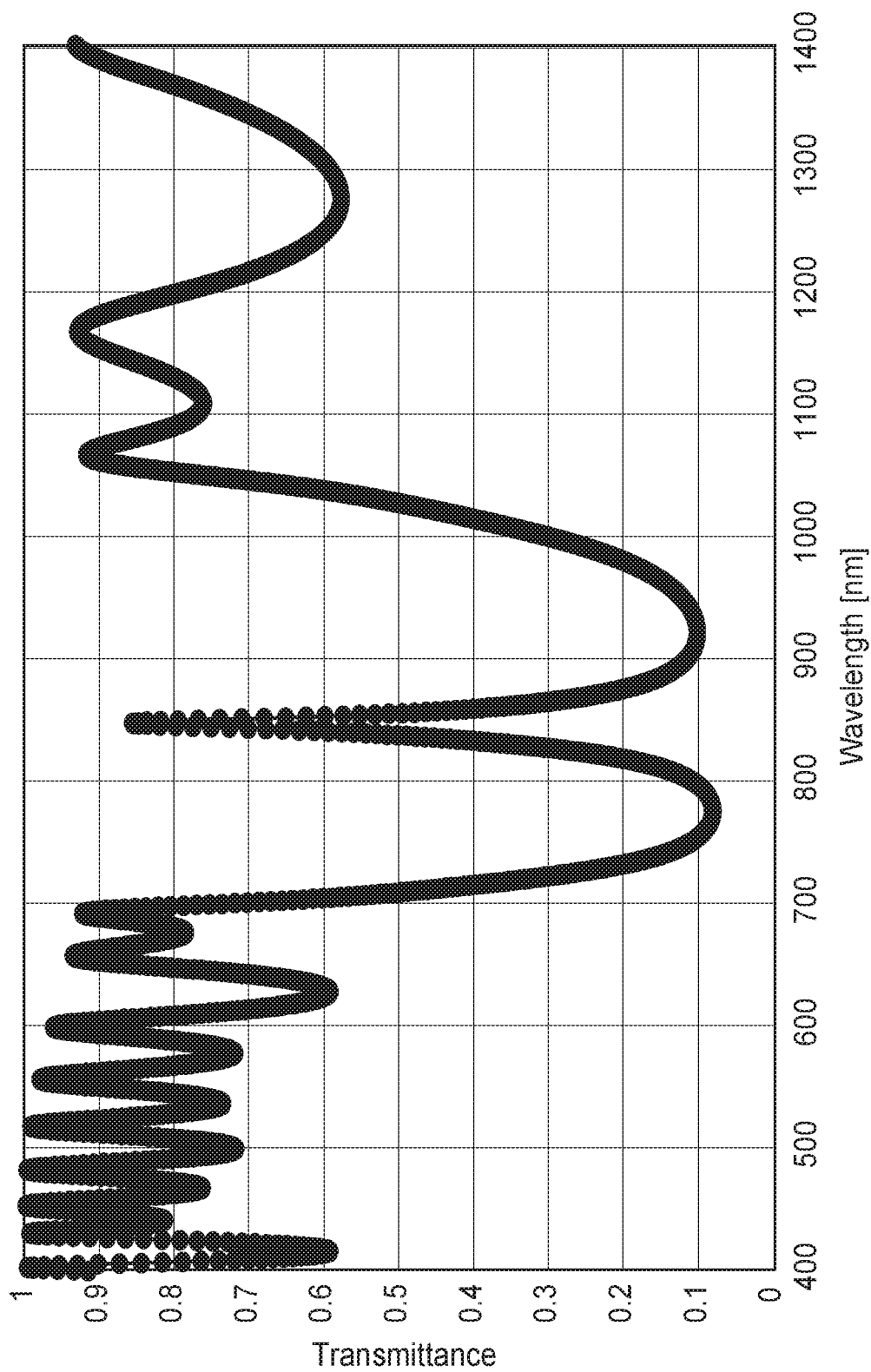

A structure similar to that of a Fabry-Perot interferometer was modeled as a stack of two alternating materials. These were silicon nitride, having a refractive index of 2.031 in x-, y- and z-directions at 633 nm) and Poly(methyl methacrylate) (PMMA), having a refractive index of 1.494 in x-, y- and z-directions at 633 nm). The layers alternated between silicon nitride and PMMA; the first layer—the one nearest the simulated light source—was silicon nitride. There were 15 layers altogether. The silicon nitride layers had a thickness of 115.7 nm, and the PPMA layers were 157.3 nm thick. The exception was the seventh layer, a silicon nitride layer of thickness 235.3 nm. Transmission of light normally incident on the stack (i.e., 0 degree incidence) and at 50 degrees incidence was computed for wavelengths from 400 nm to 1400 nm. This computation assumed that there was no absorption. Transmission as a function of wavelength is shown in FIG. 14 for 0 degrees incidence (i.e., normal incidence) and in FIG. 15 for 50 degree incidence. Component 2 had a near-infrared passband at normal incidence centered at a wavelength of about 940 nn.

Component 3

Figure 16:
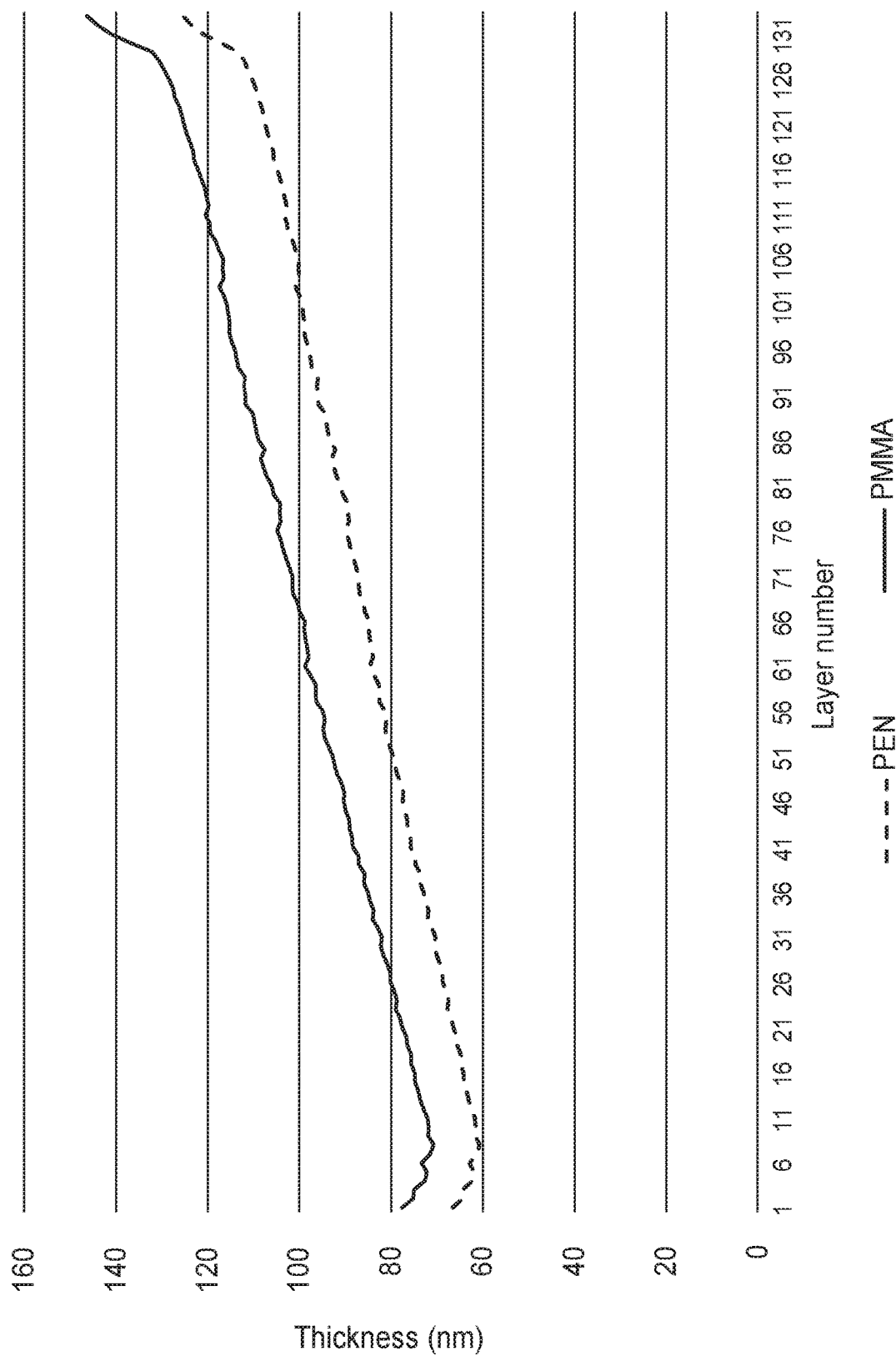
FIG. 16 is a plot showing the thickness profile of a multilayer visible light blocking filter.
Figure 17:
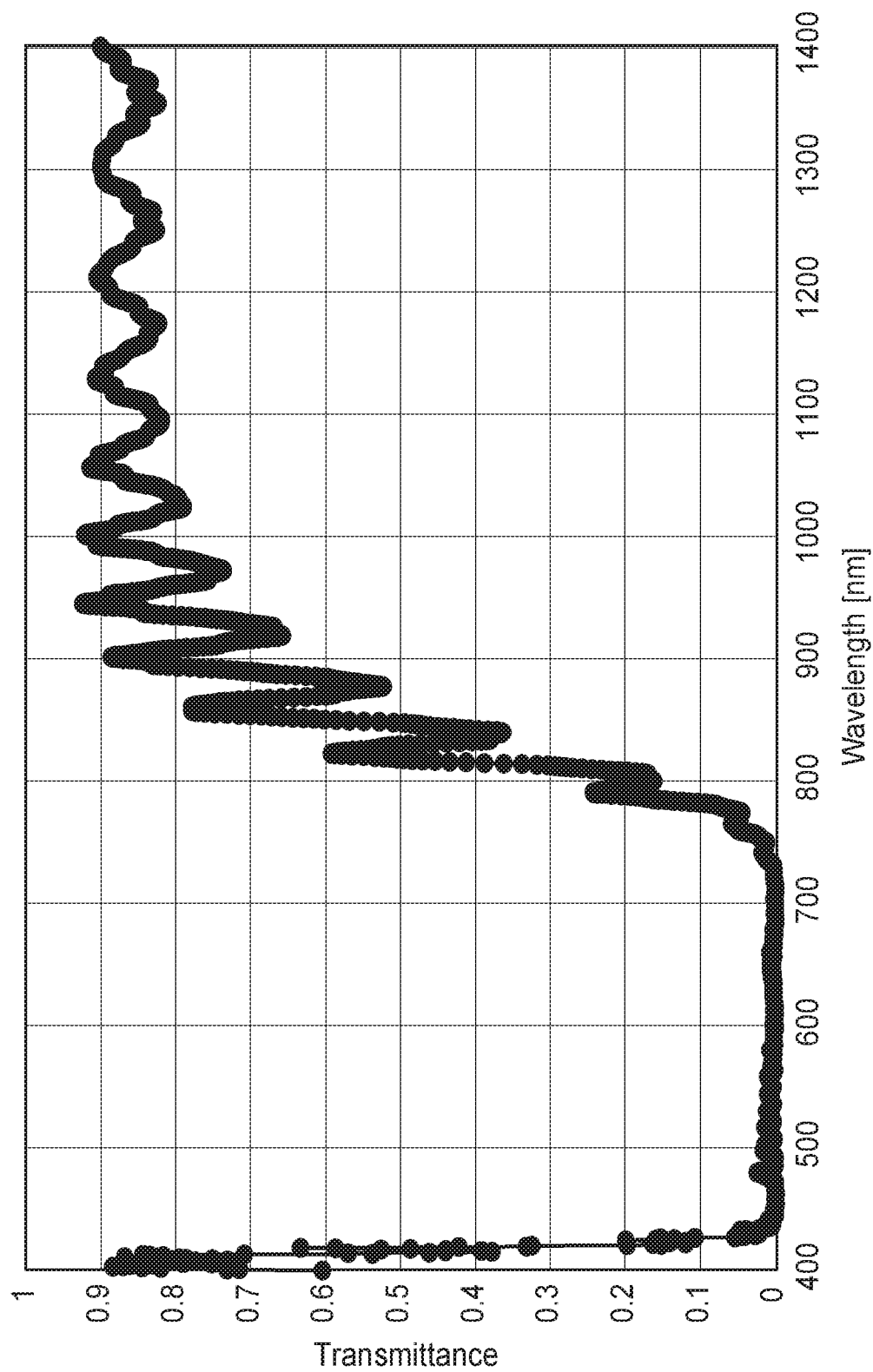
FIGS. 17-18 are plots of transmittance versus wavelength for unpolarized light at normal incidence and a 50 degree angle of incidence, respectively, on the visible light blocking filter of FIG. 16.
Figure 18:
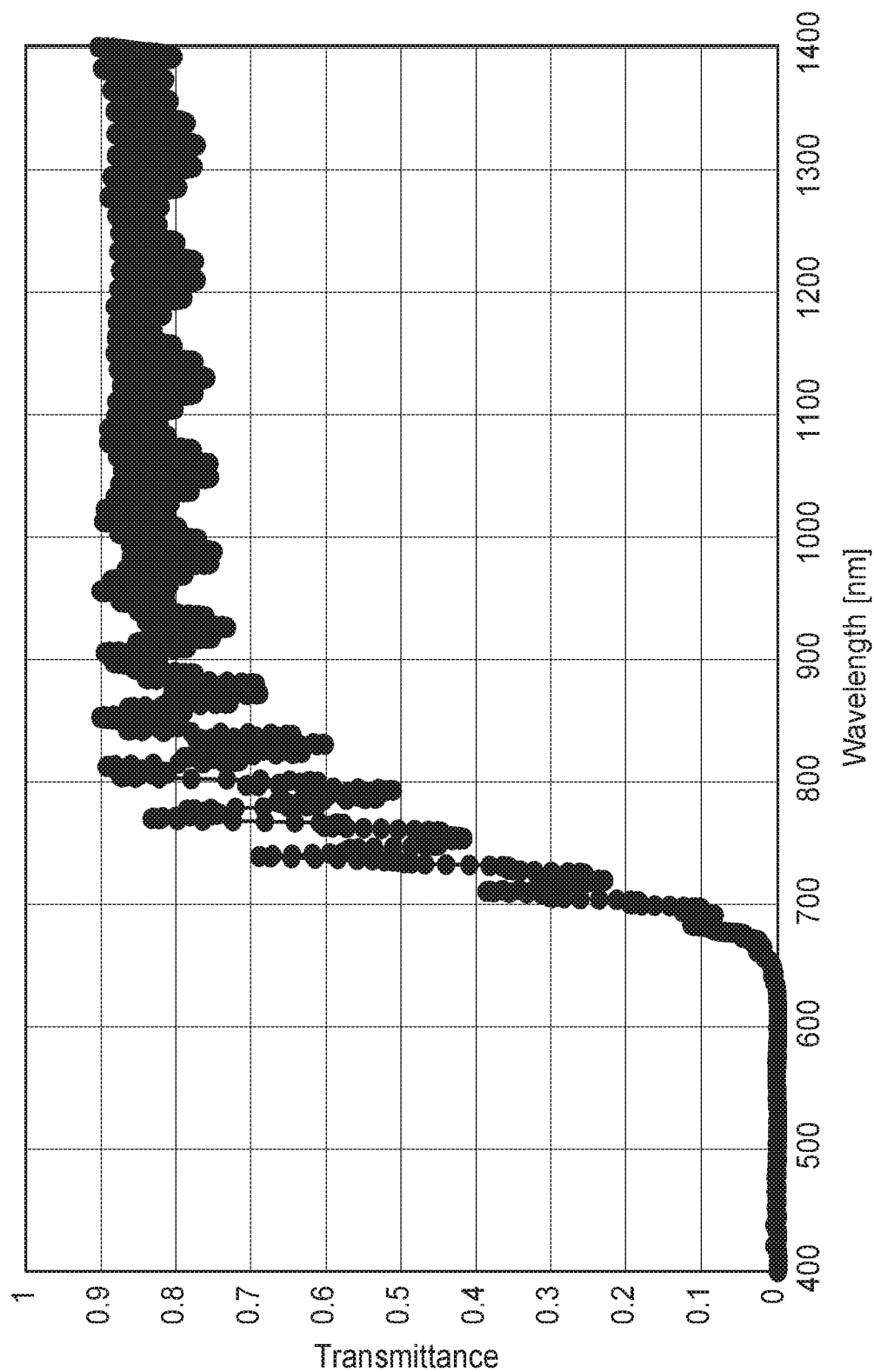

A film stack consisting of 266 layers of layers of alternating polyethylene naphthalate (PEN) and PMMA plus thick PEN skin layers on the top and the bottom was modeled. The PEN layers were modeled as having refractive indices 1.740, 1.752, 1.492 in the x-, y- and z-directions at 633 nm, and an absorption of $4.5 \times 10^{-6}$ in each direction at 633 nm. The PMMA layers were modeled using a refractive index of 1.494 in in x-, y- and z-directions at 633 nm and an absorption of $1 \times 10^{-10}$ in each direction at 633 nm. The top and bottom PEN skin layers were 5000 nm thick. The thickness profiles of the other layers is shown in FIG. 16. The sequence of layers began with the thick skin layer nearest the light source, followed by another PEN layer, and then alternated between PMMA and PEN down to the bottom thick PEN skin layer. Transmission of light normally incident on the stack (i.e., 0 degree incidence) and at 50 degrees incidence was computed for wavelengths from 400 nm to 1400 nm. Transmission as a function of wavelength is shown in FIG. 17 for 0 degrees incidence and in FIG. 18 for 50 degree incidence.

Component 4

Figure 19:
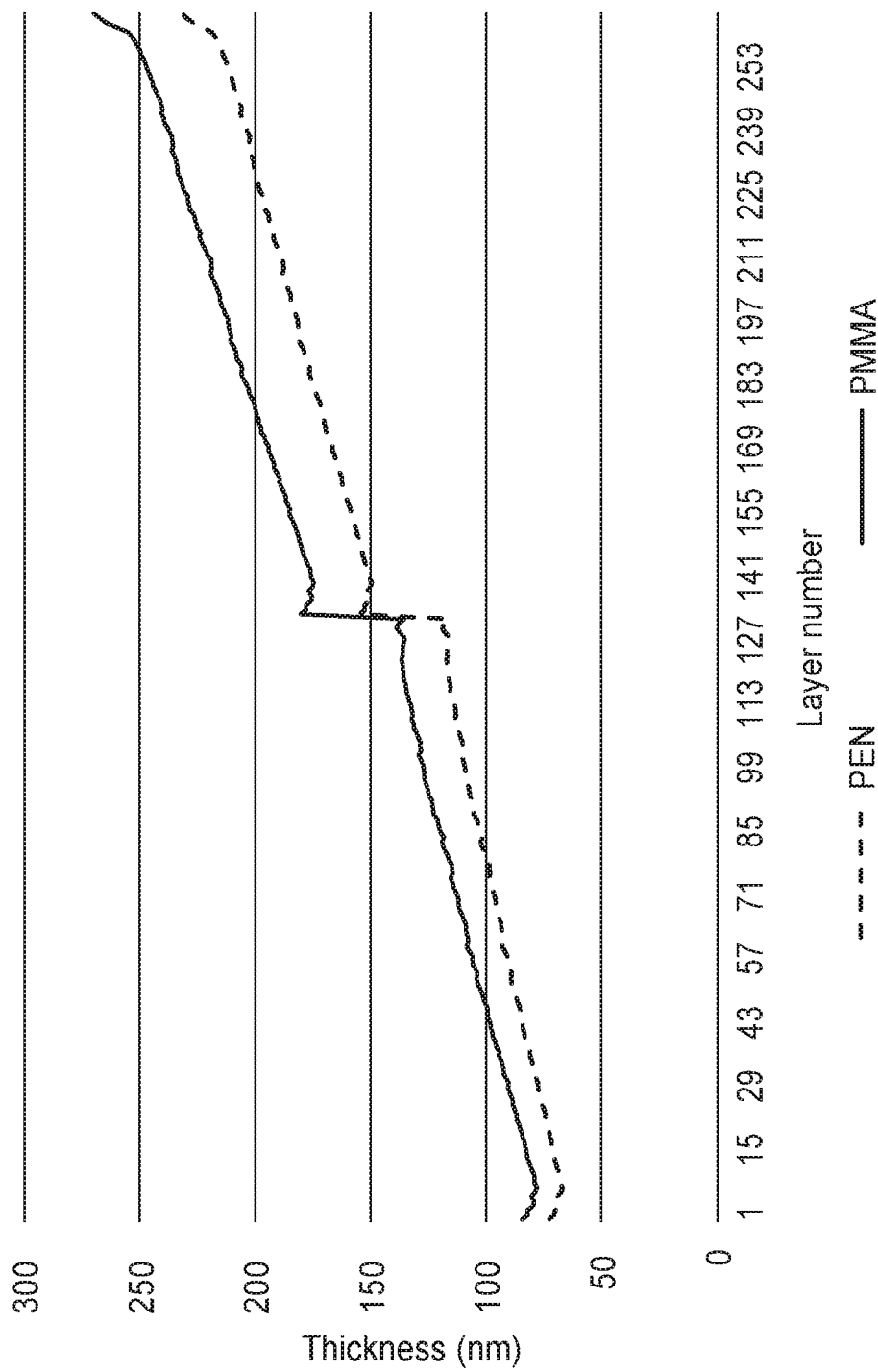
FIG. 19 is a plot showing the thickness profile of a multilayer notch filter.
Figure 20:
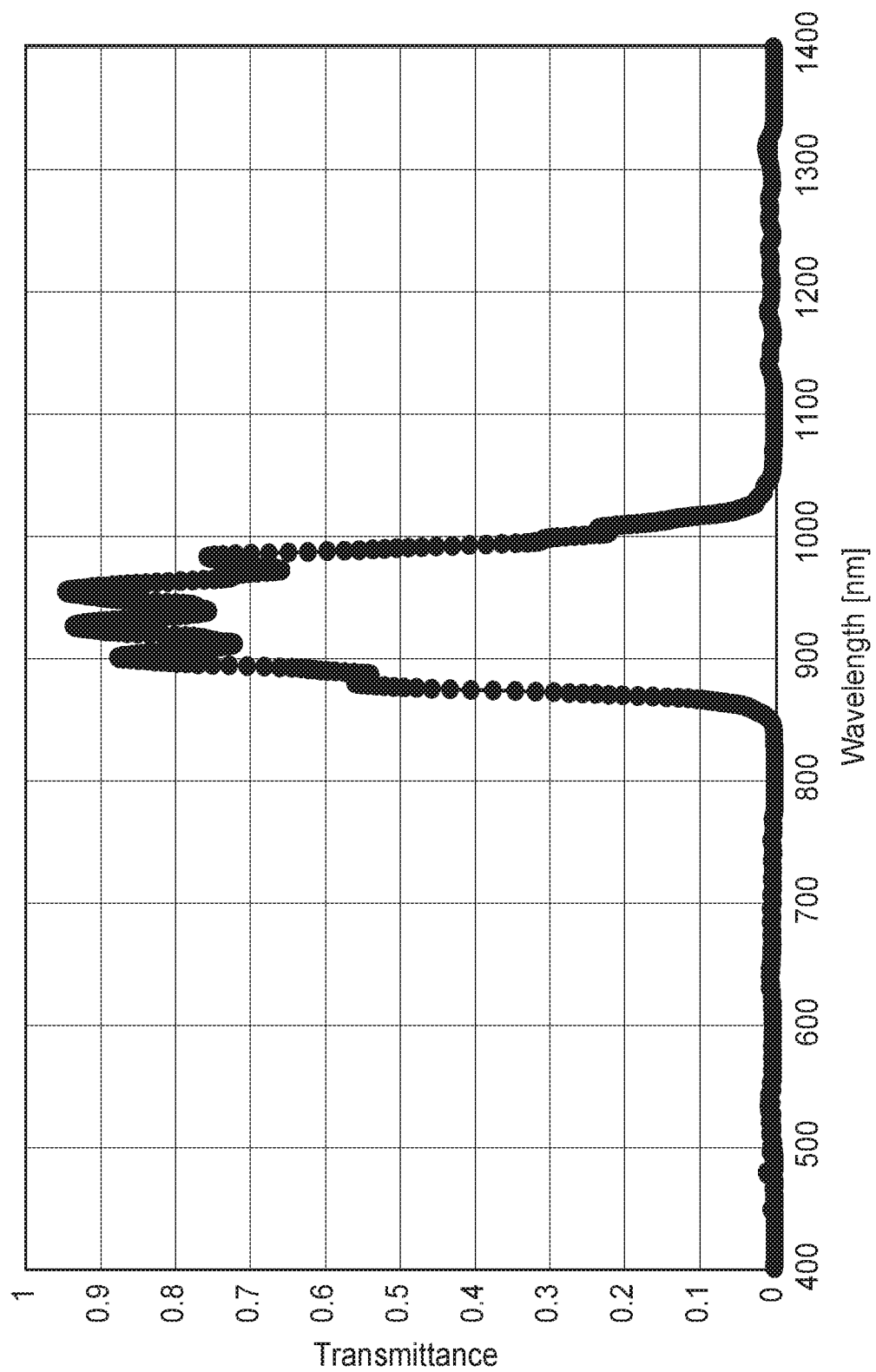
FIGS. 20-21 are plots of transmittance versus wavelength for unpolarized light at normal incidence and a 50 degree angle of incidence, respectively, on the notch filter of FIG. 19.
Figure 21:
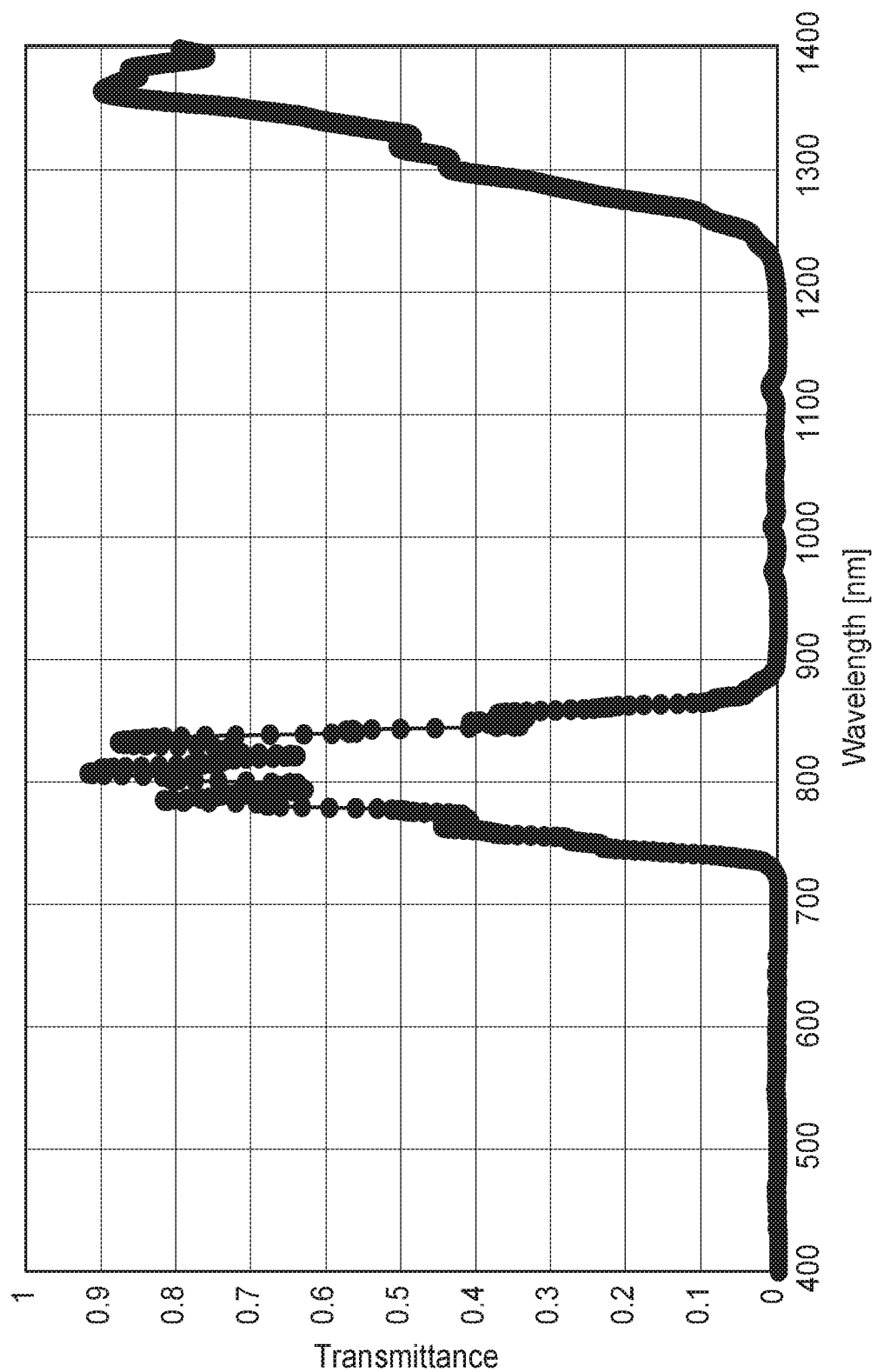

Another film was modeled using the same materials as in Component 3, but with twice the number of layers and a different layer thickness profile. The layer thickness profile for the PEN and PMMA layers is shown in FIG. 19. Transmission of light normally incident on the stack (i.e., 0 degree incidence) and at 50 degrees incidence was computed from wavelengths of 400 nm to 1400 nm. Transmission as a function of wavelength is shown in FIG. 20 for 0 degrees incidence and in FIG. 21 for 50 degree incidence. Component 4 had a near-infrared passband at normal incidence centered at a wavelength of about 940 nn.

Component 5

Figure 22:
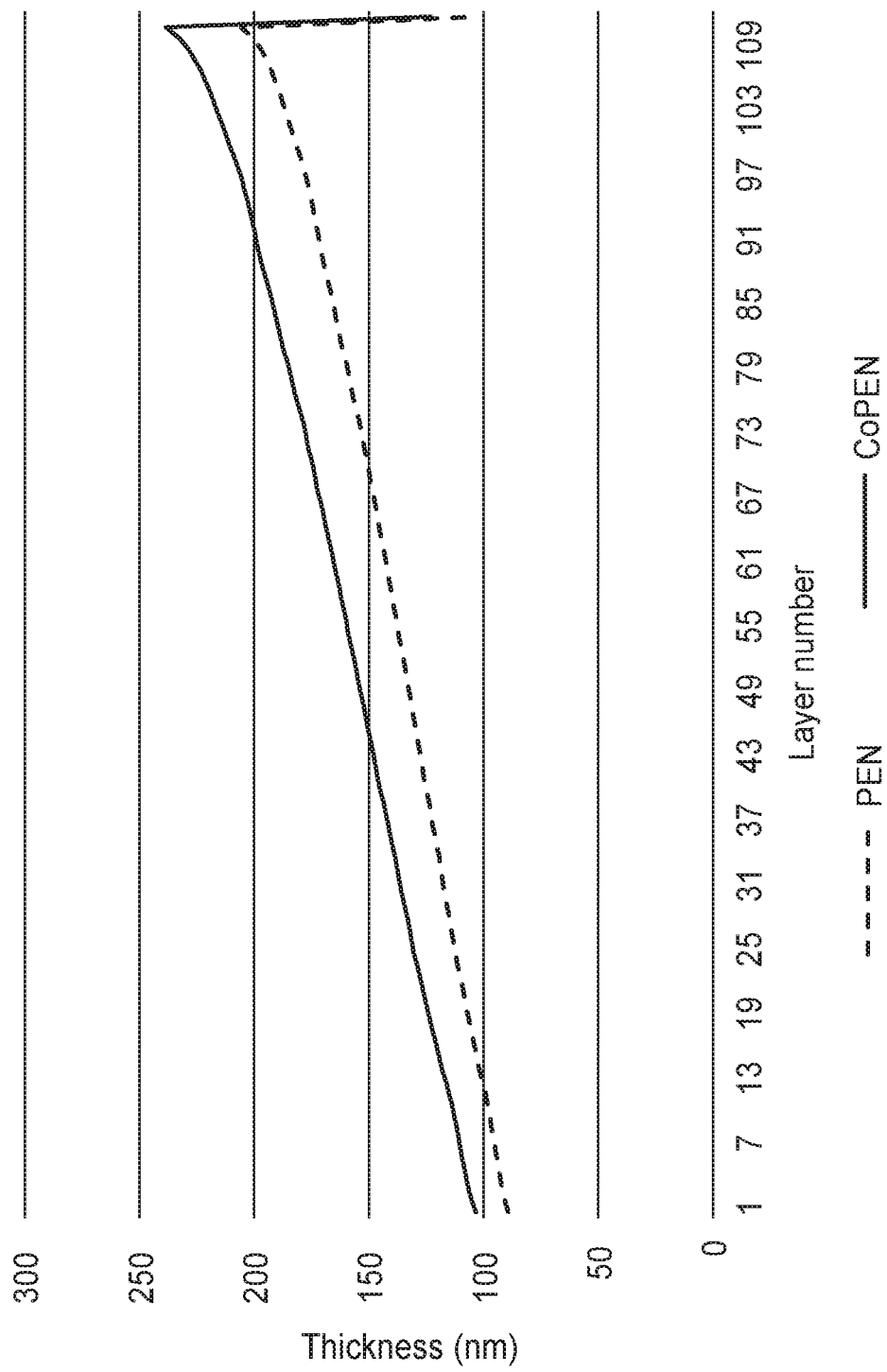
FIG. 22 is a plot showing the thickness profile of a multilayer reflective polarizer.
Figure 23:
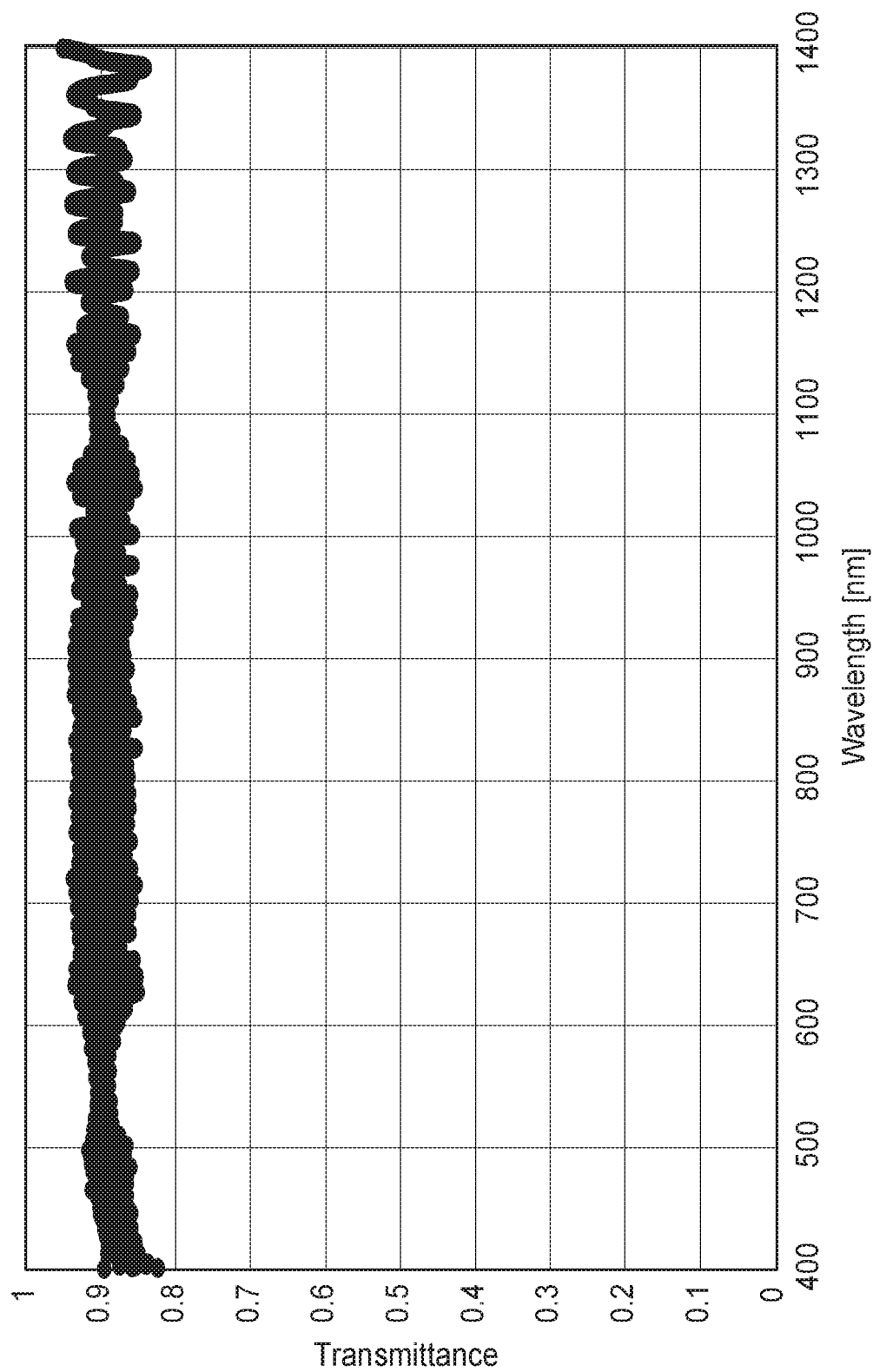
FIG. 23 is a plot of transmittance versus wavelength for light polarized along the pass axis at normal incidence on the reflective polarizer of FIG. 22.
Figure 24:
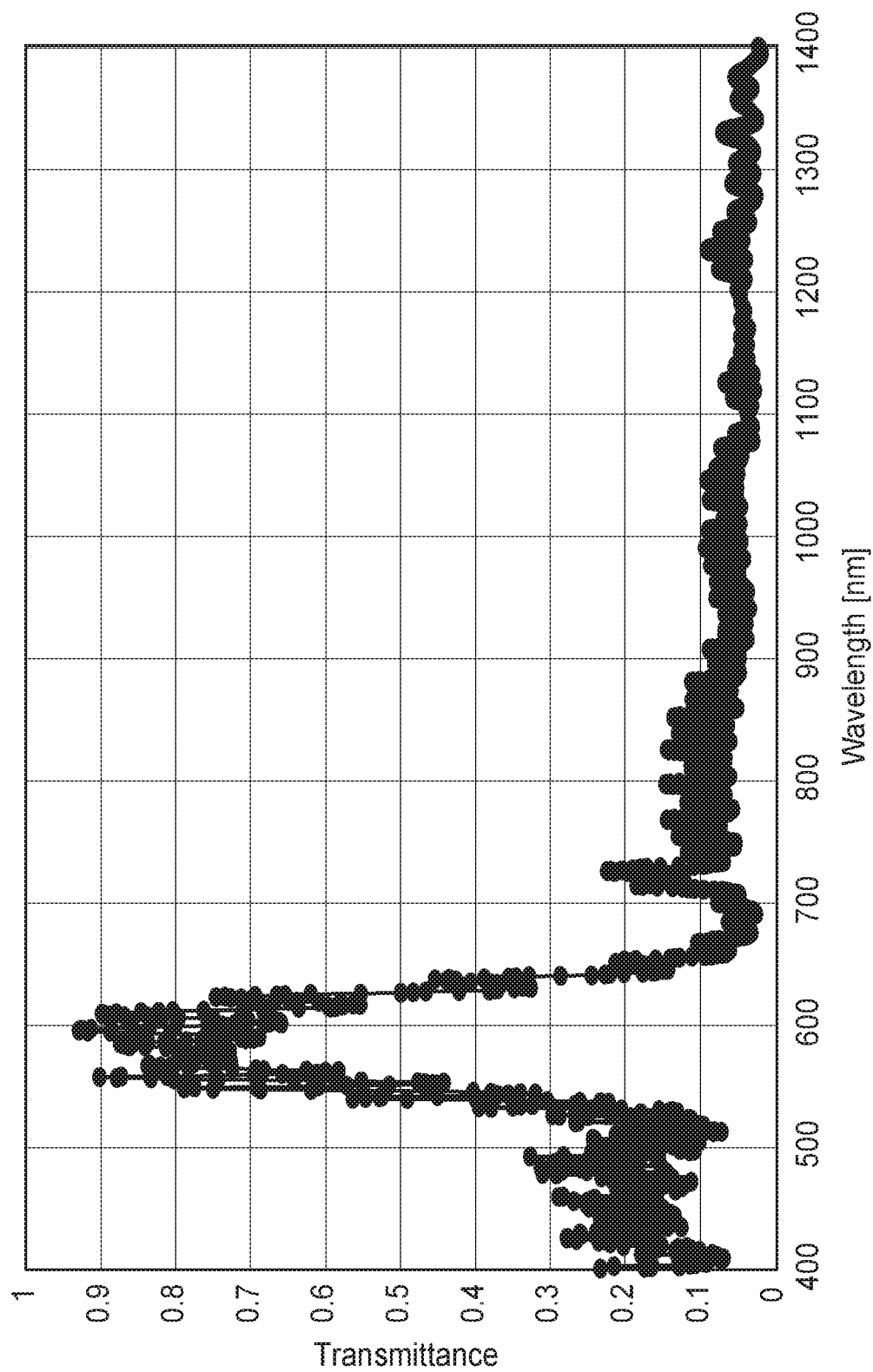
FIG. 24 is a plot of transmittance versus wavelength for light polarized along the block axis at normal incidence on the reflective polarizer of FIG. 22.
Figure 25:
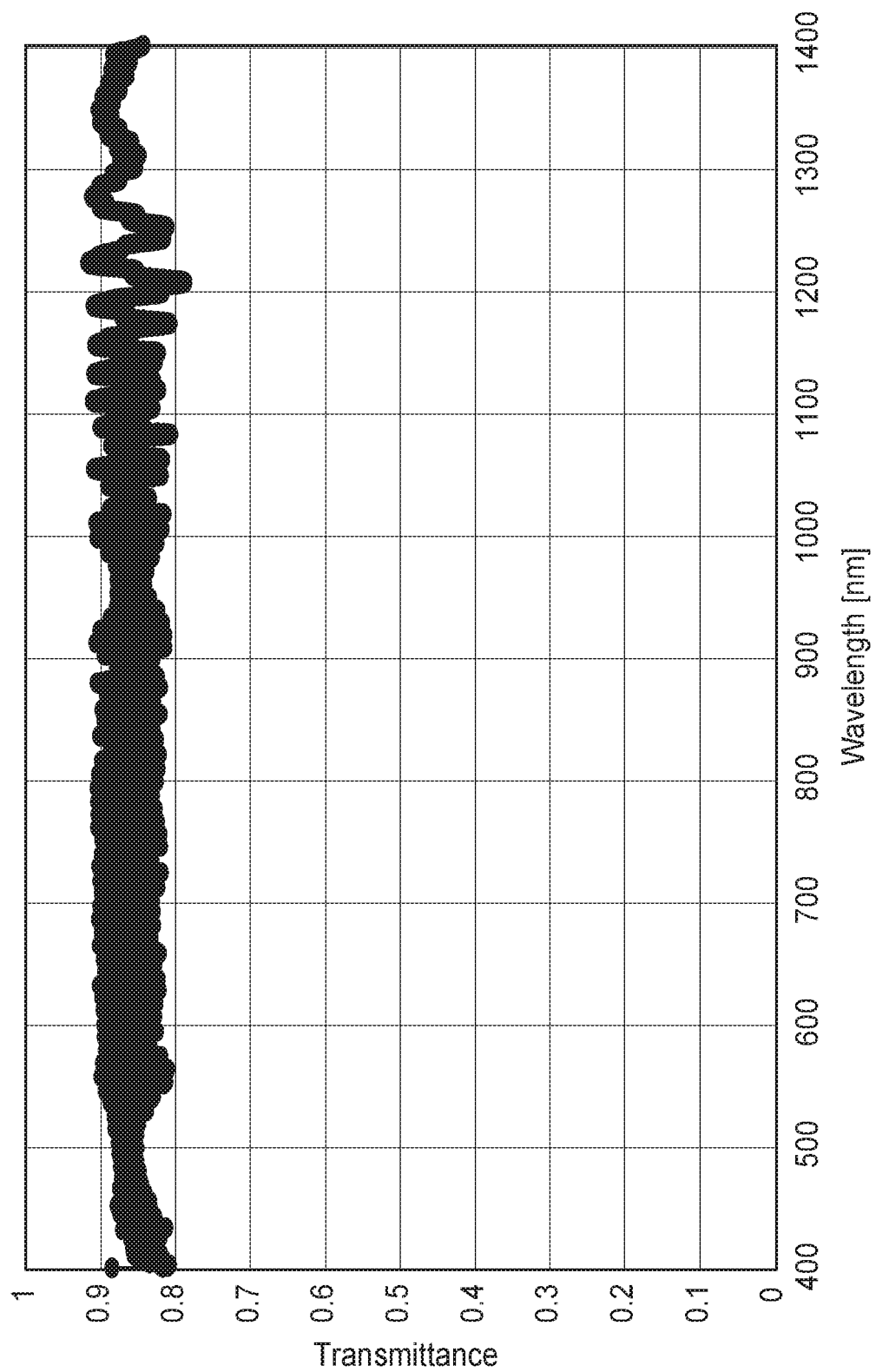
FIG. 25 is a plot of transmittance versus wavelength for light polarized along the pass axis at a 50 degree angle of incidence on the reflective polarizer of FIG. 22.
Figure 26:
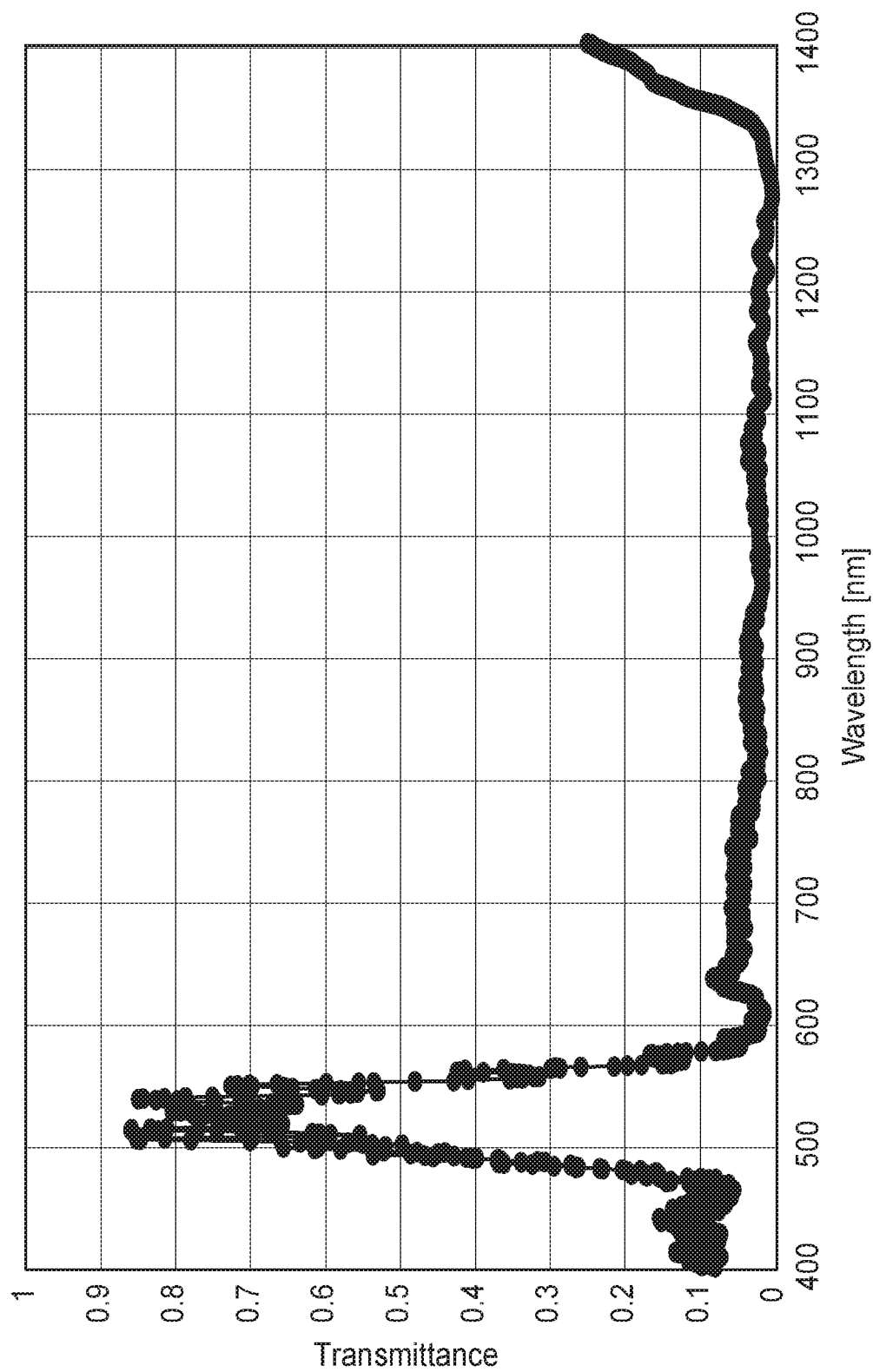
FIG. 26 is a plot of transmittance versus wavelength for light polarized along the block axis at a 50 degree angle of incidence on the reflective polarizer of FIG. 22.

A film stack consisting of 224 layers of layers of alternating PEN and CoPEN (copolymer of PEN) plus thick CoPEN skin layers on the top and the bottom was modeled. The PEN layers were modeled as having refractive indices of 1.822, 1.583 and 1.559 in x-, y- and z-directions respectively at 633 nm and an absorption of $4.5 \times 10^{-6}$ in each direction at 633 nm. The CoPEN layers were modeled as having refractive indices of 1.571, 1.570 and 1.569 in the x-, y- and z-directions respectively at 633 nm, and absorption values the same as PEN. The thick CoPEN layers at the top and bottom of the stack each had a thickness of 2500 nm. The layer thickness profile for the PEN and CoPEN layers is shown in FIG. 22. The sequence of layers began with the thick CoPEN skin layer nearest the light source, followed by a PEN layer, and then alternated between CoPEN and PEN down to the bottom thick CoPEN skin layer. Transmission of light normally incident on the stack (i.e., 0 degree incidence) and at 50 degrees incidence was computed for wavelengths from 400 nm to 1400 nm for both pass-band and block band. Transmission as a function of wavelength is shown in FIG. 23 for the pass band at 0 degrees, in FIG. 24 for the block band at 0 degrees, in FIG. 25 for the pass band at 50 degrees and in FIG. 26 for the block band at 50 degrees.

Example 1

Figure 27:
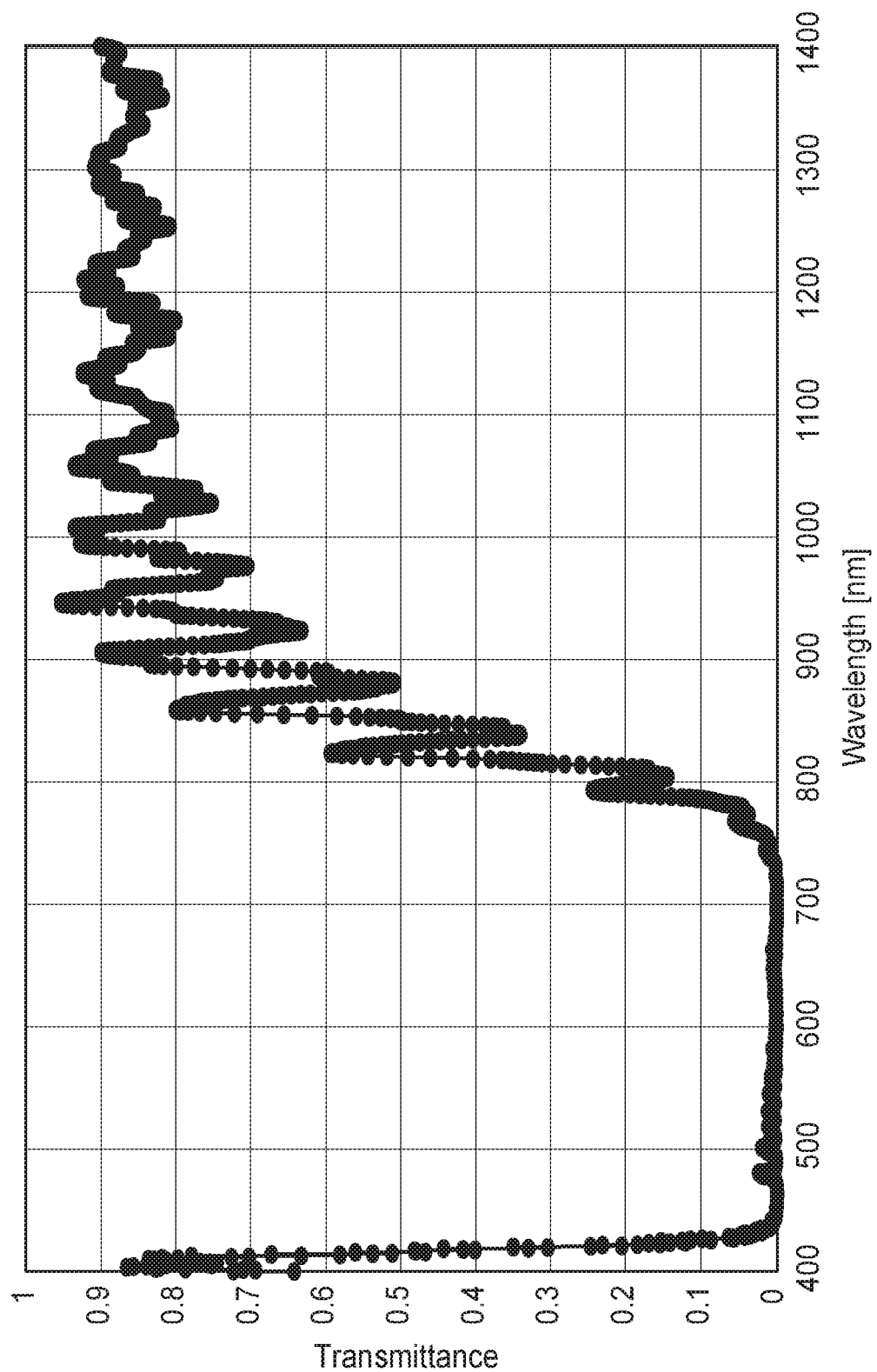
FIG. 27 is a plot of transmittance versus wavelength for light polarized along the pass axis at normal incidence on an optical filter.
Figure 28:
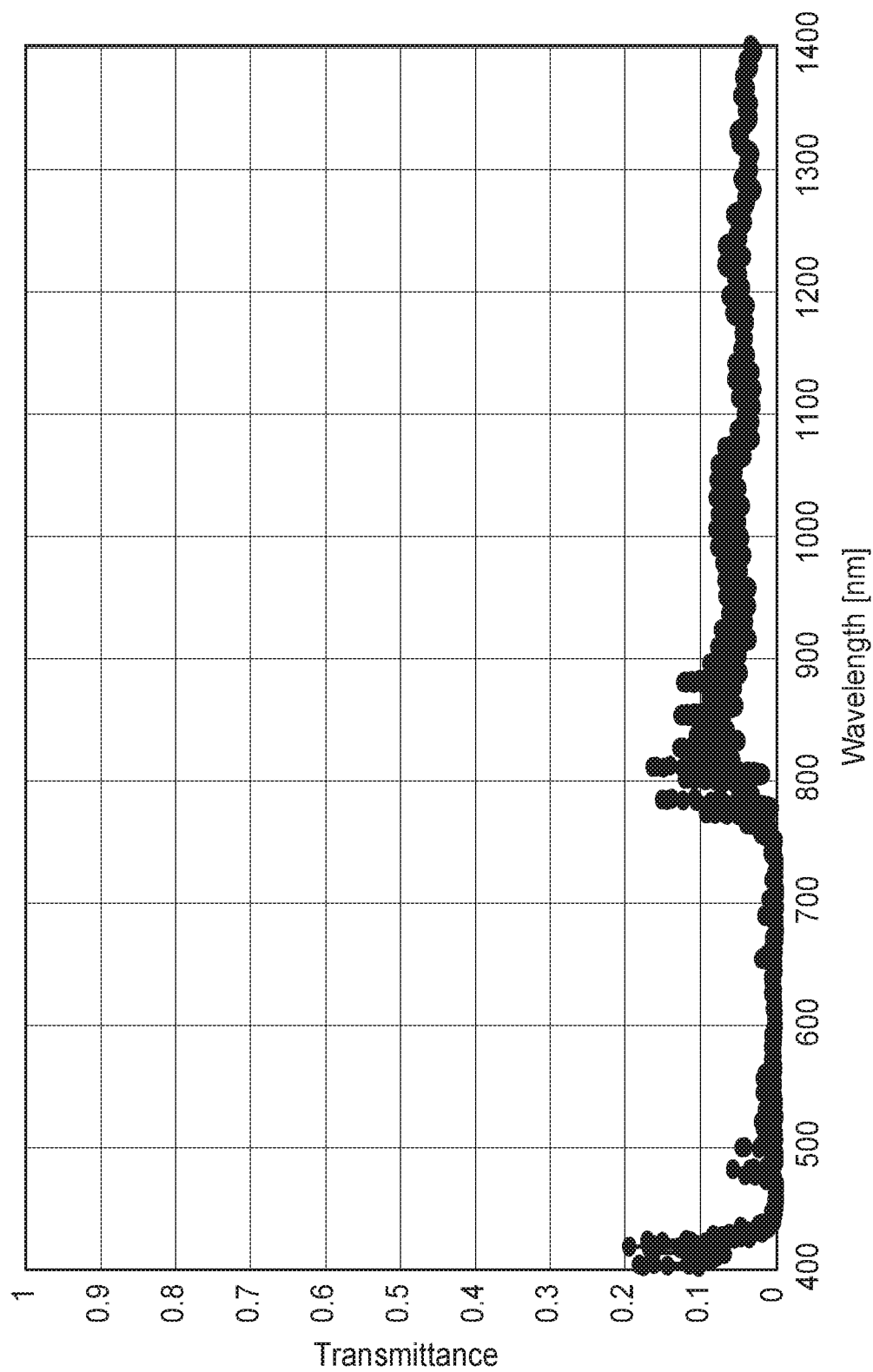
FIG. 28 is a plot of transmittance versus wavelength for light polarized along the block axis at normal incidence on the optical filter of FIG. 27.
Figure 29:
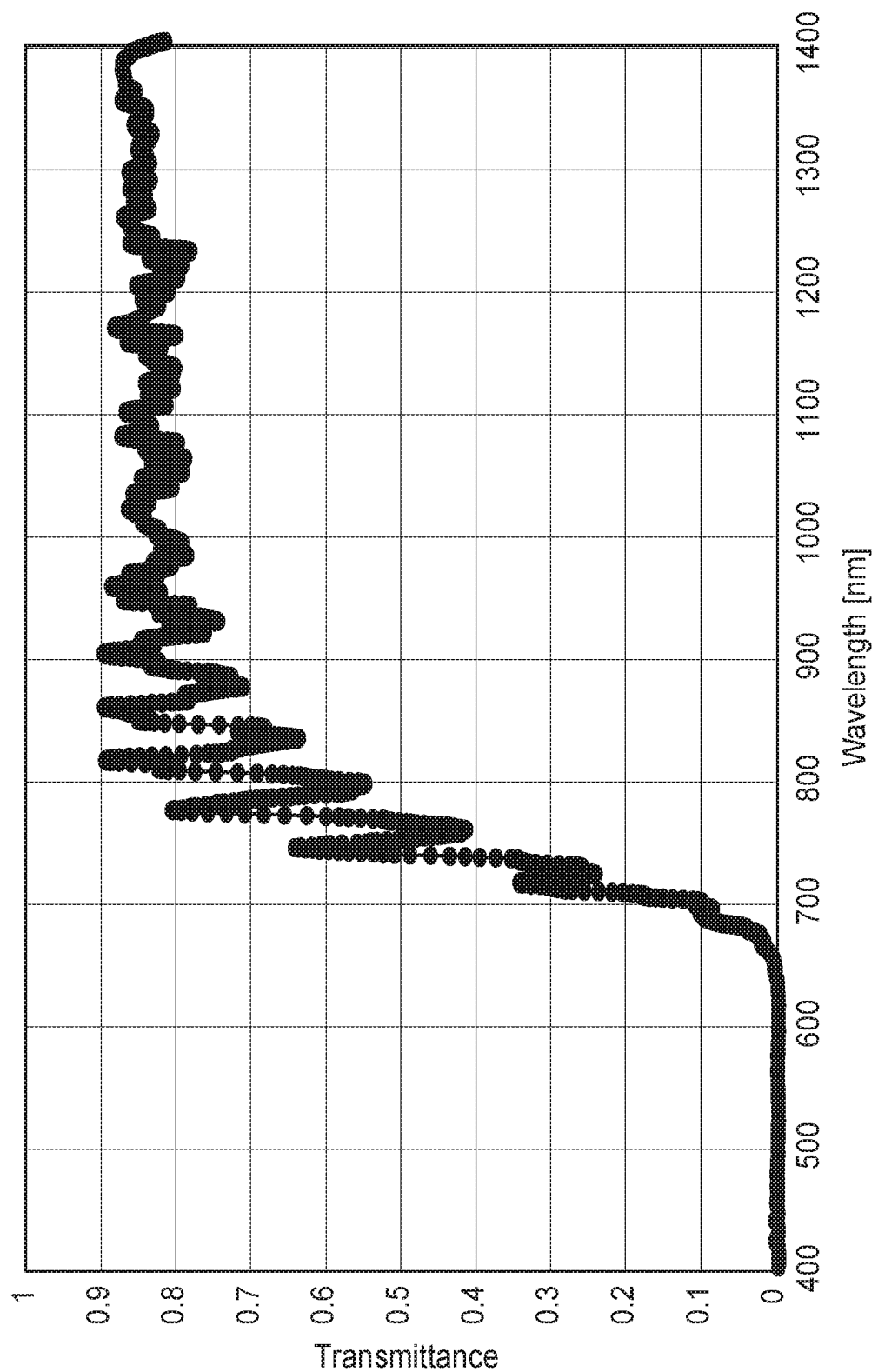
FIG. 29 is a plot of transmittance versus wavelength for light polarized along the pass axis at a 50 degree angle of incidence on the optical filter of FIG. 27.
Figure 30:
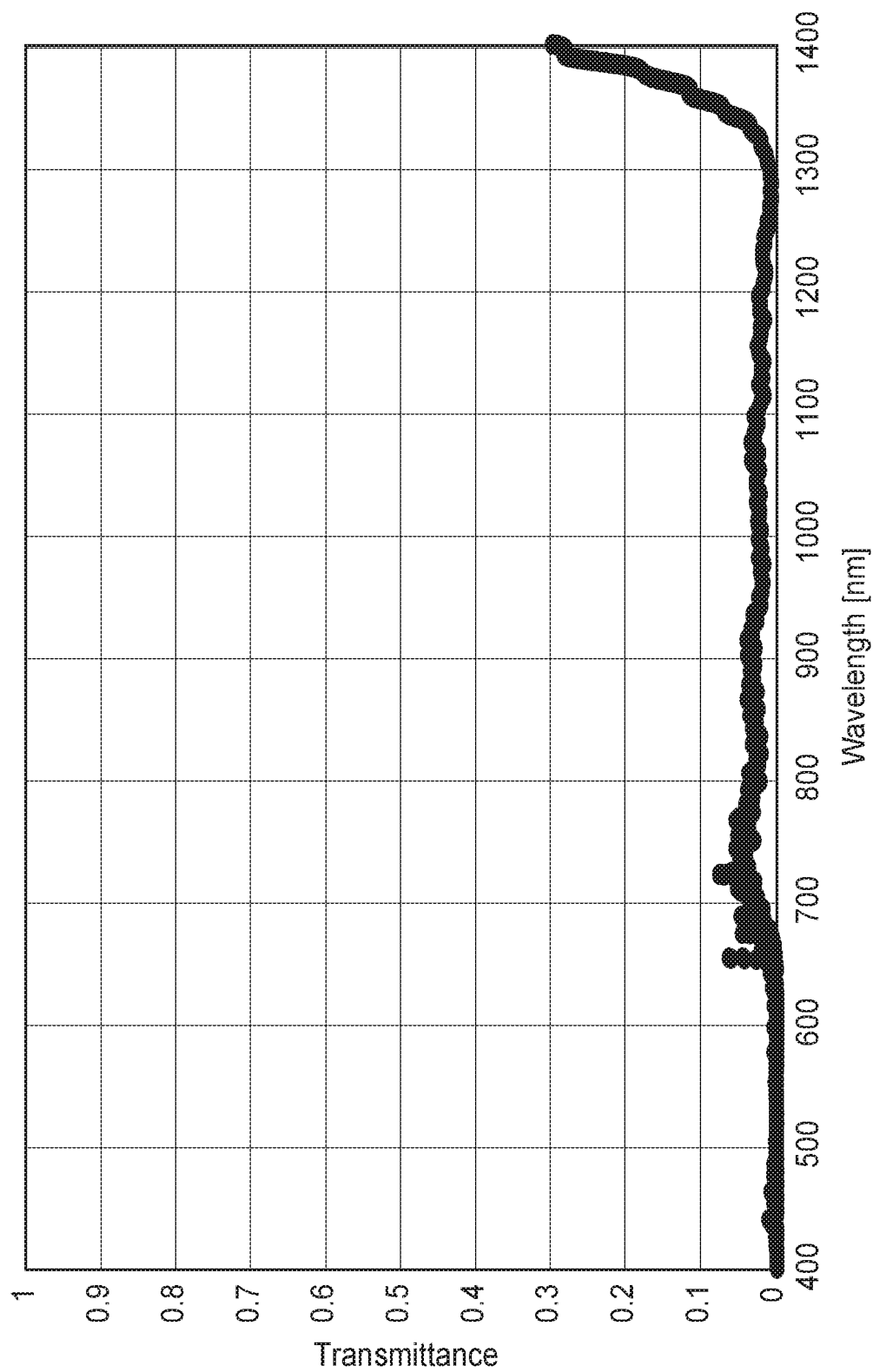
FIG. 30 is a plot of transmittance versus wavelength for light polarized along the block axis at a 50 degree angle of incidence on the optical filter of FIG. 27.

A film stack was modeled by combining the films of Component 5 and Component 3 into a single stack with the film of Component 5 nearest the light source. Transmission of light normally incident on the stack (i.e., 0 degree incidence) and at 50 degrees incidence was computed for wavelengths from 400 nm to 1400 nm for both pass-band and block band. Transmission as a function of wavelength is shown in FIG. 27 for the pass band at 0 degrees, in FIG. 28 for the block band at 0 degrees, in FIG. 29 for the pass band at 50 degrees and in FIG. 30 for the block band at 50 degrees.

Example 2

Figure 31:
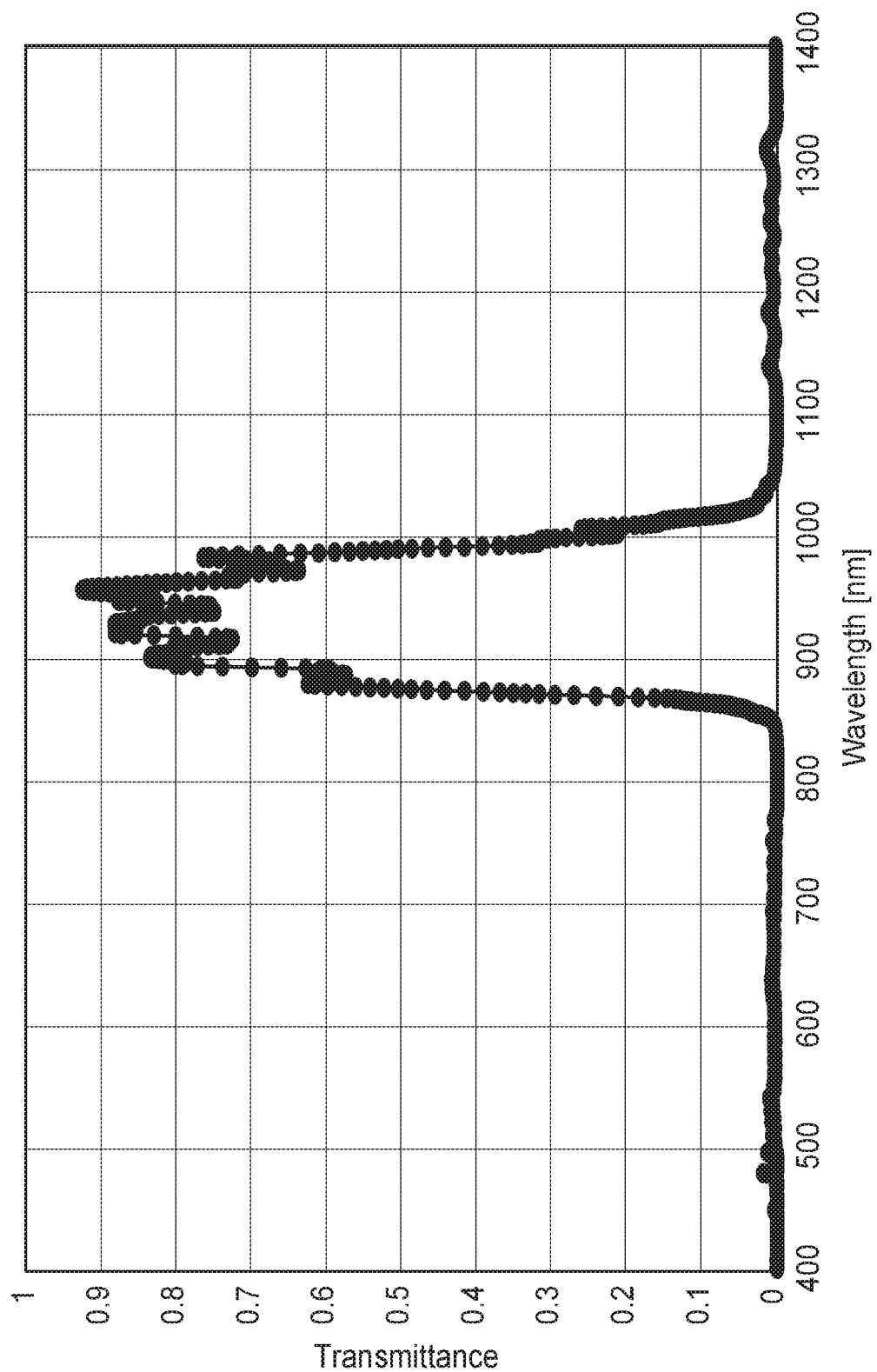
FIG. 31 is a plot of transmittance versus wavelength for light polarized along the pass axis at normal incidence on an optical filter.
Figure 32:
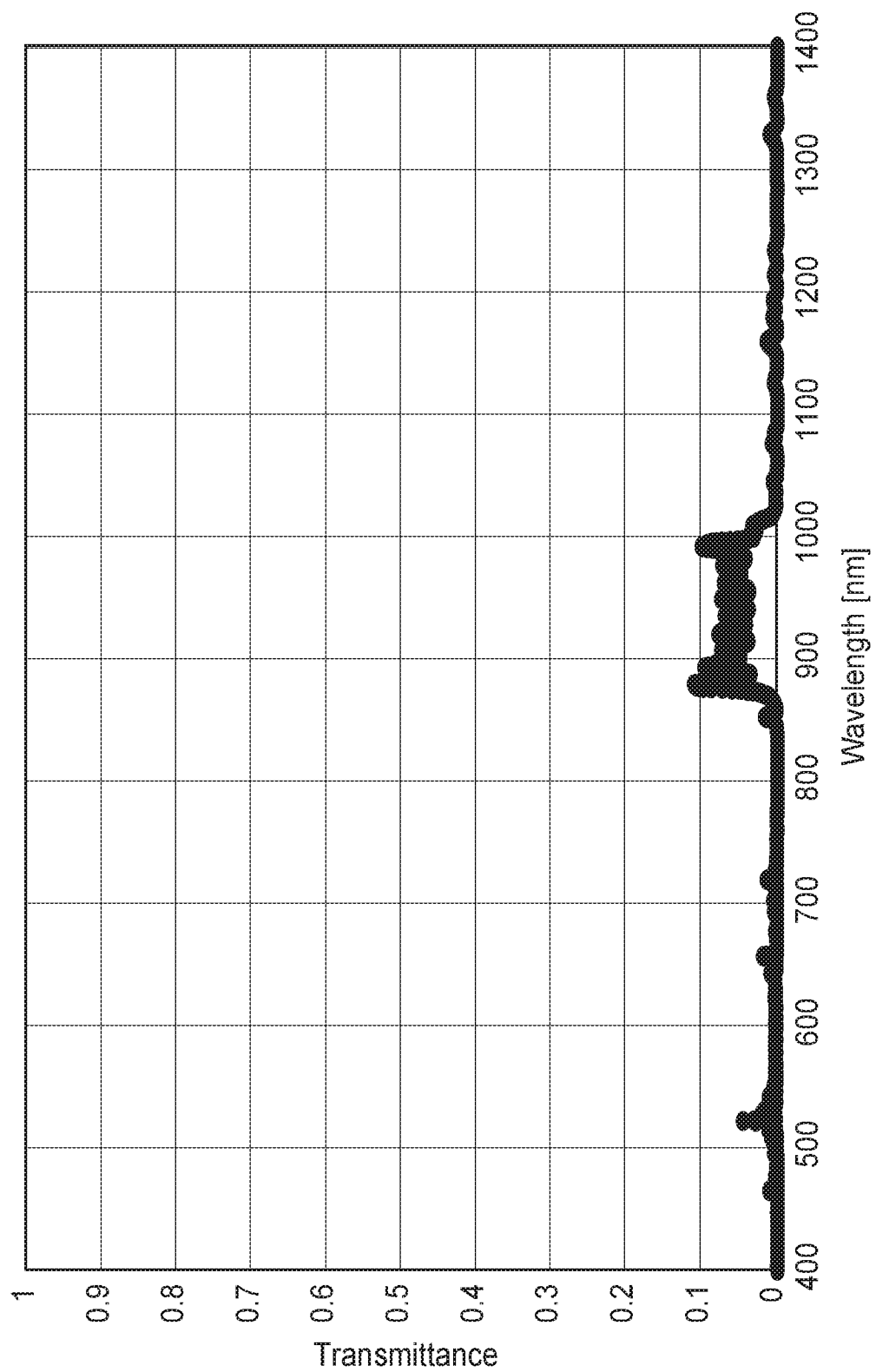
FIG. 32 is a plot of transmittance versus wavelength for light polarized along the block axis at normal incidence on the optical filter of FIG. 31.
Figure 33:
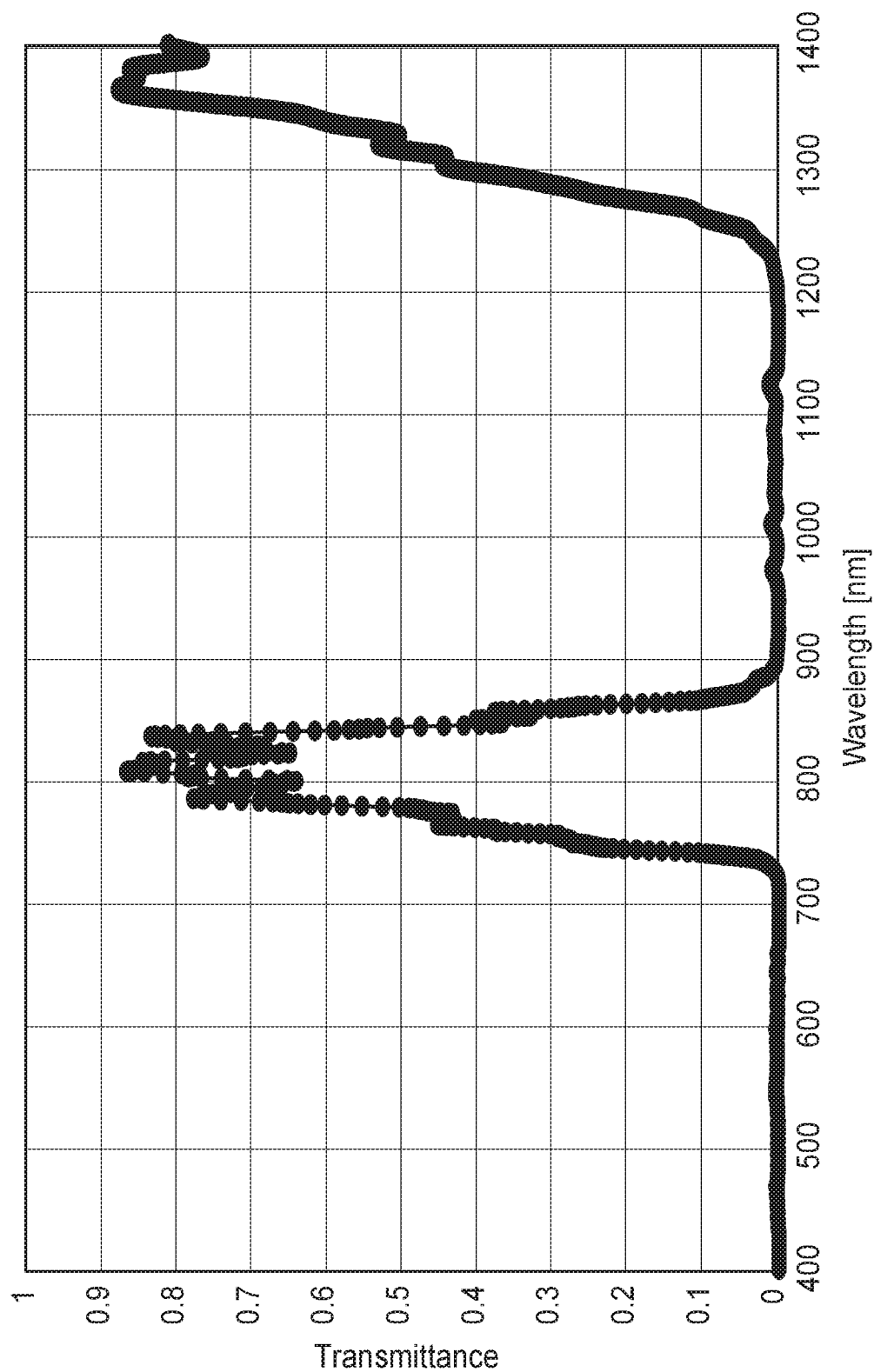
FIG. 33 is a plot of transmittance versus wavelength for light polarized along the pass axis at an angle of incidence of 50 degrees on the optical filter of FIG. 31.
Figure 34:
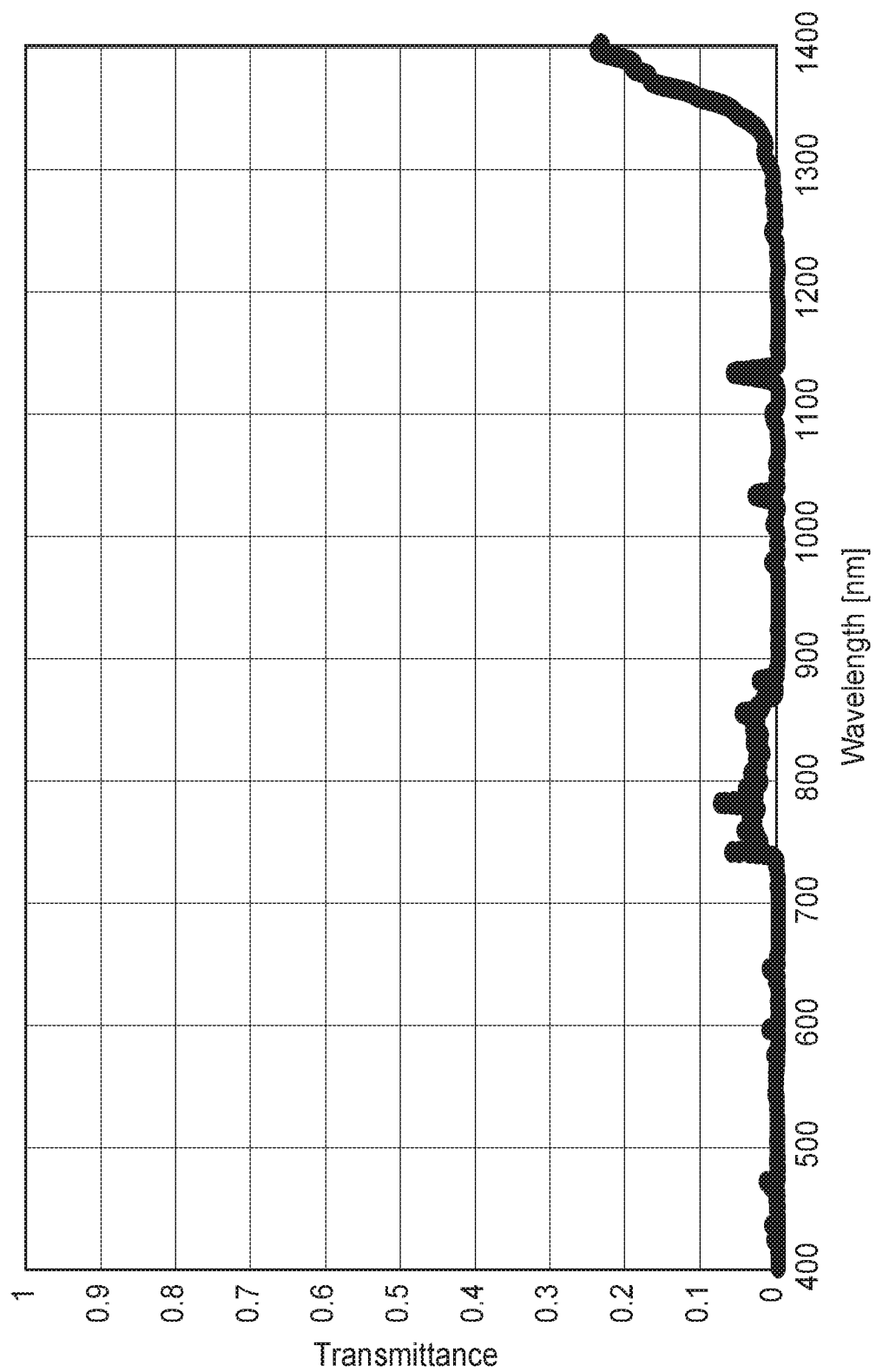
FIG. 34 is a plot of transmittance versus wavelength for light polarized along the pass axis at an angle of incidence of 50 degrees on the optical filter of FIG. 31.

A film stack was modeled by combining the film of Component 5 and Component 4 into a single stack with the film of Component 5 nearest the light source. Transmission of light normally incident on the stack (i.e., 0 degree incidence) and at 50 degrees incidence was computed for wavelengths from 400 nm to 1400 nm for both pass-band and block band. Transmission as a function of wavelength is shown in FIG. 31 for the pass band at 0 degrees, in FIG. 32 for the block band at 0 degrees, in FIG. 33 for the pass band at 50 degrees and in FIG. 34 for the block band at 50 degrees. The optical filter of Example 2 had a passband at normal incidence for light polarized in the pass state centered at about 940 nm.

Example 3

Figure 35:
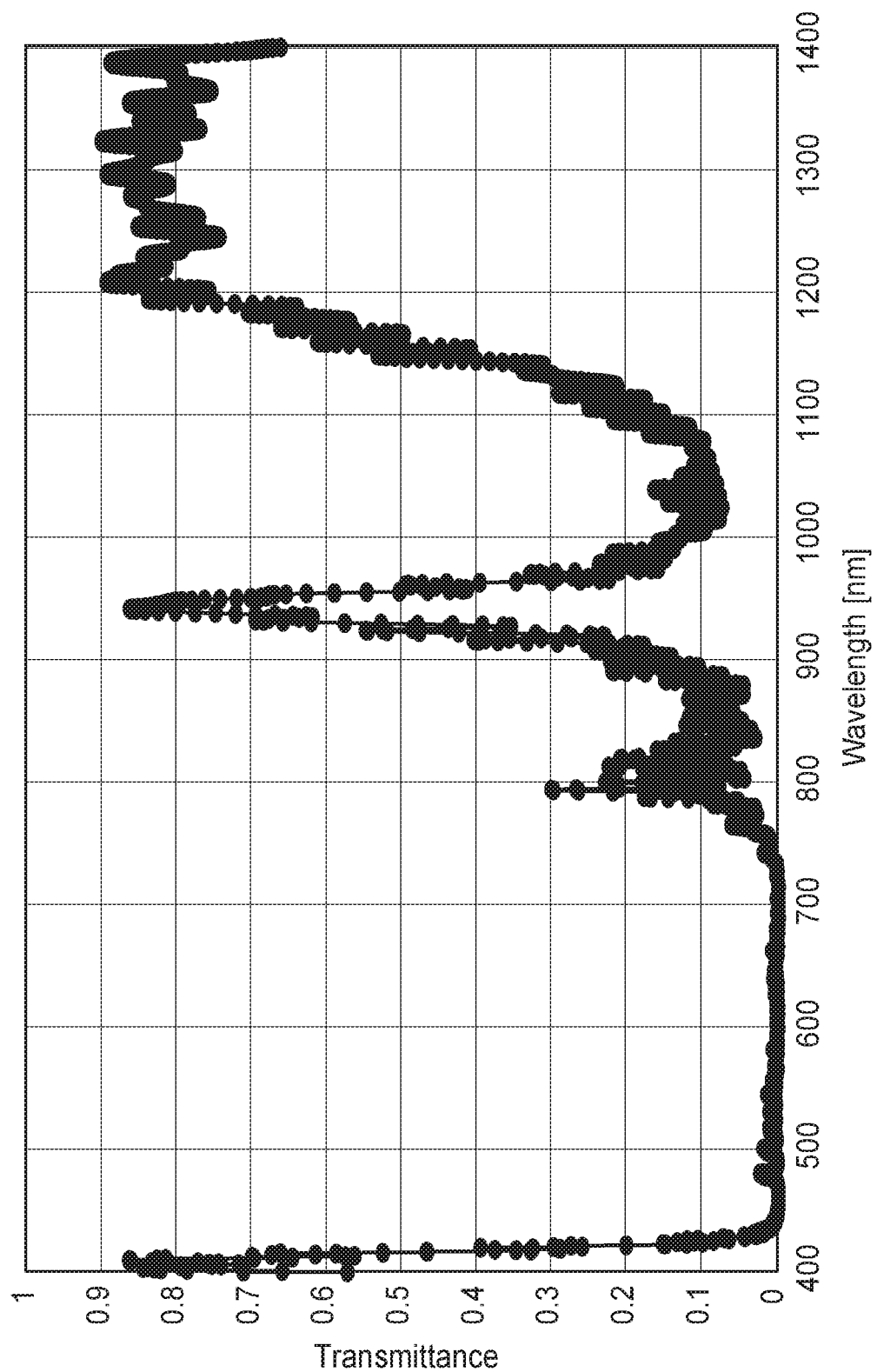
FIG. 35 is a plot of transmittance versus wavelength for light polarized along the pass axis at normal incidence on an optical filter.
Figure 36:
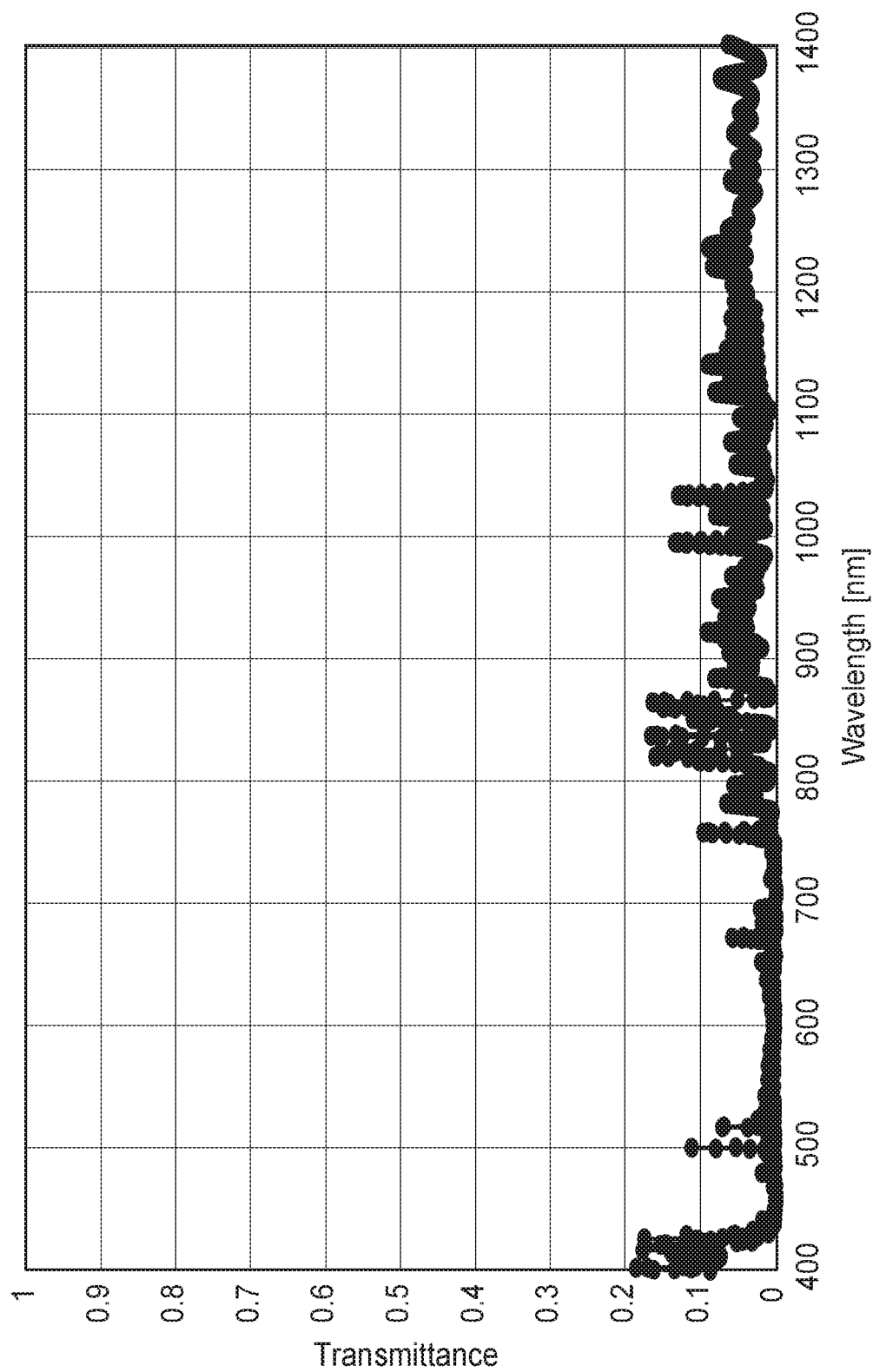
FIG. 36 is a plot of transmittance versus wavelength for light polarized along the block axis at normal incidence on the optical filter of FIG. 35.
Figure 37:
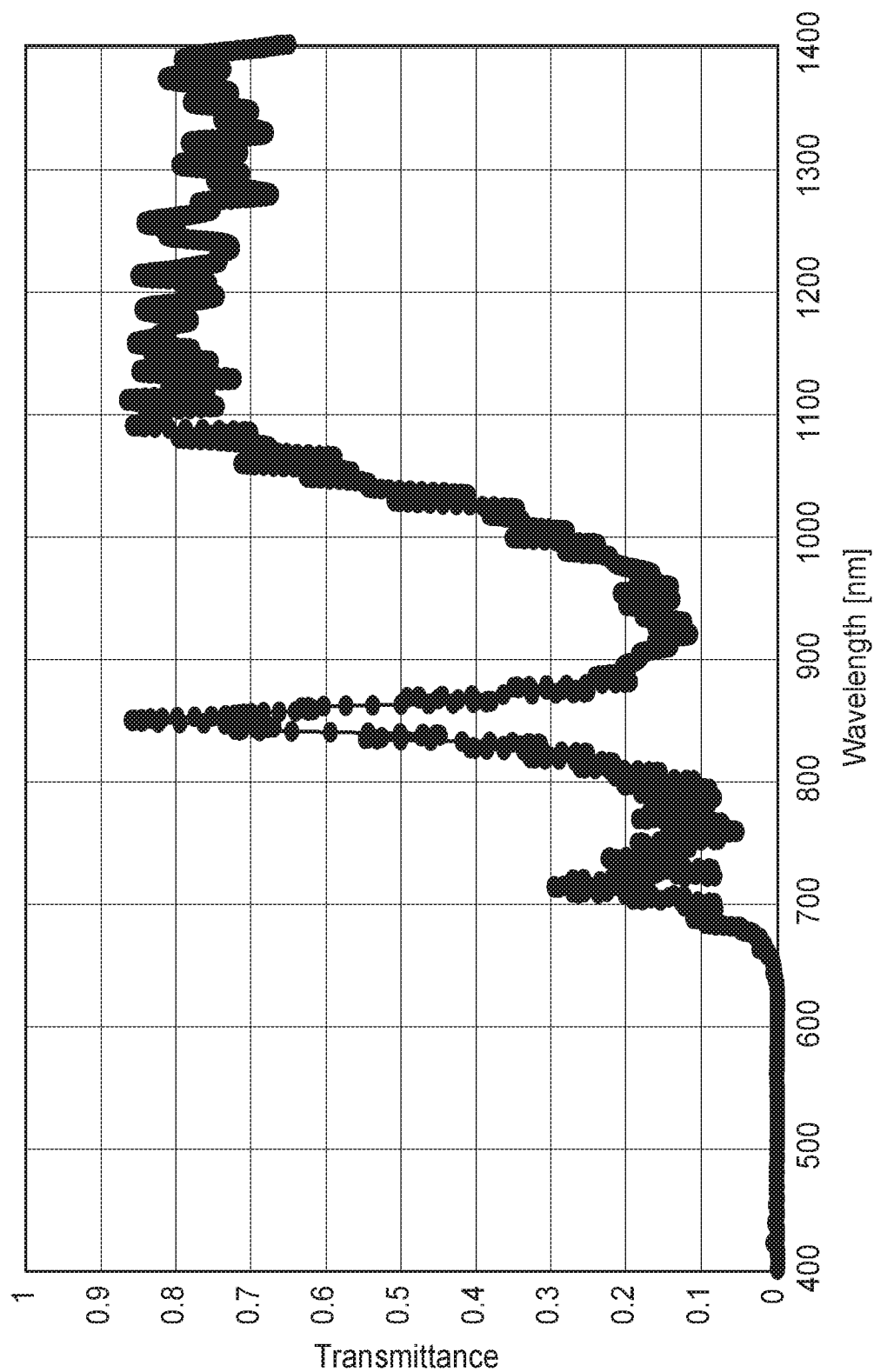
FIG. 37 is a plot of transmittance versus wavelength for light polarized along the pass axis at an angle of incidence of 50 degrees on the optical filter of FIG. 35.
Figure 38:
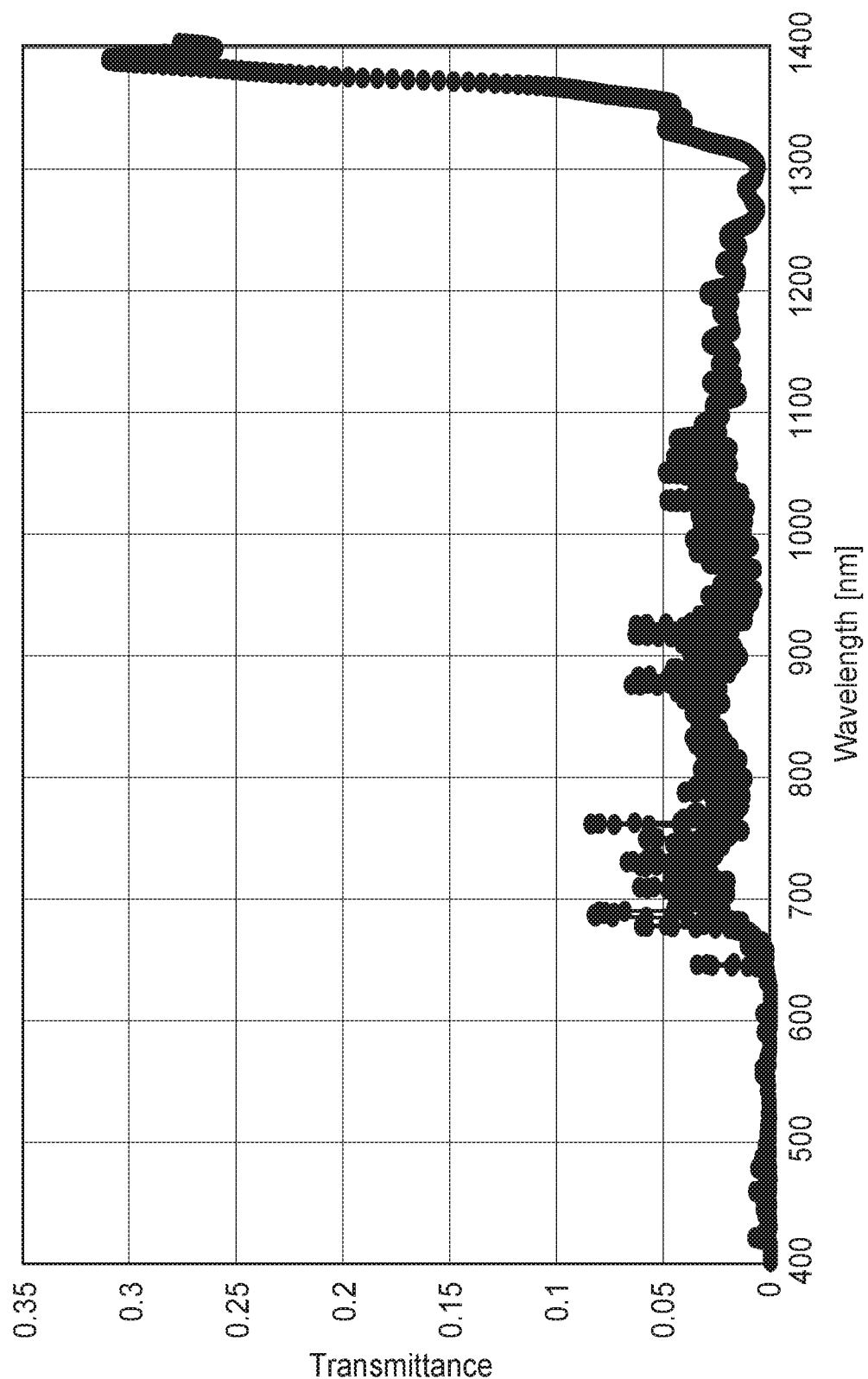
FIG. 38 is a plot of transmittance versus wavelength for light polarized along the pass axis at an angle of incidence of 50 degrees on the optical filter of FIG. 35.

A film stack was modeled by combining the films of Component 5, Component 3 and Component 2 into a single stack with the film of Component 5 nearest the light source, the film of Component 3 above that, followed by the film of Component 2. Transmission of light normally incident on the stack (i.e., 0 degree incidence) and at 50 degrees incidence was computed for wavelengths from 400 nm to 1400 nm for both pass-band and block band. Transmission as a function of wavelength is shown in FIG. 35 for the pass band at 0 degrees, in FIG. 36 for the block band at 0 degrees, in FIG. 37 for the pass band at 50 degrees and in FIG. 38 for the block band at 50 degrees. The optical filter of Example 3 had a passband at normal incidence for light polarized in the pass state centered at about 940 nm.

Example 4

Figure 39:
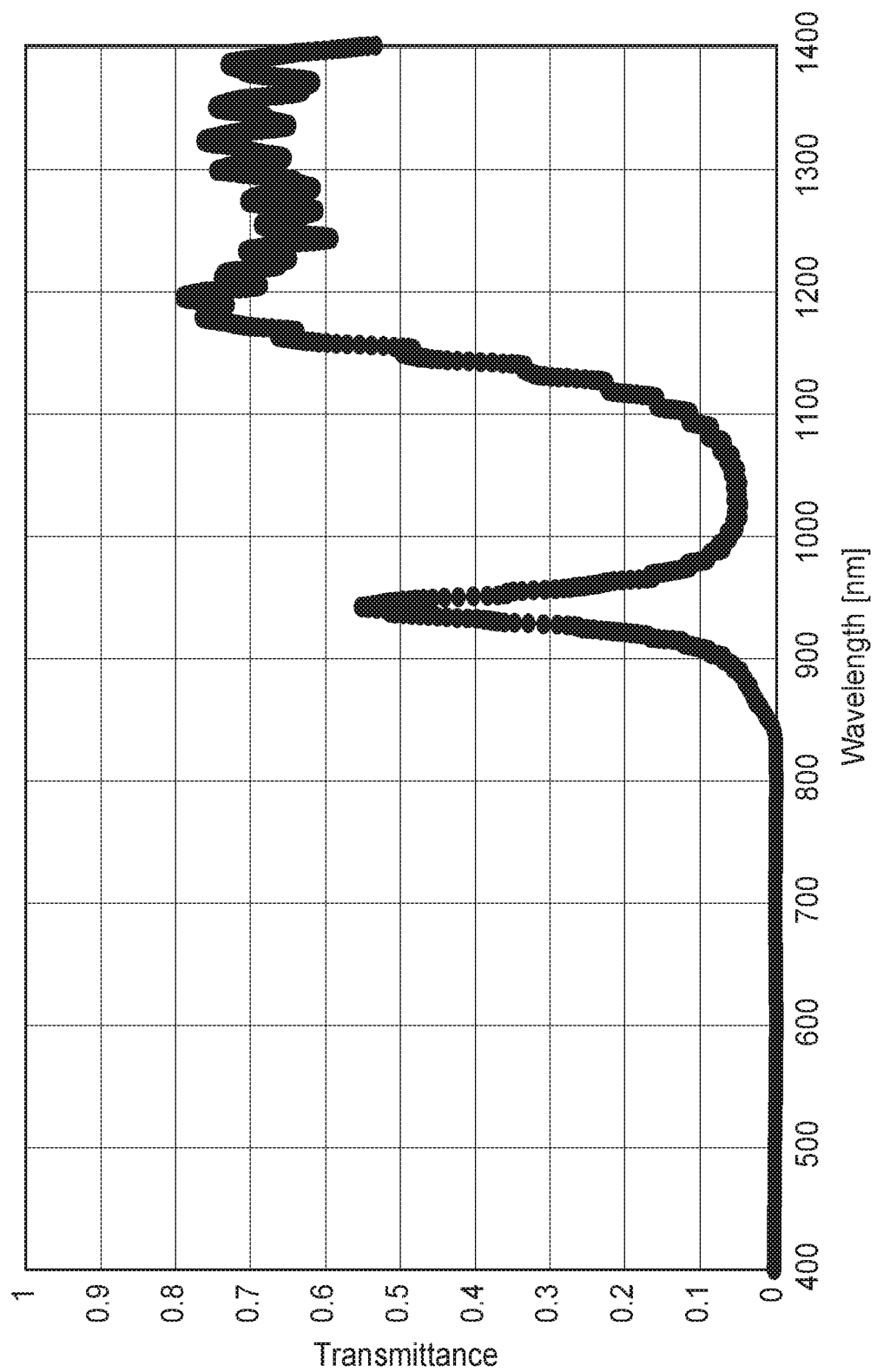
FIG. 39 is a plot of transmittance versus wavelength for light polarized along the pass axis at normal incidence on an optical filter.
Figure 40:
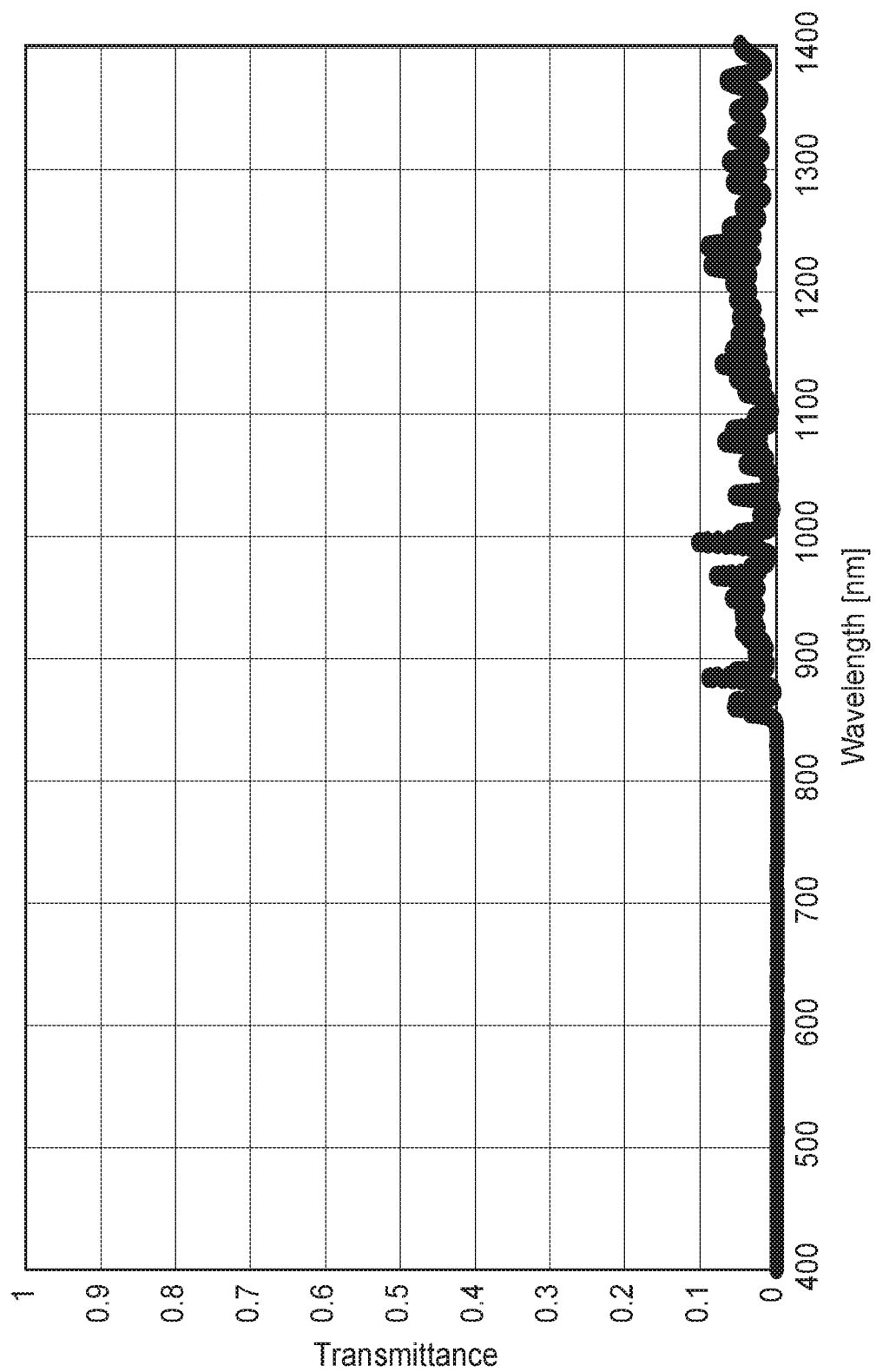
FIG. 40 is a plot of transmittance versus wavelength for light polarized along the block axis at normal incidence on the optical filter of FIG. 39.
Figure 41:
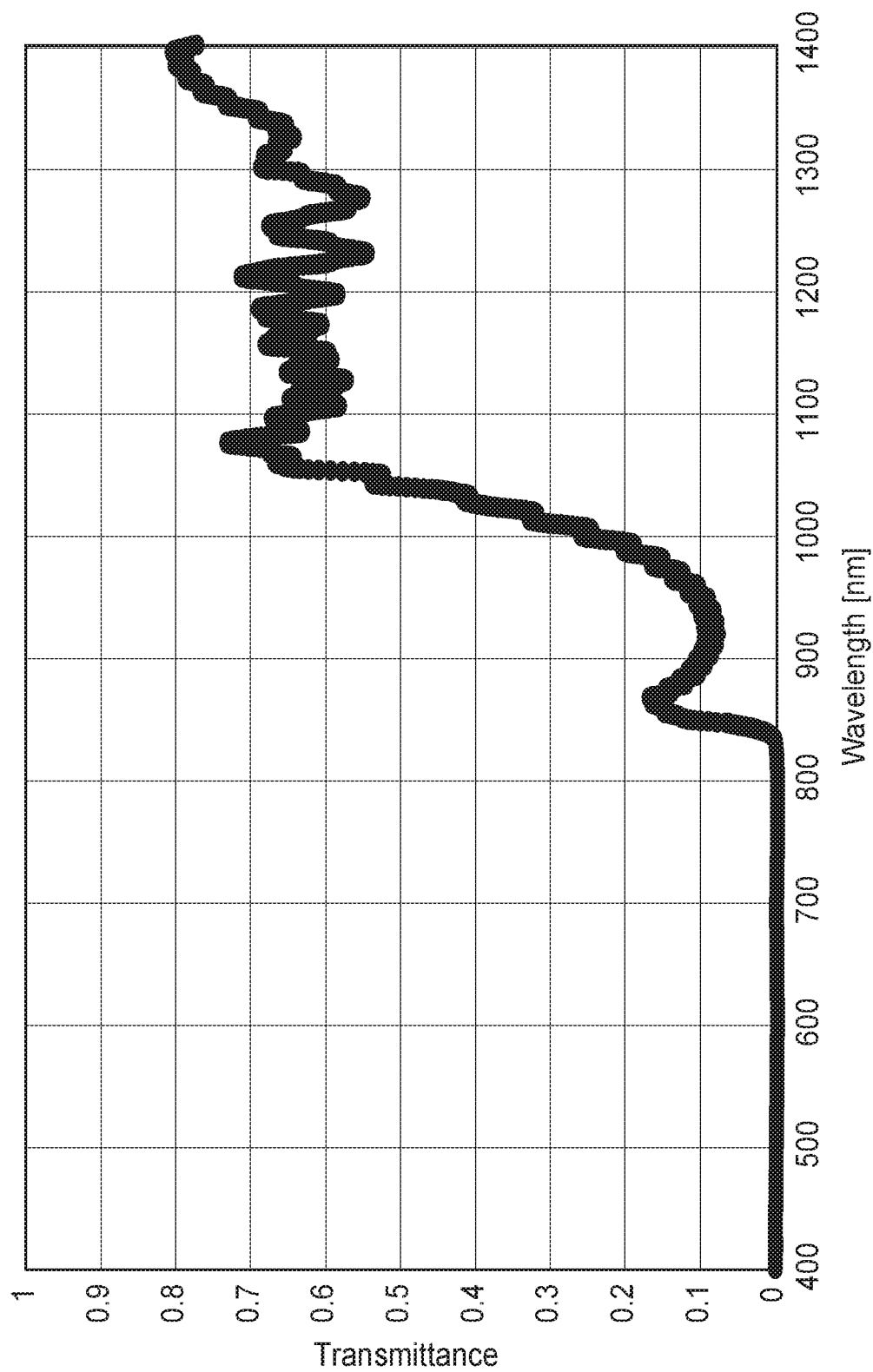
FIG. 41 is a plot of transmittance versus wavelength for light polarized along the pass axis at an angle of incidence of 50 degrees on the optical filter of FIG. 39.
Figure 42:
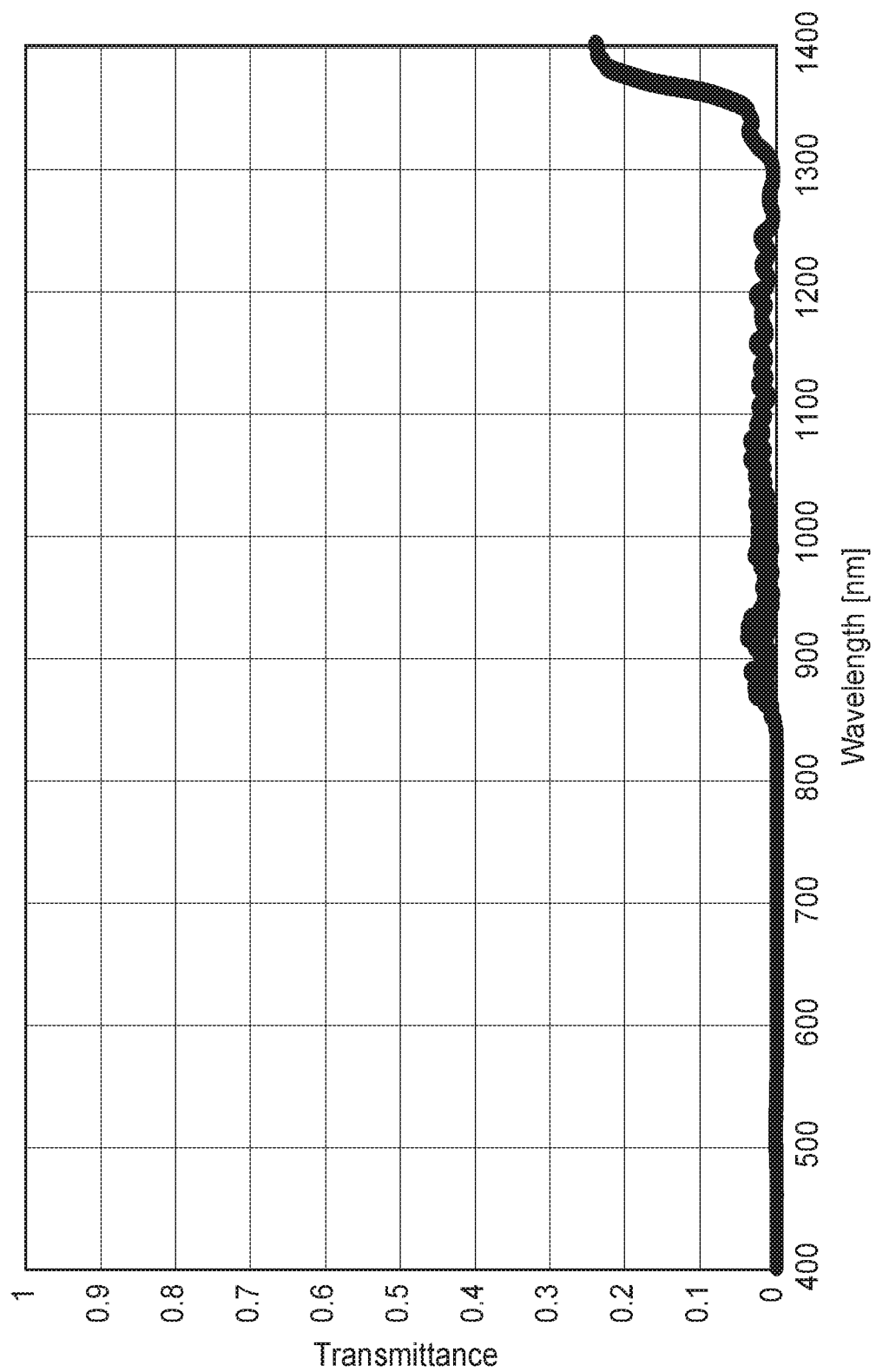
FIG. 42 is a plot of transmittance versus wavelength for light polarized along the pass axis at an angle of incidence of 50 degrees on the optical filter of FIG. 39.

A film stack was modeled by combining the films of Component 5, Component 2 and Component 1 into a single stack with the film of Component 5 nearest the light source, the film of Component 2 above that, followed by the dye coating of Component 1. Transmission of light normally incident on the stack (i.e., 0 degree incidence) and at 50 degrees incidence was computed for wavelengths from 400 nm to 1400 nm for both pass-band and block band. Transmission as a function of wavelength is shown in FIG. 39 for the pass band at 0 degrees, in FIG. 40 for the block band at 0 degrees, in FIG. 41 for the pass band at 50 degrees and in FIG. 42 for the block band at 50 degrees. The optical filter of Example 4 had a passband at normal incidence for light polarized in the pass state centered at about 940 nm.

The following is a list of exemplary embodiments of the present description.

Embodiment 1 is an optical filter comprising:
a polarizer configured to transmit at least 60 percent of light in a first infrared wavelength range that is incident on the polarizer at normal incidence in a first polarization state, the polarizer configured to transmit less than 30 percent of light in a second infrared wavelength that is incident on the polarizer at normal incidence in a second polarization state orthogonal to the first polarization state, the polarizer configured to transmit less than 30 percent of light in a third infrared wavelength range that is incident on the polarizer with a 50 degree angle of incidence in the second polarization state; and
a visible light blocking filter configured to transmit less than 30 percent of unpolarized light in a first visible wavelength range that is incident on the visible light blocking filter at normal incidence, the visible light blocking filter disposed such that light transmitted through the polarizer is incident on the visible light blocking filter, the visible light blocking filter configured to transmit at least 60 percent of light in the first infrared wavelength range that is incident on the visible light blocking filter at normal incidence in the first polarization state,
wherein a wavelength range from 700 nm to 2500 nm comprises each of the first, second and third infrared wavelength ranges, and the first visible wavelength range includes at least 80 percent of a wavelength range from 400 nm to 700 nm.

Embodiment 2 is the optical filter of Embodiment 1, wherein the polarizer is laminated to the visible light blocking filter.

Embodiment 3 is the optical filter of Embodiment 1, wherein an airgap separates the polarizer and the visible light blocking filter.

Embodiment 4 is the optical filter of Embodiment 1 being configured to transmit at least 60 percent of light in the first infrared wavelength range that is in the first polarization state and that is incident on the optical filter at normal incidence.

Embodiment 5 is the optical filter of Embodiment 1 being configured to transmit at least 70 percent of light in the first infrared wavelength range that is in the first polarization state and that is incident on the optical filter at normal incidence.

Embodiment 6 is the optical filter of Embodiment 1 being configured to transmit less than 20 percent of light in the second infrared wavelength range that is in the second polarization state and that is incident on the optical filter at normal incidence.

Embodiment 7 is the optical filter of Embodiment 1, wherein the second infrared wavelength range is from 800 nm to 1600 nm.

Embodiment 8 is the optical filter of Embodiment 1, wherein the first and second infrared wavelength ranges are from 800 nm to 1600 nm.

Embodiment 9 is the optical filter of Embodiment 1, wherein the third infrared wavelength range is from 800 nm to at least 1000 nm.

Embodiment 10 is the optical filter of Embodiment 1, wherein each of the second and third infrared wavelength ranges includes at least a 300 nm range.

Embodiment 11 is the optical filter of Embodiment 1, wherein each of the second and third infrared wavelength ranges includes at least a range from 800 nm to 1000 nm.

Embodiment 12 is the optical filter of Embodiment 1, wherein each of the second and third infrared wavelength ranges includes at least a range from 800 nm to 1100 nm.

Embodiment 13 is the optical filter of Embodiment 1, wherein the first and second infrared wavelength ranges are the same.

Embodiment 14 is the optical filter of Embodiment 1, wherein the polarizer has a first order reflection band comprising the second infrared wavelength range and has at least one harmonic at least partially in the visible wavelength range.

Embodiment 15 is the optical filter of Embodiment 1, wherein the polarizer is a polarizing notch filter having a full-width at half-maximum bandwidth of no more than 100 nm.

Embodiment 16 is the optical filter of Embodiment 1, wherein the first infrared wavelength range has a width of less than 100 nm and the second infrared wavelength range is from 800 nm to 1600 nm.

Embodiment 17 is the optical filter of Embodiment 16, wherein the first infrared wavelength range has a width of no more than 60 nm.

Embodiment 18 is the optical filter of Embodiment 16 being configured to provide a near-infrared passband for light having the first polarization state, the near-infrared passband comprising the first infrared wavelength range, the near-infrared passband having a full-width at half-maximum bandwidth of no more than 100 nm.

Embodiment 19 is the optical filter of Embodiment 16, wherein the visible light blocking filter comprises a notch filter, the notch filter configured to transmit at least 60 percent of unpolarized light in the first infrared wavelength range that is incident on the notch filter at normal incidence, the notch filter having a full-width at half-maximum bandwidth of no more than 100 nm.

Embodiment 20 is the optical filter of Embodiment 16, further comprising a notch filter disposed such that light transmitted through the polarizer is incident on the notch filter, the notch filter configured to transmit at least 60 percent of unpolarized light in the first infrared wavelength range that is incident on the notch filter at normal incidence, the notch filter having a full-width at half-maximum bandwidth of no more than 100 nm.

Embodiment 21 is the optical filter of Embodiment 16, wherein the polarizer comprises a notch filter and a broad-band polarizer, the notch filter configured to transmit at least 60 percent of unpolarized light in the first infrared wavelength range that is incident on the notch filter at normal incidence, the notch filter having a full-width at half-maximum bandwidth of no more than 100 nm, the broad-band polarizer configured to transmit at least 60 percent of light in a fourth infrared wavelength range that is incident on the broad-band polarizer at normal incidence in the first polarization state, and to transmit less than 30 percent of light in the second infrared wavelength range that is in the second polarization state and that is incident on the broad-band polarizer at normal incidence, the fourth infrared wavelength range comprising the first infrared wavelength range.

Embodiment 22 is the optical filter of Embodiment 21, wherein the fourth infrared wavelength range has a width of at least 300 nm.

Embodiment 23 is the optical filter of any of Embodiments 19 to 22, wherein the notch filter comprises a polymeric multilayer optical film.

Embodiment 24 is the optical filter of any of Embodiments 19 to 22, wherein the notch filter comprises a plurality of inorganic layers.

Embodiment 25 is the optical filter of any of Embodiments 19 to 22, wherein the notch filter comprises a polymeric multilayer optical film and a plurality of inorganic layers disposed adjacent the polymeric multilayer optical film.

Embodiment 26 is the optical filter of any of Embodiments 19 to 22, wherein the notch filter comprises a plurality of alternating polymeric and inorganic layers.

Embodiment 27 is the optical filter of any of Embodiments 1 to 26, wherein the polarizer comprises one or more of a polymeric multilayer optical film, a cholesteric polarizer, a wire-grid polarizer, a silver nanoparticle polarizer, and one or more polarizing dyes.

Embodiment 28 is the optical filter of Embodiment 1, wherein the visible light blocking filter comprises a polymeric multilayer optical film.

Embodiment 29 is the optical filter of Embodiment 1, wherein the visible light blocking filter comprises a plurality of inorganic layers.

Embodiment 30 is the optical filter of Embodiment 1, wherein the visible light blocking filter comprises a polymeric multilayer optical film and a plurality of inorganic layers disposed adjacent the polymeric multilayer optical film.

Embodiment 31 is the optical filter of Embodiment 1, wherein the visible light blocking filter comprises a plurality of alternating polymeric and inorganic layers.

Embodiment 32 is the optical filter of Embodiment 1, wherein the visible light blocking filter comprises at least one of a dye and a pigment.

Embodiment 33 is the optical filter of Embodiment 1, wherein the visible light blocking filter comprises a metallic coating.

Embodiment 34 is the optical filter of Embodiment 1, wherein the first visible wavelength range is from 400 nm to 700 nm.

Embodiment 35 is the optical filter of Embodiment 1, wherein the first visible wavelength range includes all wavelengths between 400 nm and 700 nm except for a band having a width of no more than 60 nm.

Embodiment 36 is the optical filter of Embodiment 1, wherein the first and second polarization states are circular polarization states.

Embodiment 37 is the optical filter of Embodiment 1, wherein the first and second polarization states are linear polarization states.

Embodiment 38 is the optical filter of Embodiment 1, further comprising a directional control element disposed adjacent the polarizer.

Embodiment 39 is the optical filter of Embodiment 1, further comprising a retarder disposed adjacent the polarizer.

Embodiment 40 is the optical filter of Embodiment 39, wherein the retarder is patterned.

Embodiment 41 is the optical filter of Embodiment 40, wherein a first portion of the retarder has a first fast axis and a different second portion of the retarder has a second fast axis not parallel to the first pass axis.

Embodiment 42 is the optical filter of Embodiment 41, wherein the first fast axis of the retarder is at an angle of about 45 degrees from a pass axis of the polarizer.

Embodiment 43 is the optical filter of Embodiment 40, wherein a first portion of the retarder has a first retardance and a different second portion of the retarder has a different second retardance.

Embodiment 44 is an optical filter comprising a polarizer, wherein the polarizer comprises a plurality of alternating polymeric layers and is configured to transmit at least 60 percent of light in a first infrared wavelength range that is incident on the polarizer at normal incidence in a first circular polarization state, the polarizer configured to transmit less than 30 percent of light in a second infrared wavelength that is incident on the polarizer at normal incidence in a second circular polarization state orthogonal to the first polarization state, the polarizer configured to transmit less than 30 percent of light in a third infrared wavelength range that is incident on the polarizer with a 50 degree angle of incidence in the second circular polarization state, wherein a wavelength range from 700 nm to 2500 nm comprises each of the first and second infrared wavelength ranges.

Embodiment 45 is the optical filter of Embodiment 44, further comprising a visible light blocking filter in optical communication with the polarizer.

Embodiment 46 is the optical filter of Embodiment 44, wherein the polarizer comprises a linear reflective polarizer and a retarder disposed adjacent the linear reflective polarizer, the linear reflective polarizer comprising the plurality of alternating polymeric layers, the retarder having a quarter-wave retardance at a wavelength in the first infrared wavelength range.

Embodiment 47 is an optical device comprising the optical filter of any one of Embodiments 1 to 46.

Embodiment 48 is the optical device of Embodiment 47 being selected from the group consisting of a wearable electronic device, a medical diagnostic device, a cell phone, a near-infrared marker, a component of a garage door opening system, and a component of a driver assistance system.

Embodiment 49 is the optical device of Embodiment 48, wherein the wearable electronic device is a watch.

Embodiment 50 is the optical device of Embodiment 48, wherein the near-infrared marker is a near-infrared retroreflector.

Embodiment 51 is an optical system comprising the optical device of Embodiment 47, the optical system being selected from the group consisting a medical diagnostic system, a garage door opening system, and a driver assistance system.

Embodiment 52 is an optical device comprising the optical filter of Embodiment 1, a sensor and a near-infrared light source, the optical filter having a first side and an opposing second side, the sensor disposed adjacent to and facing the first side, the near-infrared light source disposed adjacent the sensor and adjacent to and facing the first side.

Embodiment 53 is the optical device of Embodiment 52, wherein the sensor has a spectral range at least from 600 nm to 1000 nm.

Embodiment 54 is the optical device of Embodiment 52, wherein the sensor has a spectral range from 400 nm to 1200 nm.

Embodiment 55 is the optical device of Embodiment 52, wherein the near-infrared light source is configured to emit light in a band that has a full-width at half maximum bandwidth of no more than 60 nm.

Embodiment 56 is the optical device of Embodiment 52, wherein the optical filter is configured to provide a near-infrared passband for light having the first polarization state, the near-infrared passband comprising the first infrared wavelength range, the near-infrared passband having a full-width at half-maximum bandwidth greater than or equal to the full-width at half maximum bandwidth of the near-infrared light source.

Embodiment 57 is the optical device of Embodiment 56, wherein the full-width at half-maximum bandwidth of the near-infrared passband is no more than twice the full-width at half maximum bandwidth of the near-infrared light source.

Embodiment 58 is the optical device of Embodiment 55, wherein the band is centered at a wavelength of about 850 nm, about 880 nm or about 940 nm.

Embodiment 59 is the optical device of Embodiment 52, wherein the first and second polarization states are circular polarization states.

Embodiment 60 is the optical device of Embodiment 52, wherein the first and second polarization states are linear polarization states.

Embodiment 61 is the optical device of Embodiment 52, wherein the optical filter comprises a retarder disposed adjacent the polarizer opposite the first side of the optical filter.

Embodiment 62 is the optical device of Embodiment 61, wherein the first and second polarization states are linear polarization states and the retarder is a quarter-wave retarder at a wavelength in the first infrared wavelength range.

Embodiment 63 is the optical device of Embodiment 61, wherein the retarder is a patterned retarder.

Embodiment 64 is the optical device of Embodiment 63, where the patterned retarder has a first portion disposed to receive light from the near-infrared light source and a different second portion disposed to transmit light to the sensor.

Embodiment 65 is the optical device of Embodiment 64, wherein the first portion has a first retardance and the second portion has a different second retardance.

Embodiment 66 is the optical device of Embodiment 65, wherein an absolute value of a difference between the first retardance and the second retardance at a wavelength in the first infrared wavelength range is half of the wavelength.

Embodiment 67 is the optical device of Embodiment 65, wherein the first portion has a first fast axis and the second portion has a second fast axis not parallel to the first fast axis.

Embodiment 68 is the optical device of Embodiment 64, wherein the first and second portions have a same retardance, the first portion having a first fast axis and the second portion having a second fast axis not parallel to the first fast axis.

Embodiment 69 is the optical device of Embodiment 64, wherein one of the first and second portions has a fast axis at an angle of about 45 degrees from a pass axis of the polarizer and has a half-wave retardance at a wavelength in the first infrared wavelength range, and the other of the first and second portions either has substantially no retardance at the wavelength in the first infrared wavelength range or has a fast axis substantially parallel or substantially perpendicular to the pass axis.

Embodiment 70 is an optical device comprising a sensor and the optical filter of any one of Embodiments 1 to 46 disposed such that light entering an aperture of the sensor passes through the optical filter.

Embodiment 71 is the optical device of Embodiment 70 being selected from the group consisting of a wearable electronic device, a medical diagnostic device, a cell phone, a near-infrared marker, a component of a garage door opening system, and a component of a driver assistance system.

Embodiment 72 is an optical system comprising the optical device of Embodiment 70, the optical system being selected from the group consisting of a medical diagnostic system, a garage door opening system, and a driver assistance system.

Embodiment 73 is a cell phone comprising the optical device of Embodiment 70.

Embodiment 74 is the optical device of Embodiment 70, further comprising an near-infrared light source disposed proximate the sensor such that when the near-infrared light source emits near-infrared light though the optical filter towards a near-infrared retroreflector, the near-infrared light is reflected from the retroreflector towards the sensor.

Embodiment 75 is an optical system comprising the optical device of Embodiment 74 and further comprising the near-infrared retroreflector.

Embodiment 76 is an optical system comprising the optical filter of any of Embodiments 1 to 46 and a near-infrared retroreflector in optical communication with the optical filter.

Embodiment 77 is the optical system of Embodiment 75 or 76, wherein the near-infrared retroreflector is a polarization rotating retroreflector.

Embodiment 78 is the optical system of Embodiment 75 or 76, wherein the near-infrared retroreflector is a polarization preserving retroreflector.

Embodiment 79 is the optical system of Embodiment 75 or 76, wherein the near-infrared retroreflector is a phase shifting retroreflector.

Embodiment 80 is the optical system of Embodiment 75 or 76, wherein the near-infrared retroreflector is a depolarizing retroreflector.

Embodiment 81 is the optical system of Embodiment 75 or 76, wherein the retroreflector includes a retarder.

Embodiment 82 is the optical system of Embodiment 81, wherein the retarder is a quarter-wave retarder at a wavelength in the first infrared wavelength range.

Embodiment 83 is the optical system of Embodiment 75 or 76 being a garage door opening system.

Embodiment 84 is the optical system of Embodiment 75 or 76 being a driver assistance system.

Embodiment 85 is an optical system comprising a near infrared light source, a sensor and a marker, wherein a light path extending from the near infrared light source to the marker and then to the sensor intersects at least one optical filter according to any of Embodiments 1 to 46.

Embodiment 86 is an optical system comprising a near infrared light source, a sensor and a marker, wherein a light path extending from the near infrared light source to the marker and then to the sensor intersects at least two optical filters according to any of Embodiments 1 to 46.

Embodiment 87 is an optical system comprising a near infrared light source, a sensor and a marker, wherein a light path extending from the near infrared light source to the marker and then to the sensor intersects a first portion of an optical filter between the near infrared light source and the marker and intersects a different second portion of the optical filter between the marker and the sensor, wherein the optical filter is an optical filter according to any of Embodiments 1 to 46.

Embodiment 88 is an optical system comprising a near infrared light source, a sensor and a marker, the near infrared light source adapted to produce unpolarized light, one of the sensor and the marker comprising an optical filter of Embodiment 1, the first polarization state a linear polarization state having a first pass axis, the other of the sensor and the marker comprising a second polarizer having a second pass axis substantially orthogonal to the first pass axis.

Embodiment 89 is an optical system comprising a near infrared light source, a sensor and a marker, the near infrared light source adapted to produce unpolarized light, one of the sensor and the marker comprising an optical filter of Embodiment 44, the other of the sensor and the marker comprising a second polarizer configured to transmit at least 60 percent of light in the first infrared wavelength range that is incident on the second polarizer at normal incidence in the second circular polarization state, the second polarizer configured to transmit less than 30 percent of light in the second infrared wavelength that is incident on the second polarizer at normal incidence in the first circular polarization state.

Embodiment 90 is the optical system of Embodiment 89, wherein at least one of the sensor and the marker comprises a visible light blocking filter.

Embodiment 91 is an optical system comprising a near infrared light source, a sensor and a marker, one of the near infrared light source and the sensor comprising an optical filter of Embodiment 1, the first polarization state a linear polarization state having a first pass axis, the other of the near infrared light source and the sensor comprising a second polarizer.

Embodiment 92 is the optical system of Embodiment 91, wherein the second polarizer has a second pass axis substantially orthogonal to the first pass axis.

Embodiment 93 is the optical system of Embodiment 91, wherein the second polarizer has a second pass axis substantially parallel to the first pass axis.

Embodiment 94 is the optical system of any of Embodiments 91 to 93, wherein the marker is depolarizing.

Embodiment 95 is the optical system of any of Embodiments 91 to 93, wherein the marker is polarization preserving.

Embodiment 96 is the optical system of any of Embodiments 91 to 93, wherein the marker is polarization rotating.

Embodiment 97 is the optical system of any of Embodiments 91 to 93, wherein the marker is a phase shifting marker.

Embodiment 98 is an optical system comprising a near infrared light source, a sensor and a marker, one of the near infrared light source and the sensor comprising an optical filter of Embodiment 44, the other of the near infrared light source and the sensor comprising a second polarizer configured to transmit at least 60 percent of light in the first infrared wavelength range that is incident on the second polarizer at normal incidence in the second circular polarization state, the second polarizer configured to transmit less than 30 percent of light in the second infrared wavelength that is incident on the second polarizer at normal incidence in the first circular polarization state.

Embodiment 99 is the optical system of Embodiment 98, wherein the optical filter further comprises a visible light blocking filter.

Embodiment 100 is the optical system of Embodiment 98, wherein the marker is depolarizing.

Embodiment 101 is the optical system of Embodiment 98, wherein the marker is adapted to shift a phase of a light reflected from the marker.

Embodiment 102 is the optical system of Embodiment 101, wherein the marker comprises a quarter-wave retarder at a wavelength in the first infrared wavelength range.

Embodiment 103 is the optical system of Embodiment 98, wherein the marker is a phase shifting marker adapted to receive circularly polarized light and reflect the received light as a linearly polarized light.

Embodiment 104 is the optical system of Embodiment 98, wherein the marker is polarization preserving.

Embodiment 105 is the optical system of Embodiment 98, wherein the marker is polarization rotating.

Embodiment 106 is the optical system of any of Embodiments 85 to 105 being a driver assistance system.

Embodiment 107 is the optical system of Embodiment 51, 72, or 84, or 106, wherein the driver assistance system comprises one or more of a night vision system, a parking assistance system, a blind spot detection system, an electronic stability control system, a drowsy driver detection system, an adaptive headlight system, a rain detection system, an adaptive cruise control system, a lane departure warning system, a collision avoidance system, and a backup camera system.

Embodiment 108 is the optical system of any of Embodiments 85 to 107, wherein the marker is a retroreflective license plate.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical filter comprising:
  a polarizer configured to transmit at least 60 percent of light in a first infrared wavelength range that is incident on the polarizer at normal incidence in a first polarization state, the polarizer configured to transmit less than 30 percent of light in a second infrared wavelength range that is incident on the polarizer at normal incidence in a second polarization state orthogonal to the first polarization state, the polarizer configured to transmit less than 30 percent of light in a third infrared wavelength range that is incident on the polarizer with a 50 degree angle of incidence in the second polarization state; and a visible light blocking filter configured to transmit less than 30 percent of unpolarized light in a first visible wavelength range that is incident on the visible light blocking filter at normal incidence, the visible light blocking filter disposed such that light transmitted through the polarizer is incident on the visible light blocking filter, the visible light blocking filter configured to transmit at least 60 percent of light in the first infrared wavelength range that is incident on the visible light blocking filter at normal incidence in the first polarization state, wherein a wavelength range from 700 nm to 2500 nm comprises each of the first, second and third infrared wavelength ranges, and the first visible wavelength range includes at least 80 percent of a wavelength range from 400 nm to 700 nm.

2. The optical filter of claim 1 being configured to transmit at least 60 percent of light in the first infrared wavelength range that is in the first polarization state and that is incident on the optical filter at normal incidence.

3. The optical filter of claim 1, wherein the first and second infrared wavelength ranges are from 800 nm to 1600 nm.

4. The optical filter of claim 1, wherein the third infrared wavelength range is from 800 nm to at least 1000 nm.

5. The optical filter of claim 1, wherein each of the second and third infrared wavelength ranges includes at least a 300 nm range.

6. The optical filter of claim 1, wherein the polarizer has a first order reflection band comprising the second infrared wavelength range and has at least one harmonic at least partially in the first visible wavelength range.

7. The optical filter of claim 1, wherein the first infrared wavelength range has a width of less than 100 nm and the second infrared wavelength range is from 800 nm to 1600 nm.

8. The optical filter of claim 7 being configured to provide a near-infrared passband for light having the first polarization state, the near-infrared passband comprising the first infrared wavelength range, the near-infrared passband having a full-width at half-maximum bandwidth of no more than 100 nm.

9. The optical filter of claim 7, wherein the visible light blocking filter comprises a notch filter, the notch filter configured to transmit at least 60 percent of unpolarized light in the first infrared wavelength range that is incident on the notch filter at normal incidence, the notch filter having a full-width at half-maximum bandwidth of no more than 100 nm.

10. The optical filter of claim 7, further comprising a notch filter disposed such that light transmitted through the polarizer is incident on the notch filter, the notch filter configured to transmit at least 60 percent of unpolarized light in the first infrared wavelength range that is incident on the notch filter at normal incidence, the notch filter having a full-width at half-maximum bandwidth of no more than 100 nm.

11. The optical filter of claim 7, wherein the polarizer comprises a notch filter and a broad-band polarizer, the notch filter configured to transmit at least 60 percent of unpolarized light in the first infrared wavelength range that is incident on the notch filter at normal incidence, the notch filter having a full-width at half-maximum bandwidth of no more than 100 nm, the broad-band polarizer configured to transmit at least 60 percent of light in a fourth infrared wavelength range that is incident on the broad-band polarizer at normal incidence in the first polarization state, and to transmit less than 30 percent of light in the second infrared wavelength range that is in the second polarization state and that is incident on the broad-band polarizer at normal incidence, the fourth infrared wavelength range comprising the first infrared wavelength range.

12. The optical filter of claim 1, wherein the first and second polarization states are circular polarization states.

13. The optical filter of claim 1, wherein the first and second polarization states are linear polarization states.

14. The optical filter of claim 1, further comprising a retarder disposed adjacent the polarizer.

15. The optical filter of claim 14, wherein the retarder is patterned.

16. An optical device comprising a sensor and the optical filter of claim 1 disposed such that light entering an aperture of the sensor passes through the optical filter.

17. The optical device of claim 16, further comprising an near-infrared light source disposed proximate the sensor such that when the near-infrared light source emits near-infrared light though the optical filter towards a near-infrared retroreflector, the near-infrared light is reflected from the retroreflector towards the sensor.

18. An optical system comprising at least one optical filter according to claim 1, a near infrared light source, a sensor and a marker, wherein a light path extending from the near infrared light source to the marker and then to the sensor intersects the at least one optical filter.

19. An optical filter comprising a polarizer, wherein the polarizer comprises a plurality of alternating polymeric layers and is configured to transmit at least 60 percent of light in a first infrared wavelength range that is incident on the polarizer at normal incidence in a first circular polarization state, the polarizer configured to transmit less than 30 percent of light in a second infrared wavelength range that is incident on the polarizer at normal incidence in a second circular polarization state orthogonal to the first polarization state, the polarizer configured to transmit less than 30 percent of light in a third infrared wavelength range that is incident on the polarizer with a 50 degree angle of incidence in the second circular polarization state, wherein a wavelength range from 700 nm to 2500 nm comprises each of the first and second infrared wavelength ranges.

20. An optical system comprising the optical filter of claim 19 and at least one of a near infrared light source, a sensor, or a marker in optical communication with the optical filter.

* * * * *

UNITED STATES PATENT AND TRADEMARK OFFICE
CERTIFICATE OF CORRECTION

PATENT NO. : 11,016,229 B2
APPLICATION NO. : 16/095406
DATED : May 25, 2021
INVENTOR(S) : John Wheatley et al.

Page 1 of 1

It is certified that error appears in the above-identified patent and that said Letters Patent is hereby corrected as shown below:

In the Specification

Column 3
Line 50, Delete "a" and insert -- $\alpha$ --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*